United States Patent
Tippery et al.

(10) Patent No.: US 11,039,269 B2
(45) Date of Patent: *Jun. 15, 2021

(54) SYSTEM AND METHOD FOR PROXIMITY-BASED ANALYSIS OF MULTIPLE AGRICULTURAL ENTITIES

(71) Applicant: Realmfive, Inc., Lincoln, NE (US)

(72) Inventors: Steve R. Tippery, Gretna, NE (US); Brant Burkey, Denton, NE (US); Heath Roehr, Lincoln, NE (US)

(73) Assignee: REALMFIVE, INC., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,186

(22) Filed: Oct. 28, 2019

(65) Prior Publication Data
US 2020/0204944 A1 Jun. 25, 2020

Related U.S. Application Data

(63) Continuation of application No. 16/012,669, filed on Jun. 19, 2018, now Pat. No. 10,462,603, which is a (Continued)

(51) Int. Cl.
*G08B 1/08* (2006.01)
*H04W 4/021* (2018.01)
(Continued)

(52) U.S. Cl.
CPC ............ *H04W 4/021* (2013.01); *G06F 16/90* (2019.01); *G06Q 50/02* (2013.01); *G08B 21/18* (2013.01); *H04L 51/02* (2013.01); *H04W 4/38* (2018.02)

(58) Field of Classification Search
CPC .. G06Q 10/087; G06Q 10/0838; G06Q 50/02; H04W 4/021; H04W 4/38;
(Continued)

(56) References Cited

U.S. PATENT DOCUMENTS 7,073,314 B2  7/2006  Beck et al.
7,480,564 B2  1/2009  Metzler et al.
(Continued)

*Primary Examiner* — Toan N Pham
(74) *Attorney, Agent, or Firm* — Suiter Swantz pc llo

(57) ABSTRACT

A system for proximity-based analysis of multiple entities includes a first communication device associated with a first entity and an additional communication device associated with an additional entity, wherein the first communication device and the additional communication device are communicatively couplable. The system includes one or more processors communicatively coupled to at least one of the first communication device or the at least an additional communication device. The one or more processors are configured to: identify a spatial relationship between the first entity and the additional entity based on one or more signals from the first communication device or the additional communication device, identify an operation unit defined by an association between the first entity and the additional entity based on the spatial relationship between the first entity and the at least the additional entity, and report one or more characteristics of the operation unit.

25 Claims, 28 Drawing Sheets

Related U.S. Application Data continuation-in-part of application No. 15/215,315, filed on Jul. 20, 2016, now abandoned.

(60) Provisional application No. 62/194,521, filed on Jul. 20, 2015, provisional application No. 62/196,584, filed on Jul. 24, 2015.

(51) Int. Cl.
| | |
|---|---|
| *G06Q 50/02* | (2012.01) |
| *H04L 12/58* | (2006.01) |
| *G08B 21/18* | (2006.01) |
| *H04W 4/38* | (2018.01) |
| *G06F 16/90* | (2019.01) |

(58) Field of Classification Search
CPC ........ H04W 4/029; G06F 16/90; H04L 51/02; H04L 51/20; H04L 12/1845; G08B 21/18
USPC .... 340/539.1, 539.16, 5.1, 5.92, 680, 571.1, 340/571
See application file for complete search history.

(56) References Cited

U.S. PATENT DOCUMENTS

| | | |
|---|---|---|
| 8,254,351 B2 | 8/2012 | Fitzner et al. |
| 10,462,603 B1 * | 10/2019 | Tippery ................. G06F 16/90 |
| 2012/0259537 A1 | 10/2012 | Schmidt et al. |
| 2015/0351320 A1 | 12/2015 | Takahara et al. |
| 2016/0110502 A1 | 4/2016 | Bronson et al. |
| 2016/0119770 A1 | 4/2016 | Ryu et al. |
| 2016/0147962 A1 | 5/2016 | Vollmar et al. |
| 2016/0157275 A1 | 6/2016 | Matthews |

* cited by examiner

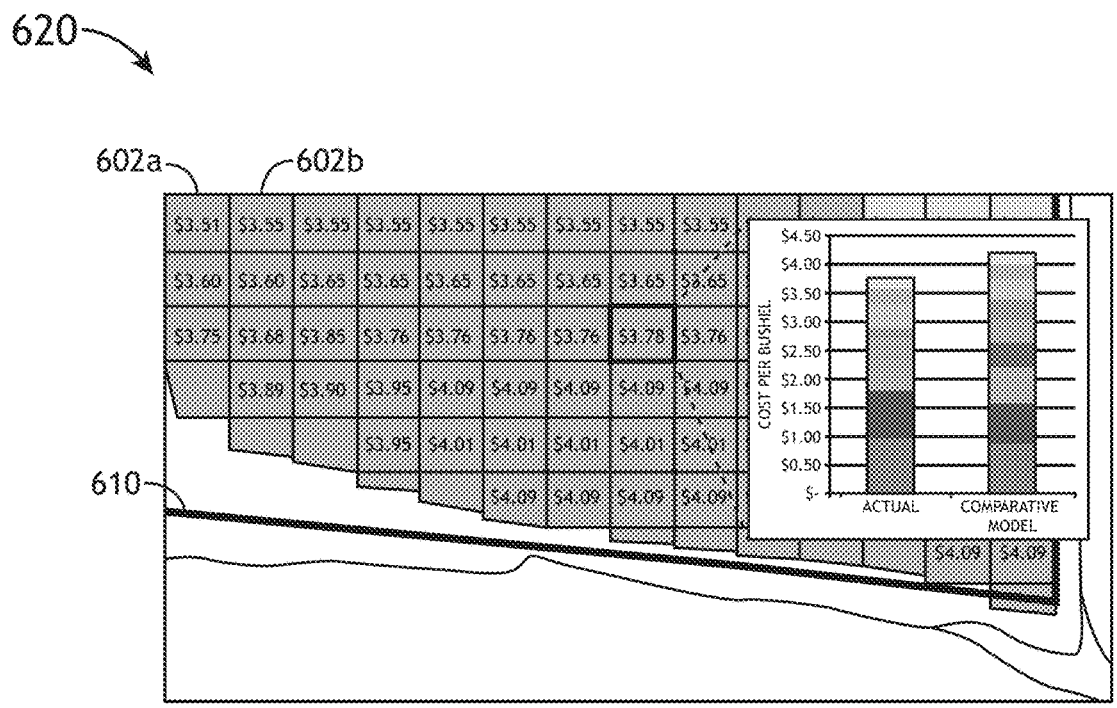
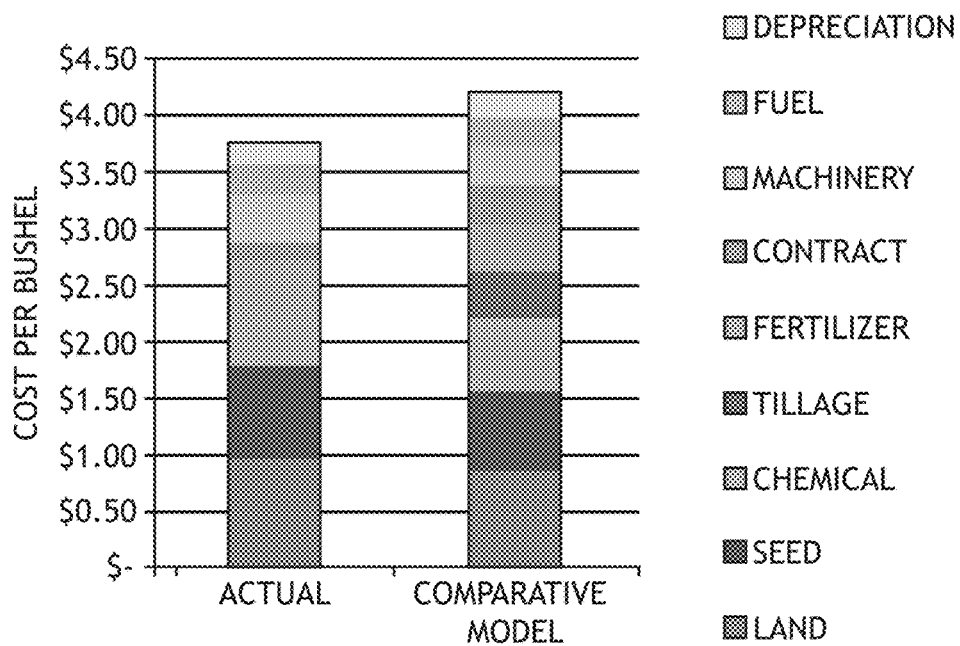
FIG.6B

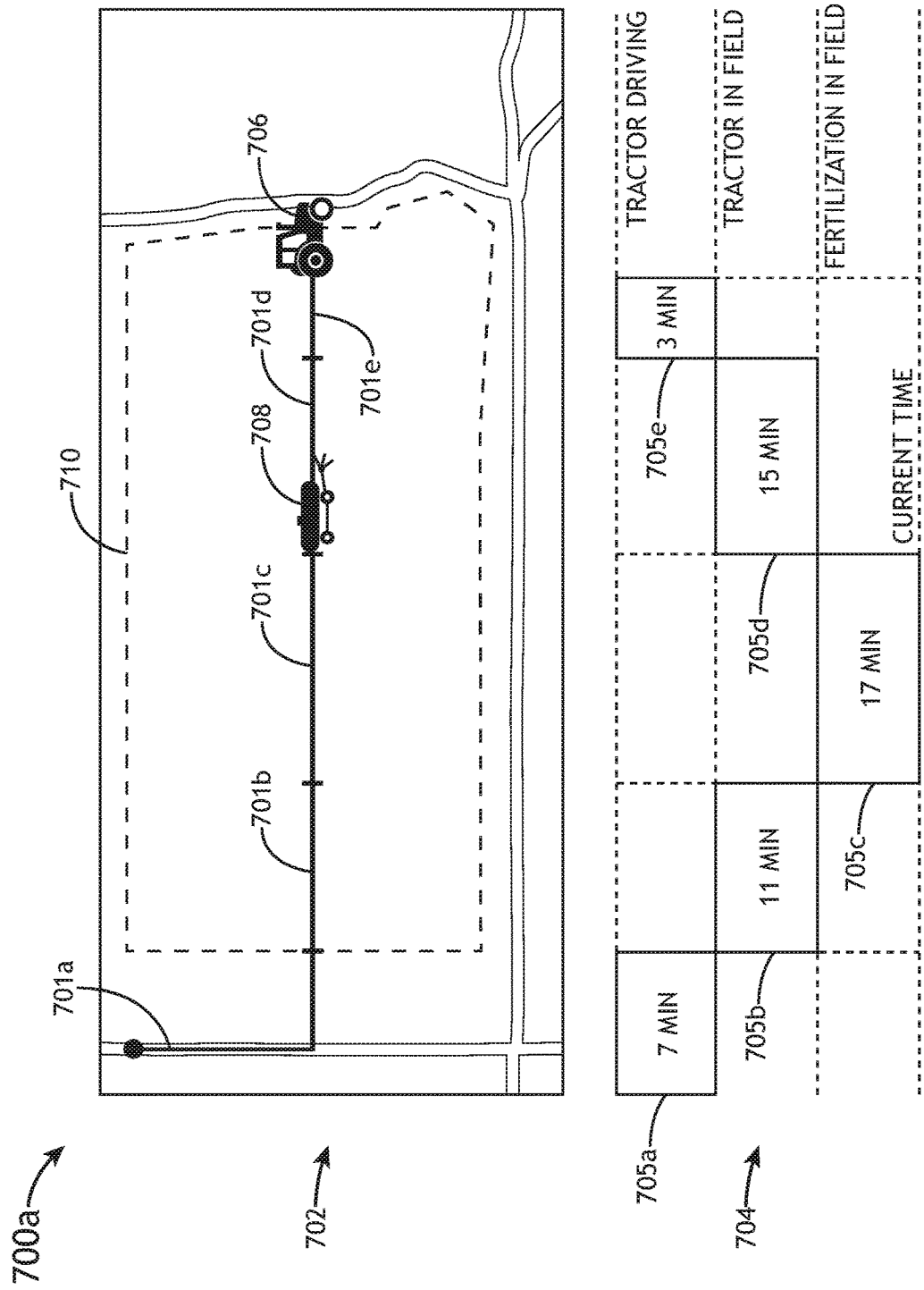

RealmFive Analytics Reports

Select a report to create

Search: [Tractors]

○ Equipment  ○ Fence  [Run Report]
○ Operations

| ID | Equipment Type | Beacon Tag | Description | |
|---|---|---|---|---|
| auf0f6eee-a8f5-f-45a3-9577-f-def0f3fa6e907 | Tractor | Beacon Tag | Challenger B45B | ⦿ |
| bf3f0f59f8-ad57-0e4cf-f-8f4f-8 fe9bf54ee2b34 | Tractor | Beacon Tag | John Deere B245R Lucy | ○ |
| 3cdb4f86f-fra3e-7b39-d f48-6cd24ae6 f809 | Tractor | Beacon Tag | Challenger B85E | ○ |
| 09fice777-fd227-cfae3-77b f-f6cf6cf02e45c2 | Tractor | Beacon Tag | Big Red | ○ |
| 2ce4df9-fe3df-98de-40 fe-22 ff9cf27737 | Tractor | Beacon Tag | Big Green | ○ |

FIG. 9

SYSTEM AND METHOD FOR PROXIMITY-BASED ANALYSIS OF MULTIPLE AGRICULTURAL ENTITIES

CROSS-REFERENCE TO RELATED APPLICATION

The present application is related to and claims benefit of the earliest available effective filing date from the following applications: The present application constitutes continuation application of U.S. patent application Ser. No. 16/012,669, filed Jun. 19, 2018, now U.S. Pat. No. 10,462,603, which constitutes a continuation-in-part patent application of U.S. patent application Ser. No. 15/215,315 (Abandoned), filed Jul. 20, 2016, which is a regular (non-provisional) patent application of U.S. Provisional Application No. 62/194,521, filed Jul. 20, 2015, and U.S. Provisional Application No. 62/196,584, filed Jul. 24, 2015, whereby all of the above-listed patent applications are incorporated by reference herein in their entirety.

TECHNICAL FIELD

The present invention generally relates to proximity sensing of multiple agricultural devices, and, more particularly, to proximity-based analysis of multiple agricultural devices.

BACKGROUND

Tracking resources and cost is critical in both agricultural production and non-agricultural production settings. In the case of farm production, it is currently difficult to track inventory, associated input costs, and machine use from one area of a farm down to an area where the given entity is used or consumed. The tracking of resources and associated costs are currently performed manually, resulting in a tedious and inefficient process. Therefore, it would be desirable to provide a method and system that cure the shortfalls of the previous approaches identified above.

SUMMARY

A system is disclosed, in accordance with one or more embodiments of the present disclosure. In one embodiment, the system includes a first communication device associated with a first entity. In another embodiment, the system includes an additional communication device associated with an additional entity, wherein the first communication device and the additional communication device are communicatively couplable. In another embodiment, the system includes a database. In another embodiment, the system includes one or more processors communicatively coupled to at least one of the first communication device or the at least an additional communication device. In another embodiment, the one or more processors are configured to: identify a spatial relationship between the first entity and the additional entity based on one or more signals from the first communication device or one or more signals from the additional communication device; identify an operation unit defined by an association between the first entity and the additional entity based on the spatial relationship between the first entity and the additional entity; define a geo-fenced area; determine whether the operation unit is positioned within the defined geo-fenced area; determine one or more location-based characteristics of the operation unit based on the determination of the operation unit within the defined geo-fenced area and one or more characteristics of the association between the first entity and the additional entity; store the one or more characteristics of the operation unit in the database; and report the one or more characteristics of the operation unit via a user interface.

A system is disclosed, in accordance with one or more embodiments of the present disclosure. In one embodiment, the system includes a user interface. In another embodiment, the system includes a server. In another embodiment, the server includes a memory and one or more processors. In another embodiment, the one or more processors are configured to: receive one or more signals from a first communication device associated with a first entity; receive one or more signals from at least an additional communication device associated with an additional entity; identify a spatial relationship between the first entity and the additional entity based on one or more signals from the first communication device or one or more signals from the additional communication device; identify an operation unit defined by an association between the first entity and the additional entity based on the spatial relationship between the first entity and the additional entity; define a geo-fenced area; determine whether the operation unit is positioned within the defined geo-fenced area; determine one or more location-based characteristics of the operation unit based on the determination of the operation unit within the defined geo-fenced area and one or more characteristics of the association between the first entity and the additional entity; store the one or more characteristics of the operation unit in memory; and report the one or more characteristics of the operation unit via the user interface.

A method is disclosed, in accordance with one or more embodiments of the present disclosure. In one embodiment, the method includes associating a first communication device with a first entity. In another embodiment, the method includes associating an additional communication device with an additional entity, wherein the first communication device and the additional communication device are communicatively couplable. In another embodiment, the method includes identifying a spatial relationship between the first entity and the additional entity based on one or more signals from the first communication device or one or more signals from the additional communication device. In another embodiment, the method includes identifying an operation unit defined by an association between the first entity and the additional entity based on the spatial relationship between the first entity and the additional entity. In another embodiment, the method includes defining a geo-fenced area. In another embodiment, the method includes determining whether the operation unit is positioned within the defined geo-fenced area. In another embodiment, the method includes determining one or more location-based characteristics of the operation unit based on the determination of the operation unit within the defined geo-fenced area and one or more characteristics of the association between the first entity and the additional entity. In another embodiment, the method includes storing the one or more characteristics of the operation unit in a database. In another embodiment, the method includes reporting the one or more characteristics of the operation unit via a user interface.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIGS. 6A-6B depict a portion of a geo-fenced field in which cost allocations have been broken down into smaller field subsections, in accordance with one or more embodiments of the present disclosure;

FIGS. 7A-7E illustrate a graphical display screen depicting a map and a corresponding timeline, in accordance with one or more embodiments of the present disclosure;

FIGS. 9-19 illustrate a graphical user interfaces for providing proximity-based analysis, in accordance with one or more embodiments of the present disclosure.

DETAILED DESCRIPTION

Figure 1:
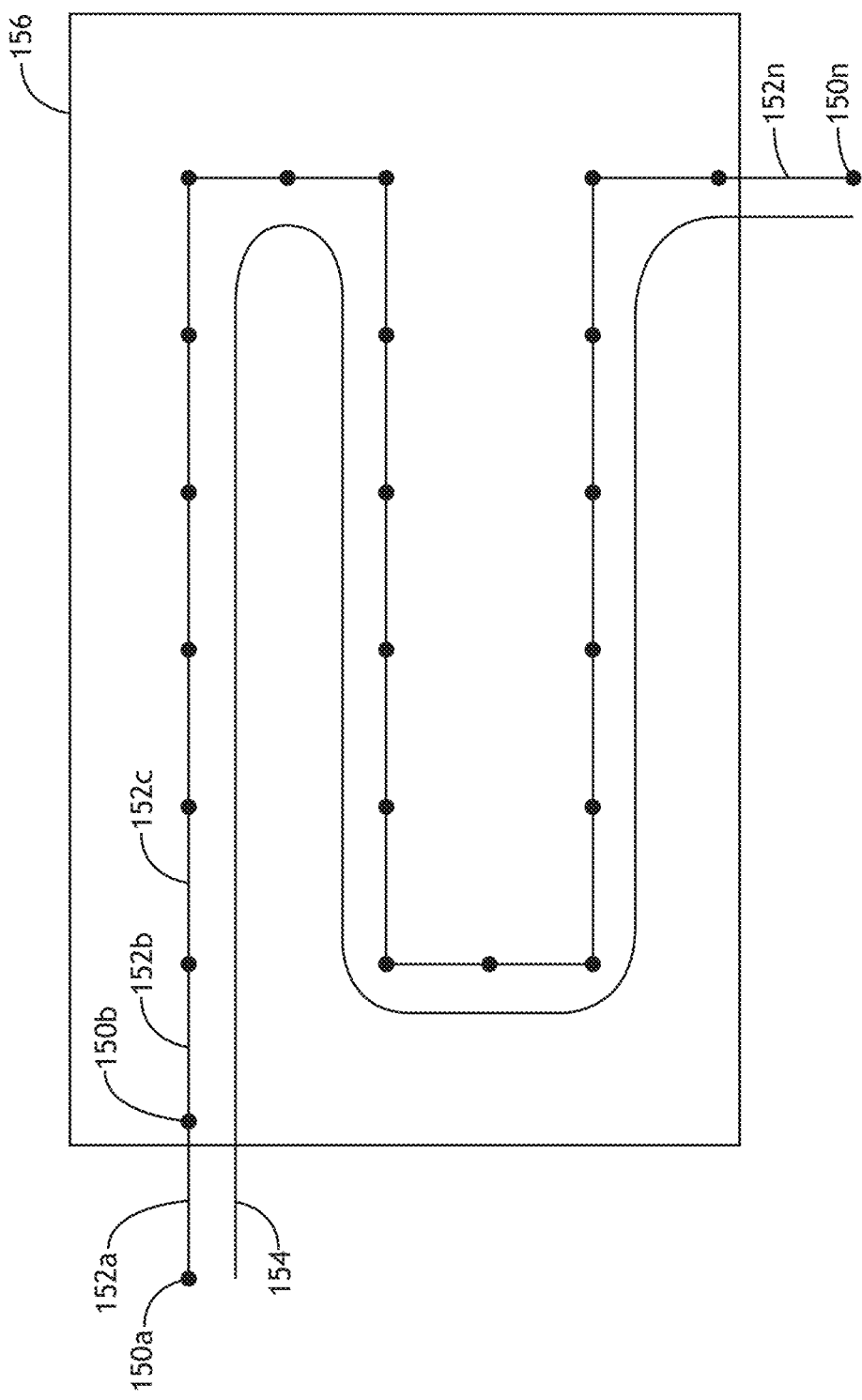
FIG. 1 depicts a graphical display of a geo-fenced area, in accordance with one or more embodiments of the present disclosure.

Reference will now be made in detail to the subject matter disclosed, which is illustrated in the accompanying drawings. Referring generally to FIGS. 1 through 6, a system and method for proximity-based analysis of multiple agricultural entities are illustrated, in accordance with one or more embodiments of the present disclosure.

It is to be understood that the present disclosure is to be regarded as illustrative of the various embodiments of the present invention, and is not limited to the following description or the accompanying drawings. Also, it is to be understood that the terminology used herein is for the purpose of description only, and should not be regarded as limiting.

Embodiments of the present disclosure are directed to spatial relationships between many different entities and communication devices, including people, equipment, and places. As such, it will be advantageous to define various terms prior to describing embodiments of the present disclosure.

The term "entity," as it applies to the present disclosure, refers to any person and/or object which may be tracked and identified for proximity sensing throughout the present disclosure. Entities may include any person or object intended to participate in the proximity sensing of the present disclosure including, but not limited to, people, vehicles, tractors, combines, trailers, tillage equipment, fuel tanks, and the like.

The term "beacon," as it applies to the present disclosure, refers to a transmitter or transceiver which is placed on, within, or near an entity that emits, at a minimum, a unique identifier (ID) that may be used to uniquely identify the entity. For example, a beacon may be affixed to a planter, and may transmit a unique ID which identifies the planter as "John Deere 1725 Planter: 10087." In one embodiment, a beacon can optionally collect information from an entity (e.g., telemetry from an entity connected wired or wirelessly to the beacon). For example, a beacon placed on, within, or near a fuel tank may be able to transmit a unique ID identifying the fuel tank as well as transmit fuel tank characteristic information including, but not limited to, the fuel level, type of fuel within the tank, and the like. Beacons may also be able to transmit information regarding the beacon itself (e.g., beacon battery health, beacon signal strength, and the like).

The term "scanner," as it applies to the present disclosure, refers to a transceiver device which is placed on, within, or near an entity that emits a unique identifier (ID) that may be used to uniquely identify the entity, scans for the unique ID's transmitted by beacons and other scanners, and logs and/or transmits collected data with a time stamp and location to a remote database. Similar to beacons, scanners may optionally collect information from an entity with which they are related. For example, a scanner placed on or within a tractor may be able to collect information regarding the tractor including, but not limited to, tractor fuel level, tractor speed, and the like. A scanner may optionally collect other information transmitted from beacons to identify properties of the beacons (e.g., beacon battery health, and the like) or entities with which the beacons are connected (e.g., fuel tank level, vehicle type, and the like).

The term "association," as it applies to the present disclosure, refers to a group of two or more entities which occupy the same space. Two entities that are within a certain distance of each other may be said to be in a "spatial relationship" with one another. For example, a beacon may be placed on a planter (Planter ID: 10087) and a scanner may be placed on a tractor (Tractor ID: 62065). When the tractor comes within a specified distance of the planter, the tractor and planter may be said to be in a "spatial relationship" and form an association ("10087"+"62065"=Association 1). Continuing with the same example, the tractor is driven by a user, who has on their person a cell phone. The user's cell phone may also act as a scanner and/or beacon, and therefore be identified by a unique ID. In this regard, the cell phone (e.g., the user), the tractor, and the planter may all be in a spatial relationship, and thus form a single association ("10087"+"62065"+"12345"=Association 1). It is contemplated that a single association may be made up of any number of entities in a spatial relationship with one another. For the purposes of this disclosure, the terms "association" and "spatial relationship" may be used interchangeably, unless noted otherwise herein.

The term "operation," as it applies to the present disclosure, refers to an association as it moves through time and space. For example, continuing with the example above, a user, tractor, and planter may form Association 1 when they are in a spatial relationship with one another. As Association 1 continues over time, and as Association 1 moves throughout a field, it could be determined that Association 1 is performing a planting "operation." This planting operation may simply be referred to as Operation 1. Data associated with an operation may include the data of the entities in the association (e.g., user phone data, tractor data, planter data), the time the operation takes place (e.g., starting time, duration, ending time), and the location of the operation (e.g., GPS coordinates over time, which field, and the like).

The terms "geo-fence," "geo-fenced boundary," "geo-fenced area," and like terms, as they apply to the present disclosure, refer to any geographical area or region. By way of example, a geo-fenced area may be defined by a series of GPS coordinates, or may be defined as a region relative to a particular entity. It is contemplated that a user may define one or more geo-fenced boundaries as areas in which the user desires to track associations and operations. For example, a user may define the outer perimeter of a field as a first geo-fenced boundary defining a first geo-fenced area. In this same manner, the user may define the perimeter of a second field as a second geo-fenced boundary defining a second geo-fenced area. By way of another example, a geo-fenced area may be defined as the region within a specified distance of an entity. In this regard, it is contemplated that a geo-fenced area may be stationary or mobile. It is contemplated that defining particular geo-fenced areas may allow a user to track associations and operations to particular areas, thereby allowing the user to track operation times, equipment costs, inventory usage, and the like to particular areas.

The term "catalyst," as it applies to the present disclosure, refers to software and/or hardware processes or systems which serve to expedite the process of identifying operations. Catalysts may include, but are not limited to, machine learning algorithms, smartphone applications (e.g., a "chatbot app"), and the like. For example, when a tractor enters a spatial relationship with a planter and forms an association, it may be unclear at the start whether the tractor is simply passing by the planter or whether the planter will be hooked up the tractor to begin a planting operation. It may be the case that, in order to positively identify a planting operation with a certain amount of accuracy, the tractor and planter may need to form an association for a specified amount of time (e.g., form an association for twenty or more minutes). In order to positively identify the planting operation more effectively and/or efficiently, a catalyst (e.g., "chatbot app") may send a query notification to the smartphone of the user of the tractor. The chatbot app may ask the user whether the user is performing a planting operation, whereby the user may confirm or deny that a planting operation is being performed. In this regard, it is contemplated that a catalyst may allow the present disclosure to more effectively and efficiently identify operations.

Relationships between many devices on the farm currently have minimal electronic integration and/or interaction. Such devices will be referred to for the remainder of this document as "entities." Examples of agricultural "entities" include several categories of machines and sensors. For example, entities may include self-propelled machines, such as, but not limited to, tractors, combines, forage harvesters, self-propelled sprayers, trucks, pickups, cars, or other personal vehicles. By way of another example, entities may include agricultural implements, such as, but not limited to, seeding and tillage equipment, planting equipment, hay harvesting equipment, and grain carts. By way of another example, entities may include stationary machines, such as, but not limited to, pivot irrigation systems, grain handling systems, livestock buildings (e.g., confinement facilities, and the like) and agricultural buildings (e.g., shops, machine sheds, and the like). By way of another example, entities may include energy generation machines, such as, but not limited to, diesel-powered generators, wind energy generators, and the like. By way of another example, entities may include, but are not limited to, miscellaneous devices/systems (e.g., in-field sensors, personal mobile phones, etc.), agricultural inventory (e.g., seed containers, chemical/fertilizer containers, etc.), livestock (e.g., individual hogs, cattle, chickens, etc.) livestock equipment (e.g., livestock holding areas, loading chutes, scales, etc.), transport equipment (e.g., cargo containers, belt loaders, etc.), warehouse inventory (e.g., pallets, shipping containers, forklifts, shelves, etc.), raw materials (e.g., felled trees, mined minerals, etc.), construction equipment (e.g., trailers, pumps, excavators, etc.) and the like.

While much of the present disclosure focuses on "entities" in the agricultural context, this is done merely for illustrative purposes, and is not to be understood as a limitation on the present disclosure. In this regard, it is noted herein that the systems and methods of the present disclosure may be useful and may be implemented in a wide variety of environments outside of the agricultural context.

It is currently difficult to track inventory, associated input costs, and machines from one area on a farm down to the area where that entity is used. Similarly, it is currently difficult to track inventory on a farm down to the area where the inventory is actually consumed. It is believed that smarter methods are possible which would connect the interaction of "entities" utilizing proximity sensing to automate otherwise repetitive, tedious, and error-prone tasks.

It is recognized herein that proximity sensing may be used to establish a virtual association between two or more entities or devices. This association can then be associated with many different properties, including: a) time b) location c) people d) proximity of other entities, e) other linked "entities," f) properties/measurements of entities equipped with sensors, and the like. These associations become extremely powerful when they can be tracked in real time. Furthermore, these associations may provide valuable information when they are correlated to other external data sources, such as precision agricultural data.

Associations between entities may be used to track many tasks and operations. For example, these associations may be used to, but are not limited to, track equipment usage, reconcile man hours, reconcile inventory usage, and the like. For instance, an association between farm equipment and a user's cell phone may be used to reconcile man hours. By way of another example, an association between a tractor and a tank as the tractor pulls the tank throughout a field may be identified as an "fertilizing operation" and used to reconcile machine time for both the tractor and the tank, and may be used to reconcile how long the fertilization operation was carried out in each field, part of a field, etc. In this regard, it is contemplated that the present disclosure may allow for input cost allocation across smaller land areas, track harvested crop mass/volume (e.g., cost/acre, cost/ha, cost/bu, cost/kg).

For instance, the system of the present disclosure may identify an association (e.g., spatial relationship) between a tractor and a planter (e.g., Association 1). As the tractor and the planter remain in an association for an extended period of time, and as Association 1 moves throughout a field, the system of the present disclosure may determine that Association 1 is carrying out a planting operation (e.g., Operation 1). As a farm owner, one important metric for determining the efficiency of the tractor and the planter are their respective costs as compared to their hours of operation. In this instance, the tractor amortized over 5 years has an average annual cost of $31,000 and the planter amortized over 3 years has an average annual cost of $24,000. The cost of running the tractor and planter (e.g., the cost of Operation 1) per hour equals $31,000/total tractor hours+$24,000/total planter hours. Therefore, the cost of Operation 1 would be $55,000/hours of running Operation 1. In this regard, if the Operation 1 were each operated for 250 hours, this would mean that Operation 1 (e.g., planting) would cost $220/hour of Operation 1 ($55,000/250 hrs=$220/hr).

The relationships between "entities," "associations," and "operations," as well as the attendant advantages that come with relating each of the aforementioned to one another, may be further described in terms of "atoms", "molecules," and "polymers," and with further reference to FIG. 1.

FIG. 1 illustrates a graphical display of a geo-fenced area 156, in accordance with one or more embodiments of the present disclosure.

By way of example, consider a tractor moving by itself through a field. As a sole entity, the tractor may be considered an "atom." Data points associated with the tractor (e.g., atom) may include any number of metrics relating to the state of the tractor (e.g., atom) at a single point in time including, but not limited to, the tractor's speed, fuel level, and position.

By way of another example, and with reference made to FIG. 1, consider a tractor pulling a planter through a field, which may be delineated by a pre-defined geo-fenced boundary 156. When the tractor (e.g., an "atom") and the planter (e.g., an "atom") come into close proximity with one another, they may form a spatial relationship (e.g., an association), thereby forming a "molecule." In this regard, a "molecule" may be defined as two entities (e.g., atoms) in a spatial relationship with one another. Data points 150 for the tractor/planter association (e.g., molecule) may include any number of metrics relating to the state of the tractor/planter molecule at a single point in time including, but not limited to, tractor speed, tractor fuel level, planter seed level, and the like. As the tractor/planter molecule move throughout the pre-defined geo-fenced boundary 156, data points 150a, 150b, 150n may be collected at any interval (e.g., regular intervals, random intervals, and the like).

Continuing with the same example, consider the tractor/planter molecule moving throughout the field (e.g., pre-defined geo-fenced boundary 156). The addition of time and location data may thereby turn data points 150 for the tractor/planter molecule into a "polymer segments" (e.g., polymer segments 152). In this regard, a polymer segments 152a, 152b, 152c, 152n connect data points 150. For example, if data points 150 were collected for the tractor/planter polymer every ten seconds, the distance by which first data point 150a and second data point 150b are separated would be dependent on the speed of the tractor/planter molecule. By determining the locations of the first data point 150a and the second data point 150b, several metrics for polymer segment 152a would be able to be determined including, but not limited to, the tractor's speed throughout the ten-second span, the difference in the tractor's fuel level throughout the ten-second span, the difference in the planter's seed level throughout the ten-second span, the fuel efficiency of the tractor throughout the ten-second span, and the like.

Furthermore, polymer segments 152 may be analyzed such that each polymer segment 152 has an associated cost. By way of example, as the tractor/planter molecule moves throughout the field, a first data point 150a and a second data point 150b may be collected for the tractor/planter molecule. By determining the difference in tractor fuel levels and planter seed levels between the first data point 150a and the second data point 150b, and by multiplying these differences in the respective costs of fuel and seed, the cost associated with polymer segment 152 may be determined. The associated cost for each polymer segment may be more accurately determined by factoring in additional factors including, but not limited to, equipment depreciation between first data point 150a and second data point 150b, associated employee wages for the respective time period, and the like.

Continuing with the same example, polymer segments 152a, 152b, 152c, 152n may be grouped together to form a single "polymer" (e.g., polymer 154). The tractor/planter polymer 154 may be regarded as a single planting operation for the area contained within the pre-defined geo-fenced area 156.

It is noted herein that collecting data at multiple hierarchy granularity levels (e.g., by data points, polymer segments, and polymers) may allow a farm owner to break down fuel, cost, and material allocations. Furthermore, collecting data points more or less frequently (e.g., greater or fewer data points 150) may allow a farm owner to further modify the granularity level and further refine break-downs for fuel, cost, and materials. It is further noted that collecting data at multiple hierarchy granularity levels may allow a farm owner to break down fuel, cost, and material allocations down by area, from the field level, sub-field level, and the like.

In one embodiment, the present disclosure utilizes a series of scanners and/or beacons (generally referred to as "communication devices") on multiple entities in order to automatically obtain and record spatial relationship data via proximity sensing. It is noted that beacons and scanners may refer to any transmitting, receiving, and/or transceiving device(s) capable of transmitting and/or receiving electromagnetic signals. In this regard, beacons and sensors may transmit any wired or wireless signal known in the art including, but not limited to, radio signals, WiFi signals, Bluetooth signals, 3G signals, 4G signals, 4G LTE signals, 5G signals, and the like. Those skilled in the art will recognize that a wide variety of transmitting and transceiving devices may be used without departing from the spirit and scope of the present disclosure.

In one embodiment, the present disclosure may include a first communication device (e.g., a beacon or scanner) associated with a first entity, and an additional communication device (e.g., a scanner) associated with an additional entity. In another embodiment, the first communication device and the additional transmitting device are communicatively couplable (e.g., the beacon and the scanner are communicatively couplable). In another embodiment, the system of the present disclosure is configured to identify associations (e.g., spatial relationships) between the first communication device and the additional communication device. In this regard, the system of the present disclosure may be used to track associations (e.g., spatial relationships) between various agricultural entities including, but not limited to, people, vehicles, tractors, planters, trailers, tanks, and the like.

It is noted that a substantial amount of information may be obtained simply by tracking entities' proximity to each other. For example, a farm owner may attach a first communication device (e.g., a scanner) to a tractor, and an additional communication device (e.g., a cell phone) may track the location of an employee. Simply by tracking the spatial relationship between the tractor and the employee (via the two transmitting devices), the farm owner may be able to determine the amount of time an employee spent working on/with the tractor. For instance, the tractor's communication device, or the employee's cell phone, may transmit and/or store in memory the time in which the two entities (the tractor and the employee) were within twenty feet of one another. In this regard, the two communication devices may transmit and/or store in memory the time in which the two communication devices formed an association. By tracking and storing the association information, a farm owner may be able to determine when and how long the employee was working on/with the tractor. This information may subsequently be used to reconcile employee hours and/or pay.

By way of another example, communication devices may be placed on a fuel tank, on a tractor, and on an employee (via the employee's cell phone), respectively. For instance, a beacon may be placed on the fuel tank, a first scanner may be placed on the tractor, and the employee's cell phone may function as a second scanner. When employee comes within a specified distance of the tractor, the scanner on the tractor and the employee's cell phone may identify that the employee and the tractor are in a spatial relationship, and therefore form an association (Association 1). When the employee drives the tractor within a certain proximity to the beacon on the gas tank, the system of the present disclosure may detect a spatial relationship between the three communication devices (e.g., the scanner on the tractor, the employee's cell phone, and the beacon on the gas tank). In this regard, the system of the present disclosure may identify that the three communication devices form a single association (Association 2). By identifying this association, a farm owner may be able to determine that a particular employee (associated with the employee's cell phone) fueled up the tractor (associated with the scanner on the tractor) with a particular gas tank (associated with the beacon on the tank) at a particular time.

In another embodiment, the present disclosure may simplify data tracking and analysis by grouping recurring associations (e.g., spatial relationships) into "operations." For instance, referring again to the example above, the association between the employee, the tractor, and the gas tank may exist for a period of ten minutes (e.g., the approximate length of time necessary to fuel the tractor). After ten minutes, the three-way association (e.g., Association 2: the association between the tractor, employee, and the gas tank) may disassociate, giving way to the single two-way association (Association 1) between the tractor and the employee (suggesting the employee has completed fueling and is driving away). In this regard, by adding the time related to the three-way association, the system of the present disclosure may group the association including the employee, the tractor, and the gas tank into a single "fueling operation." It is noted that grouping various recurring spatial relationships may allow a user to more accurately and efficiently track and analyze large volumes of data.

Continuing with the same example, it has been previously noted herein that scanners and beacons may be configured not only to transmit unique IDs to identify the entities with which they are related, but to also receive and transmit data relating to the entities. In this regard, the scanner on the tractor may be configured to transmit tractor data including, but not limited to, its fuel level. Similarly, the beacon on the gas tank may be configured to transmit gas tank data inducing, but not limited to, the type of gas in the tank and the fuel level of the tank. In this regard, as the fueling operation continues over time, the tractor scanner and fuel tank beacon may transmit their respective fuel levels. In this regard, the system of the present disclosure may be used as a check for farm owners, allowing the farm owner to ensure that the fuel removed from the gas tank matches the fuel added to the tractor (e.g., ensure employees are not taking fuel for personal use). Furthermore, tracking the amount of fuel used by each entity throughout a given period of time may help a farm owner reconcile fuel usage across the farm.

Figure 2:
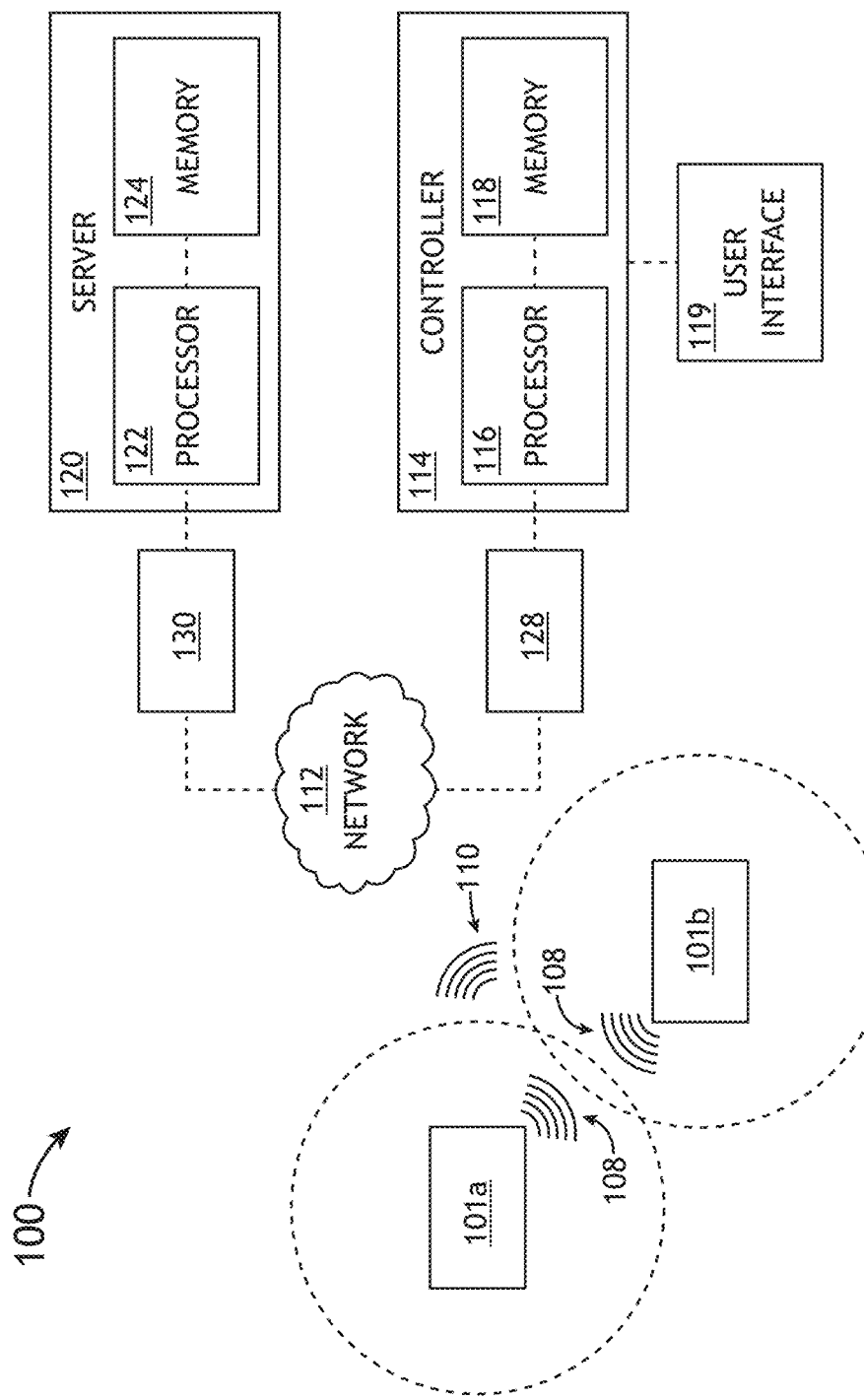
FIG. 2 illustrates a system determining spatial relationships between entities, in accordance with one or more embodiments of the present disclosure.

FIG. 2 illustrates a system 100 for determining spatial relationships between entities, in accordance with one or more embodiments of the present disclosure. In one embodiment, system 100 includes a first communication device 101a, an additional communication device 101b, a network 112, a server 120, a controller 114, and a user interface 119.

It is contemplated herein that the first communication device 101a and the additional communication device 101b may correspond to separate entities. For example, first communication device 101a may correspond to a person (e.g., first communication device 101a may be include employee's cell phone), and the additional communication device 101b may correspond to tractor.

In one embodiment, the first communication device 101a and the additional communication device 101b may be configured to transmit entity ID signals 108. Entity ID signals 108 may be encoded with data including, but not limited to, unique entity identifiers (e.g., entity IDs), communication device 101 data (e.g., first communication device 101a battery health, additional communication device 101b battery health, and the like), and the like.

In another embodiment, first communication device 101a and the additional communication device 101b may include one or more sensors configured to collect data. Data collected by the one or more sensors of the first communication device 101a and/or the additional communication device 101b may include data regarding the surrounding environment (e.g., temperature, pressure, humidity, and the like), data associated with the entities with which the first communication device 101a and the additional communication device 101b are associated, and the like. By way of example, if the first communication device 101a were associated with a tractor, one or more sensors of first communication device 101a may collect data regarding the speed of the tractor, the fuel level of the tractor, the mileage of the tractor, and the like. In this regard, it is contemplated that entity ID signals 108 may include data collected by the first communication device 101a and the additional communication device 101b.

In another embodiment, first communication device 101a and the additional communication device 101b may include a controller including one or more processors and memory. The memory may be configured to store data of system 100 including, but not limited to, collected data, data received via entity ID signals 108, and the like. In another embodiment, the first communication device 101a and/or the additional communication device 101b may include GPS circuitry configured to receive GPS positional information. In this regard, one or more processors of first communication device 101a and/or the additional communication device 101b may be configured to extract GPS positional information received from the GPS circuitry to determine the GPS position of first communication device 101a and/or the additional communication device 101b.

It is noted herein that system 100 is not limited to the configuration depicted in FIG. 2 depicting a first communication device 101a and the additional communication device 101b. In this regard, system 100 may include any n number of communication devices 101 (e.g., nth communication device 101n) without departing from the spirit and scope of the present disclosure.

In one embodiment, the first communication device 101a and the additional communication device 101b are directly or indirectly coupled to a server 120 and a controller 114 via a network 112. In this regard, first communication device 101a and/or the additional communication device 101b may include network interface circuitry. It is noted herein that the network interface circuitry of first communication device 101a and/or additional communication device 101b may include any network interface for interacting with a network 112 known in the art. In another embodiment first communication device 101a and/or the additional communication device 101b may be configured to transmit network signals 110 to network 112. In one embodiment, network signals 110 may include any data stored in the memory of first communication device 101a and/or the additional communication device 101b. For example, network signals 110 may include, but are not limited to including, data associated with entity ID signals 108 received from other communication devices, data collected by one or more sensors of first communication device 101a and/or the additional communication device 101b, and the like.

It is noted that a network interface (not shown) of first communication device 101a and/or the additional communication device 101b may include any network interface device suitable for interfacing with network 112. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, LTE, WiFi protocols, RF, LoRa, and the like.

As noted previously herein, communication devices 101 may be directly or indirectly communicatively coupled to network 112. In this regard, communication devices 101 may be communicatively coupled to one or more devices, which may then be directly or indirectly communicatively coupled to network 112. For example, as described in further detail herein with respect to FIG. 5E, communication devices 101 may be communicatively coupled to a base station device 140, wherein the base station device 140 is communicatively coupled to network 112. In this example, base station device 140 may be located in a centralized location with respect to the communication devices 101, such as atop a fence post, on top of a barn, and the like.

In another embodiment, network 112 may be configured to receive network signals 110 transmitted by first communication device 101a and/or the additional communication device 101b. It is noted herein that network 112 may include any wireless and/or wireline network protocol known in the art. For example, the network 112 may include, but is not limited to, an internet or an intranet (e.g., LAN, WLAN and the like). By way of another example, network 112 may include a cloud-based architecture.

In another embodiment, system 100 includes a server 120 including one or more processors 122 and memory 124. In another embodiment, server 120 is communicatively coupled to the communication devices via network 112 via a network interface 130. The network interface 130 may include any network interface device known in the art. For instance, the network interface 130 may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, 4G, 4G LTE, 5G, Wi-fi protocols, and the like. By way of another example, server 120 may include a cloud based architecture.

In one embodiment, one or more processors 122 of server 120 are configured to execute a set of program instructions stored in memory 124. In one embodiment, the one or more processors 122 are configured to carry out one or more steps of the present disclosure.

In one embodiment, the one or more processors 122 are configured to cause the server 120 to receive data stored in network signals 110 via network 112. In another embodiment, the one or more processors 122 are configured to identify associations (e.g., spatial relationships) between two or more entities. In another embodiment, the one or more processors 122 are configured to store association data (e.g., spatial relationship data) in memory 124. In another embodiment, the one or more processors 122 are configured to identify operations based on the received association data. In another embodiment, the one or more processors 122 are configured to store operation data in memory 124. In another embodiment, the one or more processors 122 are configured to initiate a catalyst in order to more accurately and/or efficiently identify operations. In another embodiment, the one or more processors 122 are configured to analyze received data relative to pre-defined geo-fenced boundaries.

In one embodiment, the one or more processors 122 are configured to cause the server 120 to receive data stored in network signals 110 via network 112. In one embodiment, the one or more processors 122 of server 120 are configured to identify associations (e.g., spatial relationships) between communication devices (e.g., association between the first communication device 101a and the additional communication device 101b, and the like). As noted previously herein, an association refers to a group of two or more entities which occupy the same space. Due to the fact that each entity may correspond to an individual communication device (e.g., a first entity with the first communication device 101a, a second entity with the second communication device 101b) the one or more processors 122 may be configured to identify an association between two or more entities when the two or more entities are within a specified distance of one another. In this regard, a spatial relationship between two or more entities (e.g., an association) may include, but is not limited to, relative distances between two or more communication devices corresponding with two or more entities.

In one embodiment, the one or more processors 122 may identify an association (e.g., spatial relationship) between the first communication device 101a and the additional communication device 101b based on GPS positioning data received by the first communication device 101a and/or the additional communication device 101b. After receiving the GPS positions of the first communication device 101a and the additional communication device 101b via network 112, the one or more processors 122 may then be configured to determine the distance between the first communication device 101a and the additional communication device 101b to determine whether the two communication devices are in close enough proximity to be in an association (e.g., in a spatial relationship). In this same regard, the one or more processors 122 may be configured to determine the distances between the first communication device 101a and the additional communication device 101b in order to identify associations between each respective communication device.

By way of another example, if the entity ID signals 108 and/or network signals 110 do not include GPS data indicating the GPS position of the first communication device 101a and/or the additional communication device 101b, system 100 may still be configured to identify spatial relationships between the respective communication devices based on the Relative Received Signal Strength (RSSI) values of the entity ID signals 108 and/or network signals 110. Those skilled in the art will recognize that RSSI values may be inversely related to the distance between the first communication device 101a and the additional communication device 101b. In this regard, it is noted that entity ID signals 108 transmitted by a first communication device 101a which are in close proximity to the additional communication device 101b may exhibit high RSSI values. Conversely, it is noted that entity ID signals 108 transmitted by a first communication device 101a which is far away from the second communication device 101b may exhibit low RSSI values. In this regard, one or more processors 122 may be configured to determine the relative distance between first communication device 101a and the additional communication device 101b based on the RSSI value of the entity ID signals 108 by associating high RSSI values with close spatial relationships (e.g., short distances), and low RSSI values with larger spatial relationships (e.g., longer distances).

It is noted herein that the determination of spatial relationships between two or more communication devices is not limited to a determination based on RSSI values. In this regard, it is contemplated that any proximity-based algorithm or method known in the art may be used without departing from the spirit and scope of the present disclosure.

It is noted herein that the one or more processors 122 of the server 120 may be configured to identify associations between two or more communication devices based on pre-defined distances. For example, an association between a person (e.g., first communication device 101a) and a trailer (e.g., additional communication device 101b) may be defined as existing when first communication device 101a and the additional communication device 101b are within fifteen feet of each other. By way of another example, the association between the person (e.g., first communication device 101a) and the trailer (e.g., additional communication device 101b) may be defined as existing first communication device 101a and the additional communication device 101b are within fifty feet of each other. It is noted herein that the distances required for the identification of an association may be dependent on several factors, including, but not limited to, the type of entities involved, the location of the entities, and the like. For example, a person (corresponding to a first communication device 101a) may not operate a tractor (corresponding to a additional communication device 101b) without being in or directly on the tractor. As such, an association between the person (e.g., first communication device 101a) and the tractor (e.g., additional communication device 101b) may be defined as existing when first communication device 101a and the additional communication device 101b are within five feet of each other. On the other hand, in order to load a tractor (corresponding to a first communication device 101a) with contents contained on a pallet (corresponding to an additional communication device 101b), the tractor may be parked fifteen feet from the pallet. As such, an association between the tractor and the pallet may be defined as existing when first communication device 101a and the additional communication device 101b are within twenty feet of each other.

In another embodiment, the one or more processors 122 are configured to store association data (e.g., spatial relationship data) in memory 124. Association data may include, but is not limited to, the GPS position of each entity in the association (e.g., GPS position of first communication device 101a, GPS position of additional communication device 101b, and the like), entity data (e.g., fuel level of entity, speed of entity, and the like), surrounding environment data (e.g., temperature, pressure, moisture, and the like) and the like. In one embodiment, all data transmitted and stored in memory 124 is time-stamped.

In another embodiment, the one or more processors 122 of server 120 may be configured to filter and/or sort entity and association data in memory 124 using any sorting or filtering operation known in the art. For example, the one or more processors 122 may be configured to sort association data in memory 124 based on each identified association. For example, the one or processors 122 may sort association data in memory 124 in a database according to entity and/or association (e.g., Entity 1, Entity 2, Entity n, Association 1, Association 2, Association n).

In another embodiment, the one or more processors 122 may be configured to identify operations based on the received association data. As noted previously herein, an "operation" refers to an association as it moves through time and space. For example, a user (e.g., a first communication device 101a), tractor (e.g., an additional communication device 101b), and planter (e.g., an nth communication device 101n) may form an association (e.g., Association 1) when they are in a spatial relationship with one another. As Association 1 continues over time, and as Association 1 moves throughout a field, it could be determined that Association 1 is performing a planting "operation." This planting operation may simply be referred to as Operation 1.

In this regard, the one or more processors 122 may be configured to identify and store operation data in memory 124. As noted previously herein, the one or more processors 122 may be configured to store operation data in memory 124 using any sorting/filtering operation known in the art. For example, the one or more processors 122 may sort operation data in memory 124 in a database according to each identified operation (e.g., Operation 1, Operation 2, Operation n).

In another embodiment, the one or more processors 122 may be configured to initiate a catalyst in order to more accurately and/or efficiently identify operations. As noted previously herein, the term "catalyst," as it applies to the present disclosure, refers to software and/or hardware processes or systems which serve to expedite the process of identifying operations. Catalysts may include, but are not limited to, machine learning algorithms, smartphone applications (e.g., a "chatbot app"), and the like. For example, the one or more processors 122 may identify an association (Association 1) between a user (e.g., first communication device 101a), a tractor (e.g., an additional communication device 101b), and a planter (e.g., an nth communication device 101n). Upon identifying Association 1, the one or more processors 122 may be configured to cause the server to send a query to a chatbot app on the user's cell phone (e.g., first communication device 101a). The chatbot app may display a query to the user asking the user whether the user is performing a planting operation, whereby the user may confirm or deny that a planting operation is being performed. If the user responds "Yes," the one or more processors 122 may be configured to identify Association 1, as it moves throughout space and time, as a "Planting Operation" (e.g., Operation 1). In this regard, the one or more processors may be configured to collect and store Operation 1 data in memory 124.

In another embodiment, the one or more processors 122 may be configured to analyze received data relative to pre-defined geo-fenced boundaries. As noted previously herein, the terms "geo-fence," "geo-fenced boundary," and "geo-fenced area," as they apply to the present disclosure, refer to a geographical area defined by a series of GPS coordinates. It is contemplated that a user may define one or more geo-fenced boundaries as areas in which the user desires to track associations and operations. For example, a user may define the outer perimeter of a field as a first geo-fenced boundary defining a first geo-fenced area, and the one or more processors 122 may store the first geo-fenced boundary in memory 124. In this same manner, the user may define the perimeter of a second field as a second geo-fenced boundary defining a second geo-fenced area, and the one or more processors 122 may store the second geo-fenced boundary in memory 124. In this regard, it is contemplated that the one or more processors 122 may be configured to analyze received entity, association, and operation data relative to the pre-defined geo-fenced boundaries.

For example, the one or more processors 122 may be configured to determine whether a particular association is located within or outside particular geo-fenced boundaries. By way of another example, as Operation 1 (e.g., a planting operation) moves throughout a first field (defined by a first geo-fenced boundary), the one or more processors 122 may be configured to analyze whether Operation 1 remains in the first field, or crosses the geo-fenced boundary into a second field defined by a second geo-fenced boundary.

It is contemplated that the one or more processors 122 may store geo-fencing data in memory 124 along with the stored entity, association, and operation data. For example, a database of operation data may include, but is not limited to including, the entity data of the entities in the operation, time-stamped data, position of the operation relative to geo-fenced boundaries, and the like. In this regard, it is contemplated that system 100 may be used to track the movements of entities, associations, and operations over time relative to geo-fenced boundaries.

In another embodiment, system 100 includes a controller 114 communicatively coupled to the server 120 via network 112 and network interface 128. The network interface 128 may include any network interface device known in the art. For instance, the network interface device 128 may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, 4G, 4G LTE, 5G, Wi-fi protocols, and the like.

In one embodiment, controller 114 includes one or more processors 116 and memory 118. In another embodiment, the one or more processors 116 may be configured to execute a set of program instructions stored in memory 118, wherein the set of program instructions are configured to cause the one or more processors 116 to carry out the steps of the present disclosure. It is noted herein that the discussion herein regarding server 120, one or more processors 122, and memory 124 may also be regarded as applying to controller 114, one or more processors 116, and memory 118, unless noted otherwise herein.

It is noted herein that the one or more components of system 100 may be communicatively coupled to the various other components of system 100 in any manner known in the art. For example, the one or more processors 122, 116 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

In one embodiment, a user interface 119 is communicatively coupled to the controller 114. In one embodiment, the user interface 119 includes a display used to display data of the system 100 to a user. The display of the user interface 119 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 119 is suitable for implementation in the present disclosure. In another embodiment, a user may input selections and/or instructions responsive to data displayed to the user via the user interface 119.

In another embodiment, the user interface 119 may include, but is not limited to, one or more desktops, laptops, tablets, smartphones, smart watches, or the like. In one embodiments, a user may use the user interface 119 in order to view entity, association, operation, GPS, and geo-fenced data stored in memory 124 of server 120 or stored in memory 118 of controller 114. For example, a farm owner may desire to go back and reconcile fuel usage across the farm at the end of a month. The farm owner may have a first gas pump corresponding to a first communication device 101a and a second gas pump corresponding to an additional communication device 101b. Using a computer or smart phone (e.g., user interface 119), the farm owner could review all the association data (e.g., spatial relationship data) in which first communication device 101a and the additional communication device 101b were associated. For instance, pulling up all association data for the first communication device 101a, the farm owner may determine that the first gas pump (e.g., first communication device 101a) was in an association with fifteen vehicles throughout the month. Through the user interface 119, the owner could review, among other things, which vehicles were fueled with which fuel tanks at particular times throughout the month.

It is noted herein that a wireless electronics device (e.g., a cell phone, tablet, smart watch, and the like) may serve both as a communication device 101 and as a controller 114/user interface 119. For example, a user may have their smartphone on them as they work in a field. The smartphone may act as communication device 101 which identifies an entity (e.g., the user). Additionally, the user's smartphone may act as a user interface 119 with which the user may access data stored on memory 124 of server 120 via network 112.

In another embodiment, user interface 119 may be used to deliver alerts to a user. Alerts delivered to the user interface 119 may include, but are not limited to, text messages, automated phone calls, emails, banners, messages via applications ("Apps"), chatbot apps, or the like. It is contemplated that the one or more processors 122, 116 may be configured to deliver an alert to the user interface 119 in varying situations. For example, the one or more processors 122, 116 may be configured to execute a set of program instructions stored in memory 124, 118 which cause the user interface 119 to display an alert of a certain spatial relationship. For instance, a tractor equipped with a first communication device 101a may come in close proximity to gas tank with an incorrect type of fuel equipped with an additional communication device 101b. In this example, an association between the tractor (e.g., first communication device 101a) and gas tank (e.g., additional communication device 101b) may be determined, suggesting that fueling is or is about to take place. After detecting an improper association (e.g., spatial relationship between an incorrect gas tank for the particular tractor), the one or more processors 122, 116 may cause the user interface 119 to display an alert informing a user that someone may be attempting to fuel the tractor with the incorrect fuel. It is noted that such alerts may prevent wasting resources and prevent property damages.

By way of another example, one or more geo-fenced boundaries may be stored in memory 124, 118. Geo-fenced boundaries may be associated with an entire farm, particular fields, and the like. In this example, a user interface 119 may display an alert informing a user that a vehicle equipped with a first communication device 101a has left a geo-fenced boundary. By way of another example, a user interface 119 may display an alert that a particular bag of fertilizer equipped with an additional communication device 101b has entered a geo-fenced boundary associated with the improper field for that bag of fertilizer. In this example, the alert on the user interface 119 may inform a user that the user, or a third person, may be attempting to use the fertilizer on an incorrect field.

Figure 3:
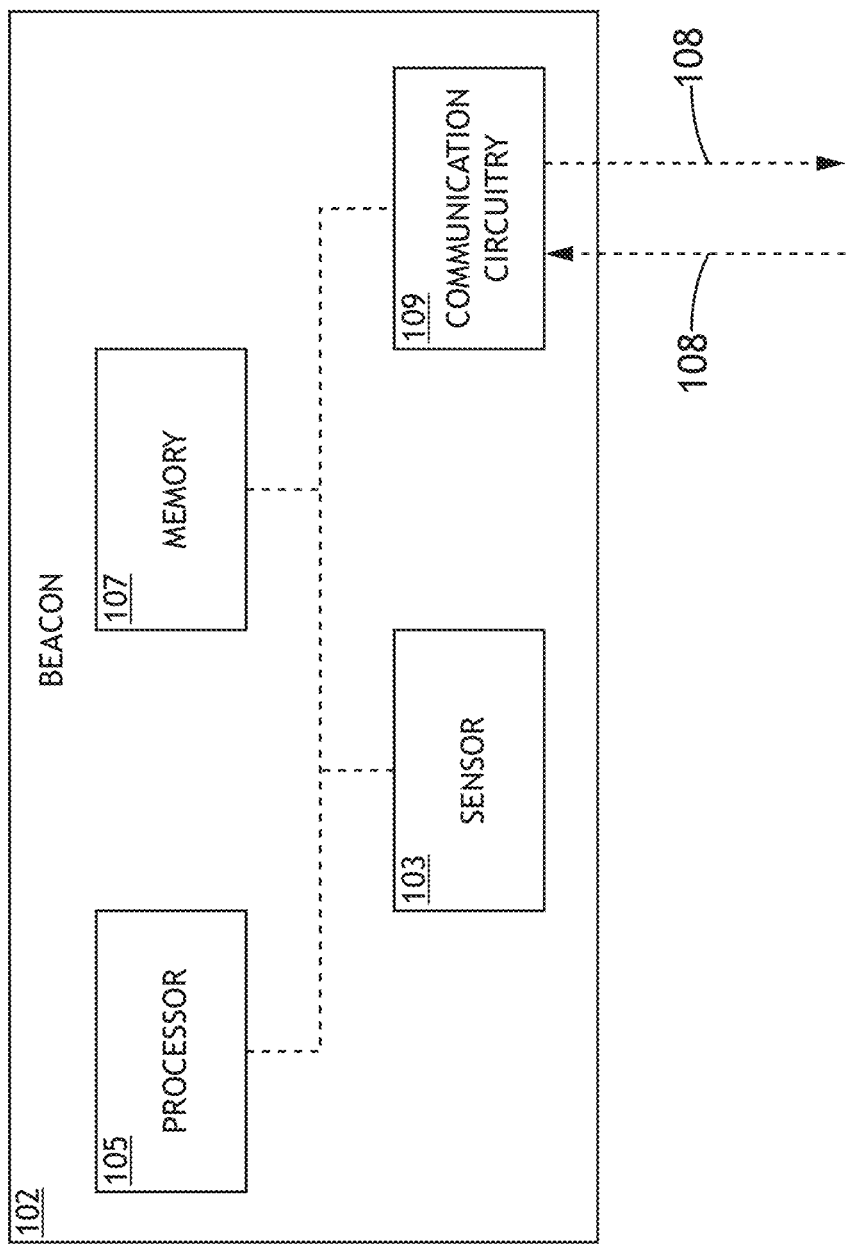
FIG. 3 illustrates a simplified block diagram of a beacon for determining spatial relationships between entities, in accordance with one or more embodiments of the present disclosure.

FIG. 3 illustrates a simplified block diagram of a beacon 102 for determining spatial relationships between entities, in accordance with one or more embodiments of the present disclosure. In one embodiment, beacon 102 includes one or more sensors 103, one or more processors 105, memory 107, and communication circuitry 109.

It is contemplated herein that one or more communication devices 101 of system 100 may include one or more beacons 102, as depicted in FIG. 3. By way of example, the additional communication device 101b may include beacon 102. However, it may be appreciated that communication devices 101 are not limited to the configuration of the beacon 102 depicted in FIG. 3.

In one embodiment, beacon 102 may be configured to be placed on or within an entity such that the beacon 102 may be regarded as corresponding with the entity and identifying the entity itself. For example, a beacon 102 placed on a tractor may be regarded as identifying the tractor. In this regard, it is noted that beacon 102 may include mechanical components and/or electrical circuitry configured to mechanically and/or communicatively couple the beacon 102 to a particular entity (e.g., tractor, fuel tank, bailer, trailer, and the like). In this regard, it is noted that beacon 102 may be affixed to entities using any method known in the art including, but not limited to, adhesives, welding, straps, bolts, containment structures, and the like. Alternatively, it is contemplated that beacon 102 may be placed within an entity.

In another embodiment, beacon 102 may include one or more sensors 103. In one embodiment, the one or more sensors 103 may be configured to receive information associated with the surrounding environment and/or information associated with the entity corresponding to the beacon 102 (e.g., telemetry from an entity connected wired or wirelessly to the beacon 102). For example, if beacon 102 were placed on/within a fuel tank, the one or more sensors 103 may be configured to collect data including, but not limited to, the level of the fuel tank, the type of fuel within the tank, the temperature of the tank, the temperature of the surrounding environment, and the like. It is noted herein that the one or more sensors 103 may include any sensors known in the art. For example, the one or more sensors 103 may include, but are not limited to, one or more motion sensors (e.g., accelerometers), one or more temperature sensors (e.g., RTDs, thermocouples, etc.), one or more light sensors (e.g., diode, CCD, and etc.), one or more moisture sensors, and the like. Furthermore, the one or more sensors 103 of beacon 102 may include any sensors known in the art used to measure any characteristic or quality of the entity with which the beacon 102 corresponds. For example, if beacon 102 were attached to a tractor, the one or more sensors 103 may be configured to collect data regarding, among other characteristics, tractor make/model, fuel levels, mileage, and the like.

While FIG. 3 depicts beacon 102 as including one or more sensors 103, this is not to be regarded as a limitation of the present disclosure. In this regard, it is noted that beacon 102 need not include one or more sensors 103, and that beacon 102 may optionally not include one or more sensors 103 without departing from the spirit and scope of the present disclosure.

In another embodiment, beacon 102 may include one or more processors 105. In another embodiment, the one or more processors 105 may be configured to execute a set of program instructions stored on memory 107, wherein the set of program instructions are configured to cause the one or more processors 105 to carry out the various steps of the present disclosure.

In one embodiment, the one or more processors 105 may be configured to receive data from the one or more sensors 103. In another embodiment, the one or more processors 105 may be configured to time-stamp the data received from the one or more sensors 103 and store the time-stamped data in memory 107.

In another embodiment, beacon 102 may include communication circuitry 109. Communication circuitry 109 may include any communication circuitry known in the art. By way of example, communication circuitry 109 may include a receiver, a transmitter, and/or a transceiver. In one embodiment, communication circuitry 109 may be configured to transmit entity ID signals 108, wherein entity ID signals 108 include a unique identifier which may be used to uniquely identify the entity with which the beacon 102 corresponds. For example, if beacon 102 were placed on/within a fuel tank, communication circuitry 109 may be configured to transmit entity ID signals 108, wherein entity ID signals 108 include a unique identifier (ID) which may be used to uniquely identify the fuel tank (e.g., Fuel Tank ID: 10954). In another embodiment, communication circuitry 109 may be configured to transmit entity ID signals 108, wherein entity ID signals 108 include data associated with the beacon 102 and/or the entity with which the beacon 102 corresponds. For example, communication circuitry 109 may be configured to transmit signals 108, wherein entity ID signals 108 include data including, but not limited to, beacon battery health, beacon signal strength, and the like. By way of another example, if beacon 102 were placed on/within a fuel tank, entity ID signals 108 may include data relating to the fuel tank including, but not limited to, the type of fuel in the tank, the level of the fuel tank, humidity level, surrounding temperature, and the like.

It is noted herein that entity ID signals 108 may include any type of signals known in the art. For example, communication circuitry 109 may be configured to transmit any type of entity ID signal 108 including, but not limited to, RF signals, Bluetooth signals, WiFi signals, 3G signals, 4G signals, 4G LTE signals, 5G signals, wireline signals, and the like. In another embodiment, communication circuitry 109 may be configured to receive entity ID signals 108 from other communication devices.

In another embodiment, communication circuitry 109 may transmit entity ID signals 108 at any interval known in the art including, but not limited to, continuously, substantially continuously, regular intervals, irregular intervals, and the like. For example, communication circuitry 109 may be configured to transmit entity ID signals 108 continuously. By way of another example, communication circuitry 109 may be configured to transmit entity ID signals 108 every two minutes. In another embodiment, when beacon 102 is out of range, blocked by physical structures, impeded by weather phenomena, or otherwise unable to transmit entity ID signals 108, the one or more processors 105 may be configured to store data in memory 107 until such time that communication circuitry 109 is able to transmit entity ID signals 108. For example, if beacon 102 were out of range and unable to transmit entity ID signals 108, one or more processors 105 may be configured to store data in memory 107 while the beacon 102 is out of range. When the beacon 102 returns within range and/or the communication circuitry 109 otherwise regains the ability to transmit entity ID signals 108, the one or more processors 105 may cause the communication circuitry 109 to receive the data stored in memory 107 and transmit the data via entity ID signals 108.

Figure 4:
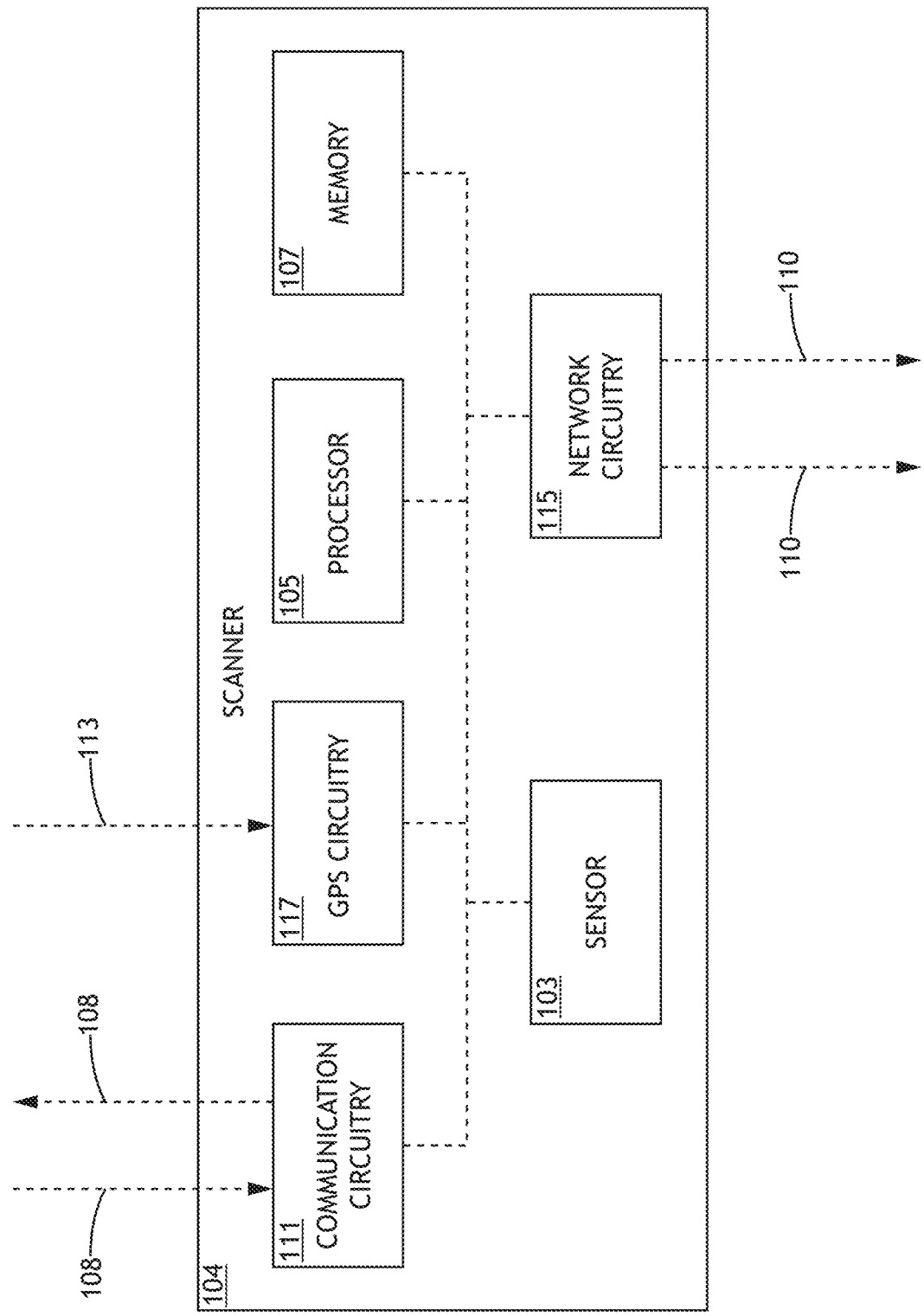
FIG. 4 illustrates a simplified block diagram of a scanner for determining spatial relationships between entities, in accordance with one or more embodiments of the present disclosure.

FIG. 4 illustrates a simplified block diagram of a scanner 104 for determining spatial relationships between entities, in accordance with one or more embodiments of the present disclosure. In one embodiment, scanner 104 includes one or more sensors 103, one or more processors 105, a memory 107, communication circuitry 111, GPS circuitry 117, and network circuitry 115.

It is contemplated herein that one or more communication devices 101 of system 100 may include one or more scanners 104, as depicted in FIG. 4. By way of example, the first communication device 101a may include scanner 104. By further way of example, the first communication device 101a may include a scanner 104, and the additional communication device 101b may include a beacon 102. However, it may be appreciated that communication devices 101 are not limited to the configuration of the beacon 102 and or the scanner 104 depicted in FIGS. 3 and 4.

It is noted herein that the discussion associated with beacon 102 in FIG. 3 may be regarded as applying to scanner 104 in FIG. 4, unless noted otherwise herein.

In one embodiment, communication circuitry 111 may be configured to receive entity ID signals 108 including, but not limited to, one or more signals transmitted from one or more other communication devices 101 (e.g., beacons 102 other scanners 104, and the like). In another embodiment, GPS circuitry 117 may be configured to receive GNSS signals 113 including global position information from a global position system (e.g., GPS, GNSS, GLONASS and the like). In this regard, GPS circuitry 117 may be configured to receive GPS positional data regarding the position of scanner 104. It is noted herein that, communication circuitry 111, GPS circuitry 117, and network circuitry 115 may include any communication circuitry known in the art, including receivers, transmitters, transceivers, and the like. Furthermore, communication circuitry 111, GPS circuitry 117, and network circuitry 115 may be contained separately as distinct components or, additionally and/or alternatively, may be combined in one or more common housings (e.g., one or more common receivers, one or more common transmitters, one or more common transceivers, and the like) without departing from the spirit and scope of the present disclosure.

In one embodiment, communication circuitry 111 may be configured to receive entity ID signals 108 from one or more communication devices (e.g., beacon 102 or other scanner 104), extract the data associated with entity ID signals 108, and transmit the extracted data to one or more processors 105. In another embodiment, communication circuitry 111 is configured to transmit entity ID signals 108. In one embodiment, entity ID signals 108 may include data including, but not limited to, a unique entity identifier (e.g., entity ID), data associated with the scanner 104 (e.g., scanner 104 battery health, and the like), data associated with the entity with which the scanner 104 corresponds (e.g., fuel level, vehicle speed, and the like), environmental data (e.g., atmospheric pressure, temperature, and the like) and the like.

In another embodiment, GPS circuitry 117 may be configured to receive GNSS signals 113, extract the data associated with GNSS signals 113, and transmit the extracted data to one or more processors 105.

In another embodiment, scanner 104 may include one or more sensors 103. One or more sensors 103 may be configured to receive information associated with the surrounding environment and/or information associated with the entity corresponding to the scanner 104 (e.g., telemetry from an entity connected wired or wirelessly to the scanner 104). For example, if scanner 104 were placed on/within a tractor, the one or more sensors 103 may be configured to collect data including, but not limited to, the level of the tractor's fuel tank, the mileage of the tractor, the speed of the tractor, the temperature of the surrounding environment, and the like. It is noted herein that the one or more sensors 103 may include any sensors known in the art. For example, the one or more sensors 103 may include, but are not limited to, one or more motion sensors (e.g., accelerometers), one or more temperature sensors (e.g., RTDs, thermocouples, etc.), one or more light sensors (e.g., diode, CCD, and etc.) and/or one or more moisture sensors. Furthermore, the one or more sensors of scanner 104 may include any sensors known in the art used to measure any characteristic or quality of the entity with which it is associated.

While FIG. 4 depicts scanner 104 as including one or more sensors 103, this is not to be regarded as a limitation of the present disclosure. In this regard, it is noted that scanner 104 need not include one or more sensors 103, and that scanner 104 may optionally not include one or more sensors 103 without departing from the spirit and scope of the present disclosure.

In another embodiment, scanner 104 may include one or more processors 105. In another embodiment, the one or more processors 105 may be configured to execute a set of program instructions stored in memory 107, the set of program instructions configured to cause the one or more processors 105 to carry out the various steps of the present disclosure. In one embodiment, the one or more processors 105 may be configured to receive data associated with entity ID signals 108 and GNSS signals 113. In another embodiment, the one or more processors 105 may be configured to receive data from the one or more sensors 103. In another embodiment, the one or more processors 105 may be configured to time-stamp the data received from the communication circuitry 111, GPS circuitry 117, and/or one or more sensors 103 and store the time-stamped data in memory 107.

In another embodiment, scanner 104 may include network circuitry 115. In one embodiment, network circuitry 115 may be configured to receive network signals 110 from an outside network 112. In another embodiment, the one or more processors 105 of scanner 104 may be configured to direct the network circuitry 115 to transmit network signals 110 to an outside network 112. In this regard, network circuitry 115 may include any network interface circuitry known in the art. In one embodiment, network signals 110 may include any data stored in memory 107. For example, network signals 110 may include, but are not limited to including, data associated with entity ID signals 108 received from other communication devices (e.g., beacons 102, other scanners 104), data associated with received GNSS signals 113 (e.g., positional data), data collected by the one or more sensors 103, and the like.

It is noted that the network circuitry 115 of scanner 104 may include any network interface circuitry or network interface device suitable for interfacing with network 112. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 4G, 4G LTE, 5G, WiFi protocols, RF, LoRa, and the like.

It is noted herein that entity ID signals 108 and network signals 110 may include any type of signals known in the art. For example, network circuitry 115 may be configured to transmit any type signal including, but not limited to, RF signals, Bluetooth signals, WiFi signals, 3G signals, 4G signals, 4G LTE signals, 5G signals, wireline signals, and the like.

In another embodiment, network circuitry 115 may transmit entity ID signals 108 and/or network signals 110 at any interval known in the art including, but not limited to, continuously, substantially continuously, regular intervals, irregular intervals, and the like. For example, network circuitry 115 may be configured to transmit entity ID signals 108 and network signals 110 continuously. By way of another example, network circuitry 115 may be configured to transmit entity ID signals 108 and network signals 110 every two minutes. In another embodiment, when scanner 104 is out of range, blocked by physical structures, weather phenomena, or otherwise unable to transmit signals 108, 110 the one or more processors 105 may be configured to store data in memory 107 until such time that network circuitry 115 is able to transmit signals 108, 110. For example, if scanner 104 were out of range and unable to signals 108, 110 one or more processors 105 may be configured to store data in memory 107 while the scanner 104 is out of range. When the scanner 104 returns within range and/or the transmitter 115 otherwise regains the ability to transmit signals 108, 110 the one or more processors 105 may cause the network circuitry 115 to receive the data stored in memory 107 and transmit the data via signals 108, 110.

FIGS. 5A-5E illustrate a system 100 for determining spatial relationships between entities, in accordance with one or more embodiments of the present disclosure. It is noted herein that the discussion associated with system 100 in FIG. 2 may be regarded as applying to system 100 depicted in FIGS. 5A-5E, unless noted otherwise herein. Similarly, it is noted herein that the discussion associated with system 100 in FIGS. 5A-5E may be regarded as applying to system 100 depicted in FIG. 2, unless noted otherwise herein.

Figure 5A:
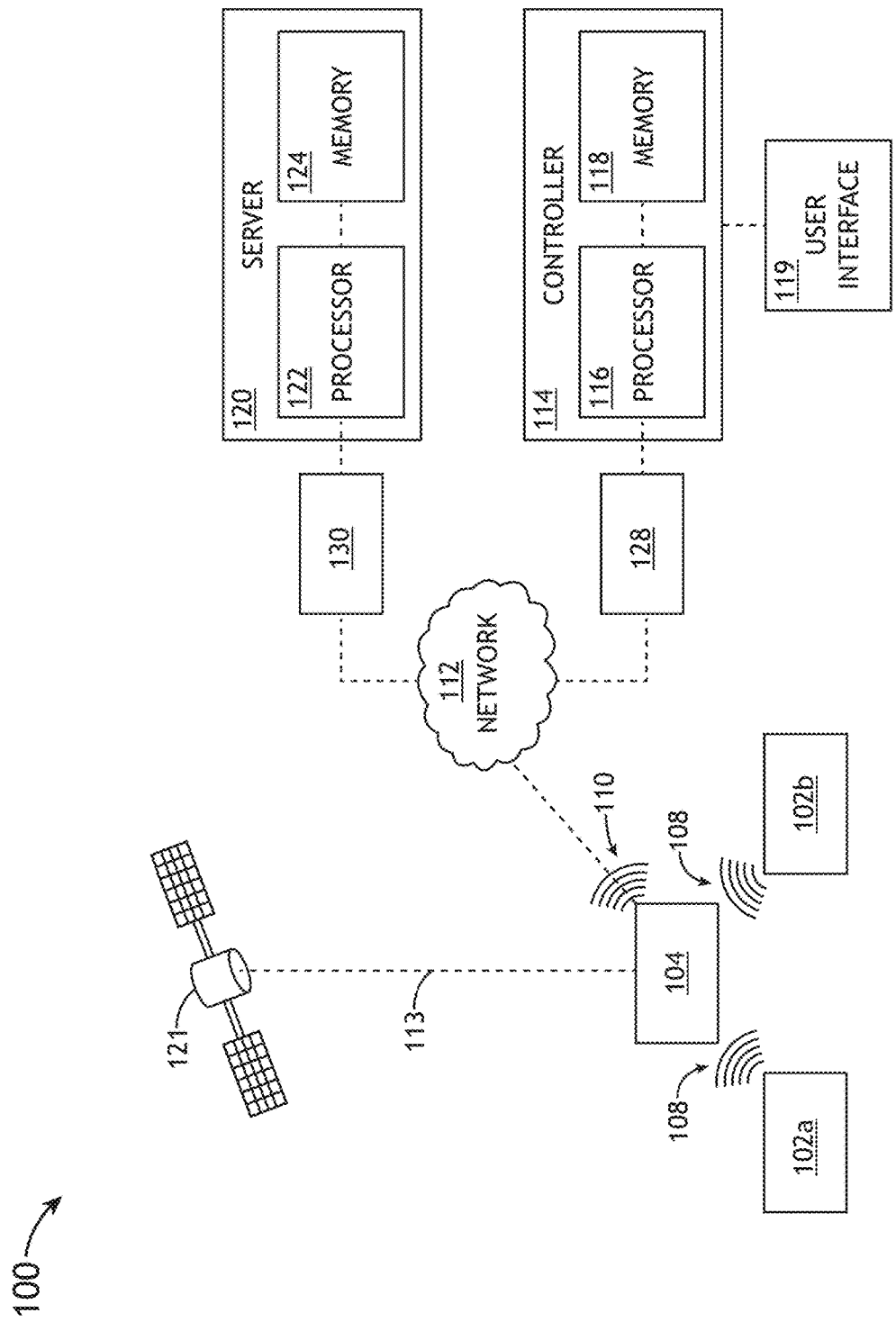
FIGS. 5A-5E illustrate a system for determining spatial relationships between entities, in accordance with one or more embodiments of the present disclosure.

In one embodiment, as shown in FIG. 5A, system 100 includes a scanner 104, a first beacon 102*a*, a second beacon 102*b*, a network 112, a server 120, a controller 114, and a user interface 119. It is contemplated that each of the communication devices (e.g., scanner 104, first beacon 102*a*, and second beacon 102*b*) may correspond to separate entities. For example, scanner 104 may correspond to a person (e.g., scanner 104 is the employee's cell phone), the first beacon 102*a* may correspond to a trailer (e.g., affixed to the trailer), and the second beacon 102*b* may correspond to a pallet with materials (e.g., affixed to the pallet).

In one embodiment, the first beacon 102*a* and the second beacon 102*b* may be configured to transmit entity ID signals 108. Entity ID signals 108 may be encoded with data including, but are not limited to, unique entity identifiers (e.g., entity IDs), beacon data (e.g., beacon 102*a* battery health, beacon 102*b* battery health), data collected by the sensors 103 of the first beacon 102*a*, data collected by the sensors 103 of the second beacon 102*b*, and the like.

In another embodiment, the receiver 111 of scanner 104 may be configured to receive entity ID signals 108. In another embodiment, the GPS circuitry 117 of scanner 104 may be configured to receive GNSS signals 113 from satellite 121. In another embodiment, one or more sensors 103 of scanner 104 may be configured to collect data including, but not limited to, the data of the entity corresponding to the scanner 104, the surrounding environment, and the like. In another embodiment, the one or more processors 105 of scanner 104 may be configured to store data in memory 107. For example, the one or more processors 105 of scanner 104 may be configured to store in memory 107 data received from entity ID signals 108, positioning data received from GNSS signals 113, data received from one or more sensors 103 of scanner 104, and the like.

In another embodiment, the scanner 104 is directly or indirectly coupled to a server 120 and a controller 114 via a network 112. In this regard, scanner 104 may include network interface circuitry (not shown). It is noted herein that the network interface circuitry (not shown) of scanner 104 may include any network interface for interacting with a network 112 known in the art. In another embodiment, network circuitry 115 may be configured to transmit network signals 110 to network 112. In one embodiment, network signals 110 may include any data stored in memory 107. For example, signals 110 may include, but are not limited to including, data associated with entity ID signals 108 received from other communication devices (e.g., beacons 102, other scanners 104), data associated with received GNSS signals 113 (e.g., positional data), data collected by the one or more sensors 103, and the like.

It is noted that the network interface (not shown) of scanner 104 may include any network interface device suitable for interfacing with network 112. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 4G, 4G LTE, 5G, WiFi protocols, RF, LoRa, and the like.

In one embodiment, the one or more processors 122 identify an association (e.g., spatial relationship) between the first beacon 102*a* and the scanner 104 based on the positioning data received by the scanner 104 via GNSS signals 113 and the entity ID signals 108 transmitted by the first beacon 102*a*. For example, after receiving GNSS signals 113, the one or more processors 105 of the scanner 104 may extract the positioning data in order to determine the precise GPS position of the scanner 104. Furthermore, the scanner 104 may receive entity ID signals 108 from the first beacon 102*a*. If the entity ID signals 108 transmitted by the first beacon 102*a* include the GPS position of the first beacon 102*a*, the one or more processors 105 of scanner 104 would then be able to determine the GPS position of both the first beacon 102*a* and the scanner 104, and transmit both GPS locations to the one or more processors 122 of server 120 via network signals 110 and network 112. After receiving the GPS positions of the first beacon 102*a* and the scanner 104 via network 112, the one or more processors 122 may then be configured to determine the distance between the two communication devices (e.g., the first beacon 102*a* and the scanner 104) to determine whether the two communication devices are in close enough proximity to be in an association (e.g., in a spatial relationship). In this same regard, the one or more processors 122 may be configured to determine the distances between each respective communication device (e.g., first beacon 102*a*, second beacon 102*b*, scanner 104) in order to identify associations between each respective communication device.

By way of another example, if the entity ID signals 108 transmitted by the first beacon 102*a* do not include GPS data indicating the GPS position of the first beacon 102*a*, system 100 may still be configured to identify spatial relationships between the respective communication devices based on the GPS position of the scanner 104 and the Relative Received Signal Strength (RSSI) values of the entity ID signals 108. Those skilled in the art will recognize that RSSI values may be inversely related to the distance between the communication device (e.g., the first beacon 102*a* in this example) and the receiving device (e.g., the scanner 104 in this example). In this regard, it is noted that entity ID signals 108 transmitted by first beacon 102*a* which are in close proximity to the scanner 104 may exhibit high RSSI values. Conversely, it is noted that entity ID signals 108 transmitted by a first beacon 102*a* which is far away from the scanner 104 may exhibit low RSSI values. In this regard, one or more processors 105 of scanner 104 may be configured to determine the relative distance between the scanner 104 and the first beacon 102*a* based on the RSSI value of the entity ID signals 108 transmitted by the first beacon 102*a* by associating high RSSI values with close spatial relationships (e.g., short distances), and low RSSI values with larger spatial relationships (e.g., longer distances).

For example, after receiving GNSS signals 113, the one or more processors 105 of the scanner 104 may extract the positioning data in order to determine the precise GPS position of the scanner 104. The scanner 104 may also receive entity ID signals 108 (without GPS position data) from the first beacon 102*a*. Based on the RSSI value of the received entity ID signals 108, the one or more processors 105 of the scanner 104 may be configured to determine the distance between the scanner 104 and the first beacon 102*a*. The one or more processors 105 of the scanner 104 may then be configured to cause the scanner 104 to transmit the GPS position of the scanner 104 and the spatial relationship data (e.g., distance) between the first beacon 102*a* and the scanner 104 to the server 120 via network signals 110 and network 112. The one or more processors 122 of server 120 may then be configured to identify the existence of an association between the scanner 104 and the first beacon 102*a* based on the GPS location of the scanner 104 and the distance between the scanner 104 and the first beacon 102*a*.

It is noted herein that the determination of spatial relationships between two or more communication devices is not limited to a determination based on RSSI values. In this regard, it is contemplated that any proximity-based algorithm or method known in the art may be used without departing from the spirit and scope of the present disclosure.

It is noted herein that any of the steps performed by the one or more processors 105 of the communication devices (e.g., beacons 102*a*, 102*b*, and scanner 104) may be performed by the one or more processors 122 of the server 120, and vice versa. For example, referring again to the example above, instead of the one or more processors 105 of the scanner 104 determining the distance between the scanner 104 and the first beacon 102*a* based on the GPS position of the scanner 104 and the RSSI value of the received entity ID signals 108, the scanner 104 may instead transmit the GPS position of the scanner 104 and the RSSI value of the received entity ID signals 108 to the server 120 via network signals 110 and network 112. In this regard, the one or more processors 122 of the server 120 may be configured to receive GPS data of the scanner 104 and RSSI values of the received entity ID signals 108, determine the distance between the scanner 104 and the first beacon 102*a*, and identify the existence of an association between the scanner 104 and the first beacon 102*a* based on the calculated distance between the two.

Figure 5B:
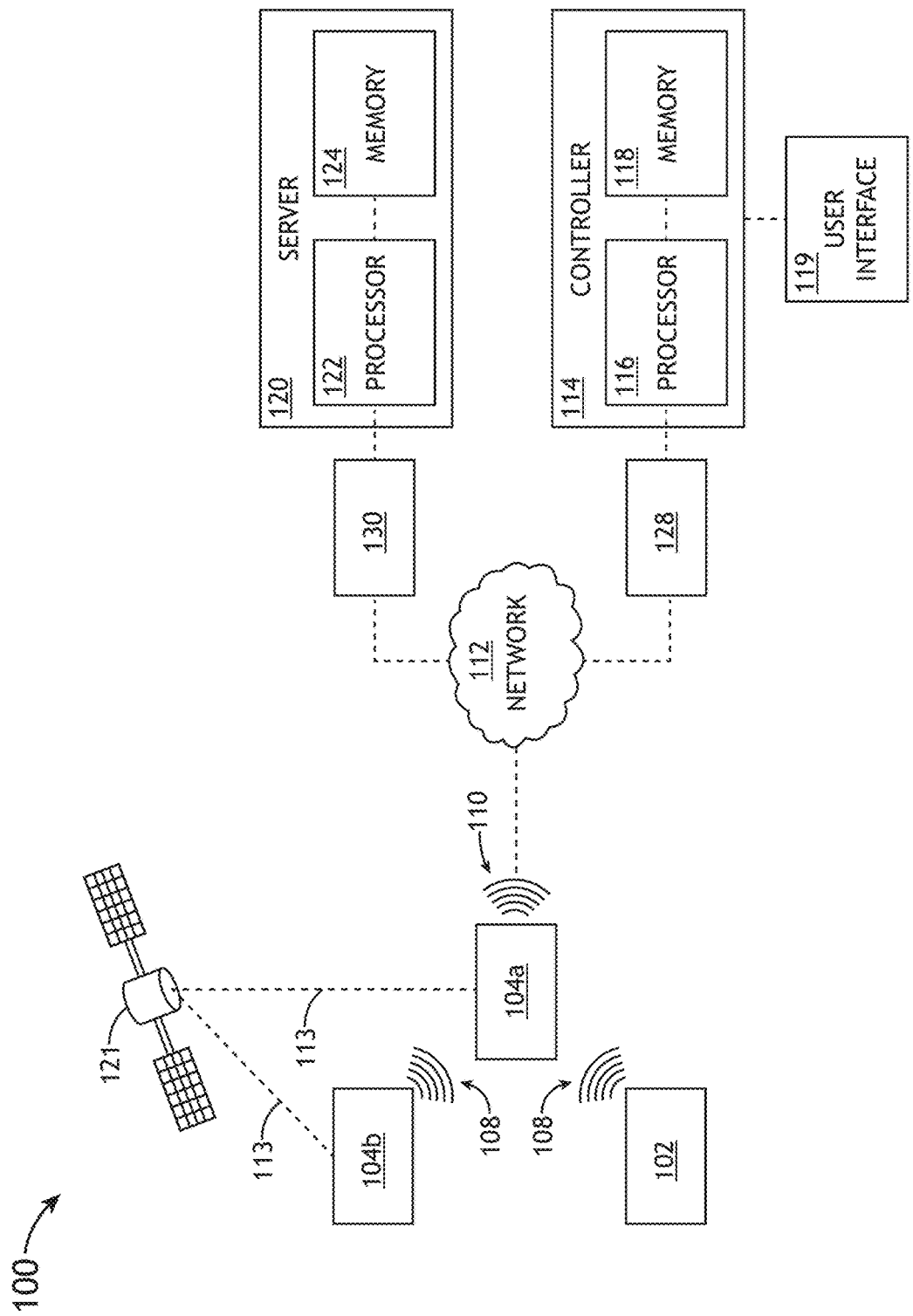

FIG. 5B illustrates a system 100 for determining spatial relationships between entities, in accordance with one or more embodiments of the present disclosure. In one embodiment, system 100 includes a first scanner 104*a*, a second scanner 104*b*, a first beacon 102*a*, a network 112, a server 120, a controller 114, and a user interface 119. It is noted herein that the description associated with FIGS. 1 and 5A may also be regarded as applying to FIG. 5B, unless noted otherwise herein.

In one embodiment, system 100 displayed in FIG. 5B includes two scanners: a first scanner 104*a* and a second scanner 104*b*. In one embodiment, the second scanner 104*b* may transmit entity ID signals 108 to the first scanner 104*a*. It is noted herein that multiple scanners (e.g., first scanner 104*a*, second scanner 104*b*) may transmit entity ID signals 108 to each other. It is further noted herein that, due to the fact scanners 104*a*, 104*b* may receive GNSS signals 113 to determine their respective GPS positions, system 100 may be capable of more accurately determining the position of communication devices (e.g., first scanner 104*a*, second scanner 104*b*, first beacon 102*a*, second beacon 102*b*, and the like) and the existence of associations and operations when multiple scanners 104*a*, 104*b* are present.

Figure 5C:
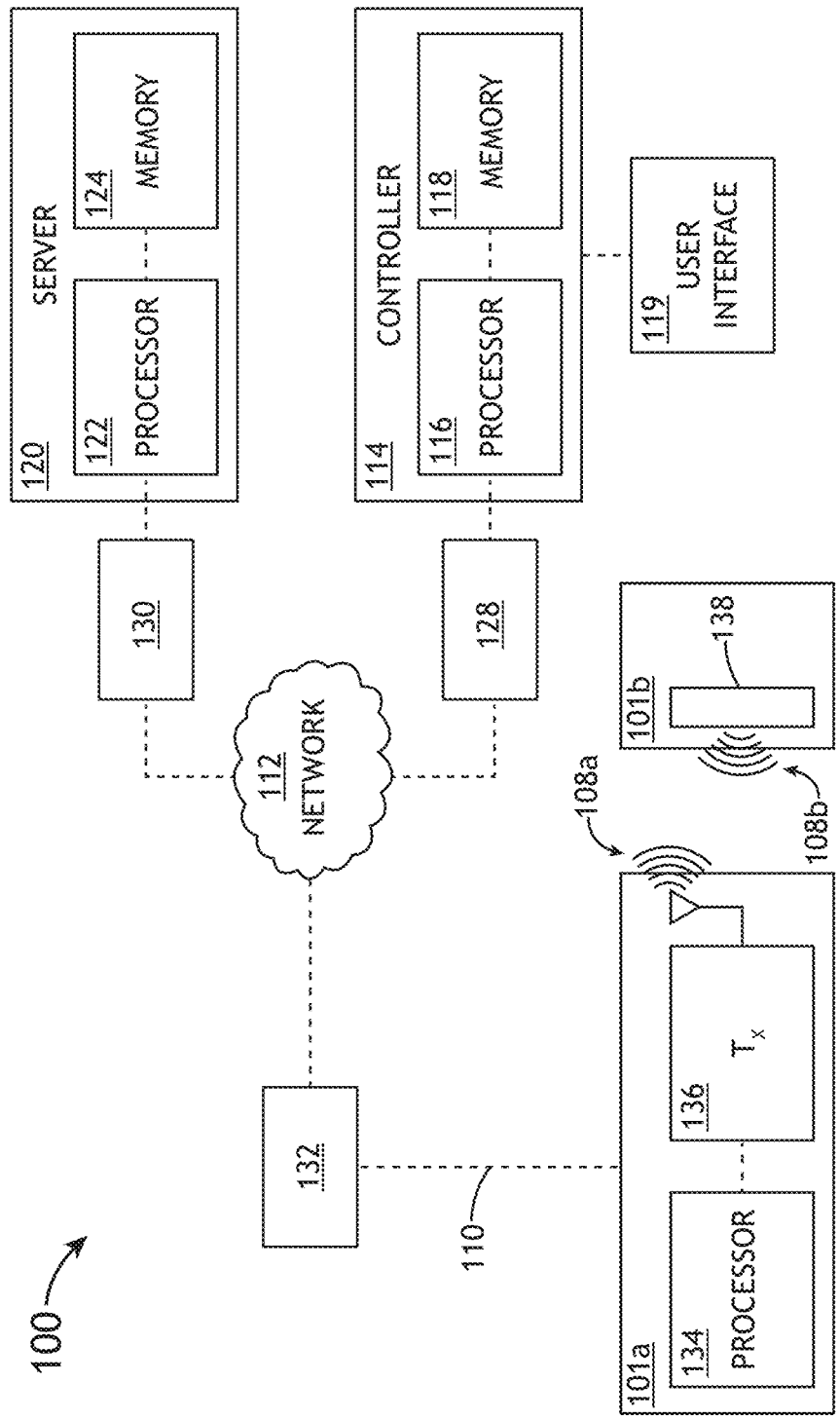

FIG. 5C illustrates a system 100 for determining spatial relationships between entities, in accordance with one or more embodiments of the present disclosure. In one embodiment, system 100 includes a first communication device 101*a*, an additional communication device 101*b*, a network interface 132, a network 112, a server 120, a controller 114, and a user interface 119. It is noted herein that the description associated with FIGS. 2 and 5A-5B may also be regarded as applying to FIG. 5C, unless noted otherwise herein.

In one embodiment, the first communication device 101*a* may include a processor 134 and communication circuitry 136. Communication circuitry 136 may include any communication circuitry known in the art including, but not limited to, a transmitter, a receiver, and/or a transceiver. In one embodiment, first communication device 101*a* and additional communication device 101*b*, as depicted in FIG. 5C, may include RFID sensors. By way of example, first communication device 101*a* may include an active transmitter, and the additional communication device 101*b* may include a passive transmitter. In this example, when the passive transmitter (e.g., additional communication device 101*b*) comes into close proximity with the active transmitter (e.g., first communication device 101*a*), communication circuitry 138 may transmit entity ID signals 108*b* to first communication device 101*a*. It is noted herein that the examples given are not to be regarded as limiting. In this regard, first communication device 101*a* and additional communication device 101*b* may include any transmitter (e.g., active transmitter, passive transmitter), receiver, transceiver, RFID tag, or RFID reader known in the art.

Figure 5D:
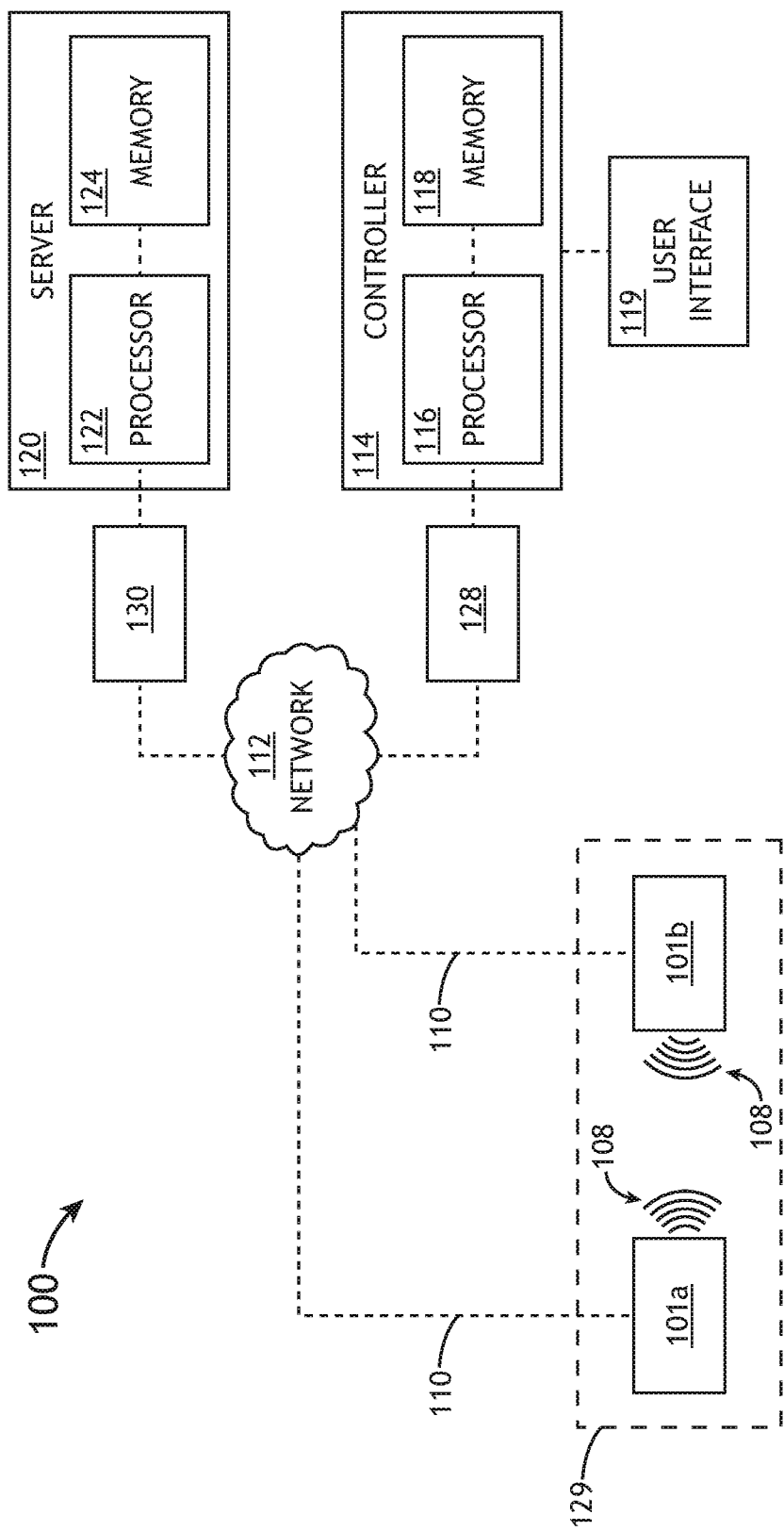

FIG. 5D illustrates a system 100 for determining spatial relationships between entities, in accordance with one or more embodiments of the present disclosure. In one embodiment, system 100 includes a first communication device 101a, an additional communication device 101b, a network 112, a server 120, a controller 114, and a user interface 119. It is noted herein that the description associated with FIGS. 2 and 5A-5C may also be regarded as applying to FIG. 5D, unless noted otherwise herein.

In one embodiment, system 100 may be configured to receive a pre-defined geo-fenced area 129. By way of example, a user may input pre-defined geo-fenced area 129 via user interface 119. Pre-defined geo-fenced area may include any mobile or immobile area including, but not limited to, the perimeter of a farm, the perimeter of a field, a radius around a garage, a radius around an entity (e.g., a radius around a tractor), and the like. As displayed in FIG. 5D, a first communication device 101a and an additional communication device 101b may be located within the pre-defined geo-fenced area 129.

In one embodiment, system 100 may be configured to transmit network signals 110 to network 112, identify a spatial relationship, and the like, based on the location of the communication devices (e.g., first communication device 101a, additional communication device 101b, and the like) relative to pre-defined geo-fenced area 129. By way of example, system 100 may identify a spatial relationship between the first communication device 101a and the additional communication device 101b only when the first communication device 101a and the additional communication device 101b are within the pre-defined geo-fenced area 129. It is noted herein that this example is not to be regarded as limiting, and is provided purely by way of example.

Figure 5E:
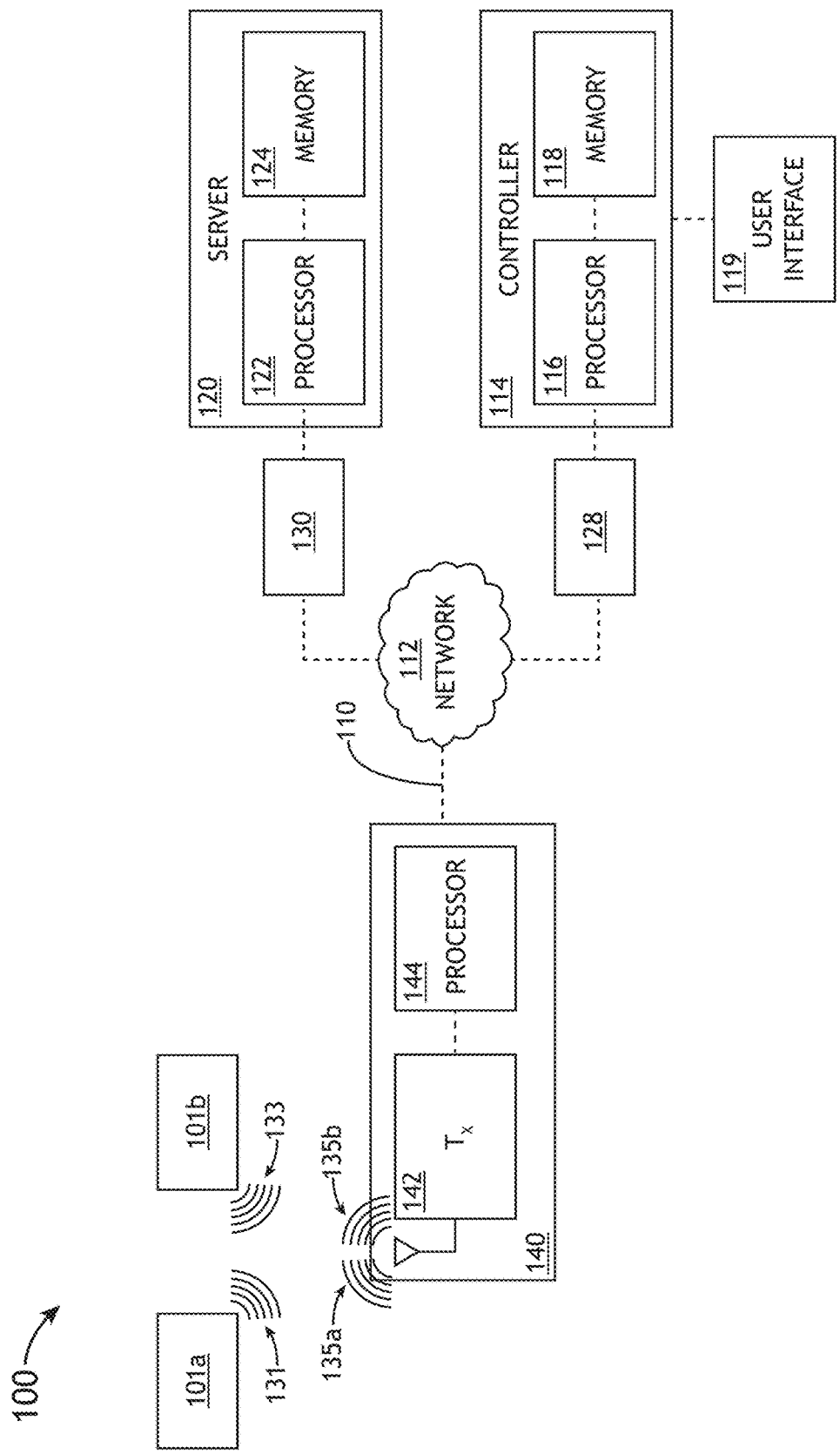

FIG. 5E illustrates a system 100 for determining spatial relationships between entities, in accordance with one or more embodiments of the present disclosure. In one embodiment, system 100 includes a first communication device 101a, an additional communication device 101b, a base station device 140, a network 112, a server 120, a controller 114, and a user interface 119. It is noted herein that the description associated with FIGS. 2 and 5A-5D may also be regarded as applying to FIG. 5E, unless noted otherwise herein.

In one embodiment, system 100 may include a base station device 140. Base station device 140 may include communication circuitry 142 and one or more processors 144. In one embodiment, base station device 140 may receive signals 131, 133 from communication devices (e.g., first communication device 101a, additional communication device 101b, and the like) and transmit network signals 110 to network 112. In this regard, it is contemplated that base station device 140 may include any device which serves as a link in the communication chain between communication devices 101 and network 112. By way of example, a farm operator implementing system 100 throughout the farm may utilize a base station device 140 located on top of a barn, fence post, or the like. It is contemplated herein that the use of a base station device 140 may provide a number of advantages to system 100. By way of example, the use of a base station device 140 may serve to improve connectivity between communication devices 101 and network 112. By way of another example, the use of a base station device 140 may allow for lower-power transmissions from communication devices 101, resulting in smaller, more efficient communication devices 101.

In one embodiment, the one or more processors 105, 116, 122, 134, 144 may include any one or more processing elements known in the art. In this sense, the one or more processors 105, 116, 122, 134, 144 may include any microprocessor-type device configured to execute software algorithms and/or instructions. In one embodiment, the one or more processors 105, 116, 122, 134, 144 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 105, 116, 122, 134, 144. In general, the term "processor" may be broadly defined to encompass any device having one or more processing elements, which execute program instructions from memory 107, 118, 124. Moreover, different subsystems of the system 100 (e.g., first communication device 101a, additional communication device 101b, beacon 102, scanner 104, server 120, controller 114, base station device 140) may include processor or logic elements suitable for carrying out at least a portion of the steps described throughout the present disclosure. Therefore, the above description should not be interpreted as a limitation on the present disclosure but merely an illustration.

The memory 107, 118, 124 may include any storage medium known in the art suitable for storing program instructions executable by the associated one or more processors 105, 116, 122, 134, 144 and the data received from the communication devices (e.g., beacons 102, scanners 104). For example, the memory 107, 118, 124 may include a non-transitory memory medium. For instance, the memory 107, 118, 124 may include, but is not limited to, a read-only memory (ROM), a random access memory (RAM), a magnetic or optical memory device (e.g., disk), a magnetic tape, a solid state drive and the like. In another embodiment, the memory 107, 118, 124 is configured to store data including, but not limited to, entity data, association data (e.g., spatial relationship data), operations data, GPS data, time-stamped data, geo-fenced data, and the like received from communication devices (e.g., beacons 102, scanners 104). It is further noted that memory 107, 118, 124 may be housed in a common controller housing with the one or more processors 105, 116, 122, 134, 144. In an alternative embodiment, the memory 107, 118, 124 may be located remotely with respect to the physical location of the processors 105, 116, 122, 134, 144, server 120, controller 114, and the like. In another embodiment, the memory 107, 118, 124 maintains program instructions for causing the one or more processors 105, 116, 122, 134, 144 to carry out the various steps described through the present disclosure.

It is noted that, in the examples described above, a user of system 100 may be able to determine a substantial amount of information simply from analyzing the time-stamped association (e.g., spatial relationship) and operation data. For example, by time-stamping the association data, a user may be able to determine when and where a tractor was fueled, and with which gas tank. Furthermore, if the time-stamped data included entity information regarding the tractor and gas tank (e.g., tractor make, gas type, gas levels of the tractor and gas tank, and the like), a user may be able to determine if the tractor was fueled using the correct fuel, if the fuel taken from the gas tank is equal to the fuel placed into the tractor, and the like. Furthermore, if a third communication device was associated with an employee operating the tractor, the time stamped data may also include data regarding the association between the user and the tractor. In this regard, a user reviewing the data stored in memory 124 may be able to determine who fueled the tractor.

It is noted that system 100 of the present disclosure may allow a user to more accurately track input cost allocation across smaller land areas. In this regard, the present disclosure may be able to track input cost allocation down to land areas as small as a square meter or smaller. The present disclosure may allow for tracking various inventory including, but not limited to, fertilizer, seed, water, pesticide, and the like.

For example, a tractor may be used to travel throughout a field pulling a sprayer to spray pesticides as needed. The user operating the tractor may have on their person a first scanner 104a (e.g., cell phone). Further, the tractor may be equipped with a second scanner 104b and the sprayer may be equipped with a beacon 102. After receiving data via network signals 110 and network 112, the one or more processors 122 may identify an association (e.g., spatial relationship) between the user, the tractor, and the sprayer (e.g., between the first scanner 104a, the second scanner 104b, and the beacon 102). The one or more processors 122 may label the three-way association as "Association 1." The one or more processors 122 may store Association 1 data in memory 124. As Association 1 continues throughout time and moves through space, the one or more processors 122 may identify Association 1 as carrying out a pesticide spraying operation, and label the operation as "Operation 1." As Operation 1 continues (e.g., as the tractor pulls the sprayer around the field spraying pesticide), first scanner 104a and/or second scanner 104b may transmit network signals 110 to network 112, wherein the network signals 110 include multiple data sets including, but not limited to, time-stamped GPS position data and time-stamped entity data (e.g., data relating to the tractor and sprayer). The time-stamped entity data may include, but is not limited to, the tractor's speed, mileage, fuel level, the sprayer's pesticide level, and the like.

As the tractor travels throughout the field and the sprayer releases pesticides as needed, some areas of the field may require more pesticide than others. In this regard, pesticide will not be sprayed across the entire field evenly. The data transmitted via network signals 110 may include time-stamped data regarding the tractor's position (e.g., GPS position of Operation 1) and sprayer pesticide level. In this regard, the present disclosure may be configured to analyze the time-stamped data in order to determine how the sprayer's pesticide level changed over time/space, therefore determining how much pesticide was used in each specific area of the field. In one embodiment, the present disclosure may be configured to track the pesticide used down to small increments of land (e.g., square meter, square half meter, etc.).

It is noted that previous inventory analysis systems and methods may be limited to a field-by-field basis. In this regard, applying this to the previous example, previous analysis systems and methods may only be able to determine the amount of pesticide used for an entire field. In comparison, it is noted that system 100 of the present disclosure may allow for a more accurate and automated inventory tracking. Additionally, it is noted that tracking inventory and cost allocation down to smaller land areas through system 100 of the present disclosure may allow a user to more intelligently and efficiently manage costs and inventory across their entire farmland. The ability of system 100 to track inventory and cost allocations down to smaller land areas is depicted in FIG. 6A.

Figure 6A:
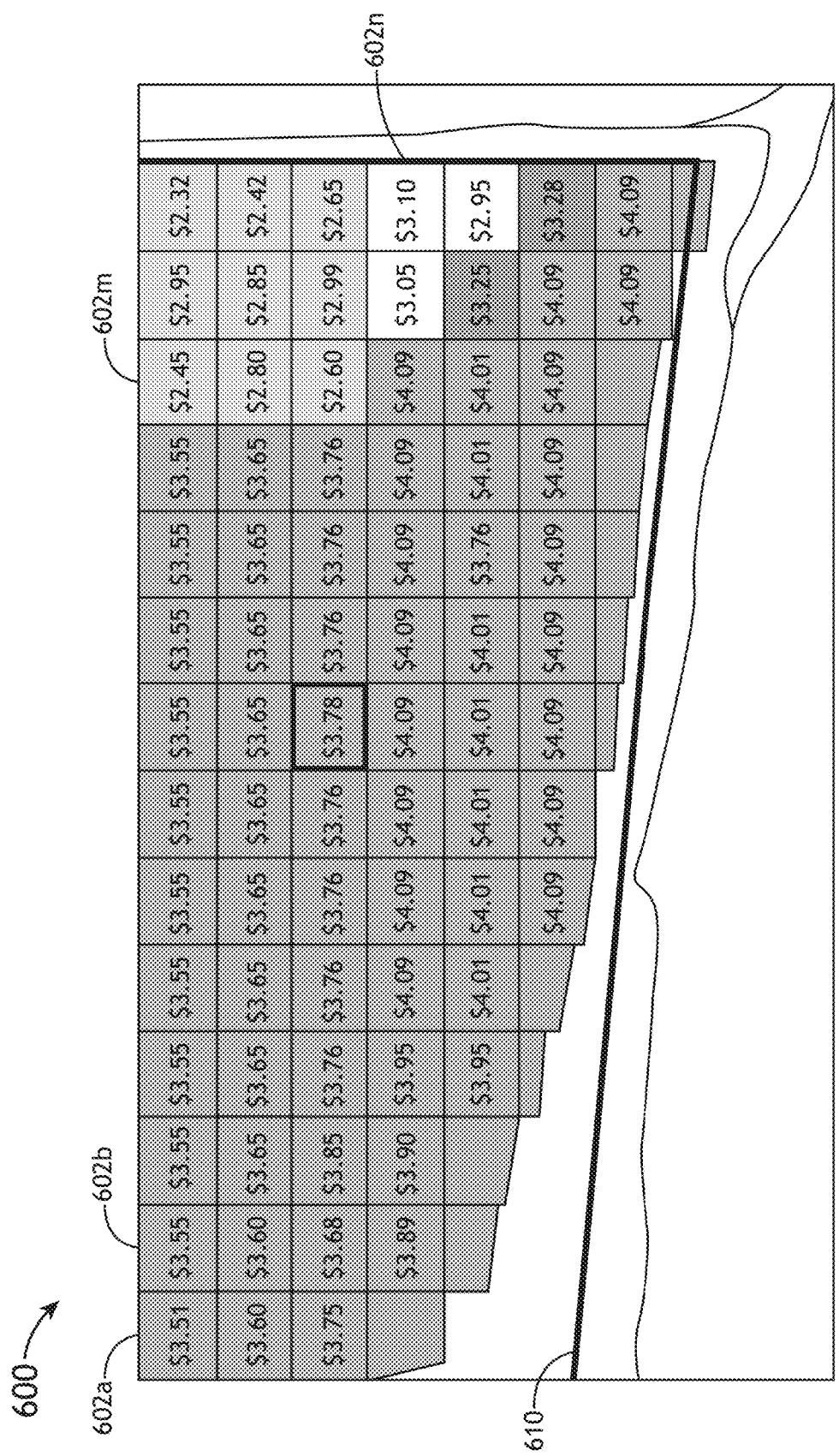

FIG. 6A depicts a portion of a geo-fenced field 600 in which cost allocations have been broken down into smaller field subsections 602, in accordance with one or more embodiments of the present disclosure. In one embodiment, the geo-fenced field 600 is defined by a pre-defined geo-fenced boundary 610. In another embodiment, geo-fenced field 600 is broken into smaller field subsections 602a, 602b, 602m, 602n, and the like.

FIG. 6A may be further understood with reference to the previous example. In this example, a user (e.g., cell phone—first scanner 104) operating a tractor (e.g., second scanner 104b) may be used to travel throughout a field pulling a sprayer (e.g., beacon 102) to spray pesticides as needed. System 100 may identify the three-way association as Association 1 (e.g., user/tractor/sprayer spatial relationship). System 100 may further identify Association 1, as it moves through time and space, as carrying out a pesticide spraying operation, Operation 1. As noted previously, as Operation 1 continues (e.g., as the tractor pulls the sprayer around the field spraying pesticide), first scanner 104a and/or second scanner 104b may transmit network signals 110 to network 112, wherein the network signals 110 include multiple data sets including, but not limited to, time-stamped GPS position data and time-stamped entity data (e.g., data relating to the tractor and sprayer). The time-stamped entity data may include, but is not limited to, the tractor's speed, mileage, fuel level, the sprayer's pesticide level, and the like. As the tractor travels throughout the field and the sprayer releases pesticides as needed, some areas of the field may require more pesticide than others. In this regard, pesticide will not be sprayed across the entire field evenly.

Continuing with the same example, the one or more processors 122 of server 120 may be configured to use the change in pesticide level in the sprayer over time and the changing location of Operation 1 over time to determine how much pesticide was sprayed at each particular location throughout the field. The one or more processors 122 may then be configured to divide the field up into field subsections 602 such that the amount of pesticide used may be divided up by each field subsection 602. Furthermore, after determining how much pesticide was used in each field subsection 602, the one or more processors 122 may be configured to use the price of the pesticide to determine the cost of pesticide used per field subsection 602.

In another embodiment, the one or more processors 122 may be configured to generate a visual representation of the field 600 broken into field subsections 602 depicting the price of pesticide used per field subsection 602. The visual representation may then be displayed on user interface 119. For instance, referring to FIG. 6A, one or more processors 122 may be configured to display that field subsections 602a, 602b, 602m, and 602n required $3.51, $3.55, $2.45, and $3.10 of pesticide, respectively.

Referring again to FIG. 6A, system 100 may be used to generate a visual representation of a field 600 which includes the cost breakdowns of one or more entities, materials, working hours, and the like. For instance, referring again to the previous example with the pesticide spraying operation, the costs depicted in the field subsections 602 of FIG. 6A represent only the cost of pesticide used per field subsection 602. However, the one or more processors 122 of server 120 may be configured to use time-stamped GPS position data and time-stamped entity data (e.g., data relating to the tractor and sprayer) from network signals 110 in order to determine many valuation metrics including, but not limited to, the amount of pesticide used per field subsection 602, the amount of employee time spent per field subsection 602, the amount of tractor run time spent per field subsection 602, the amount of sprayer run time spent per field subsection 602, and the like.

It is noted that the cost per unit of run time for the tractor and sprayer may be determined using the amortized costs of the tractor and sprayer over their respective lifetimes. In this regard, system 100 may be configured to generate a visual representation of a field 600 with unit cost breakdowns per field subsection 602, wherein the unit cost per field subsection includes the cost of pesticide per field subsection 602, employee cost per field subsection 602 (e.g., employee time*employee hourly rate), the running operational cost of the tractor per field subsection 602, and the running operational cost of the sprayer per field subsection 602. In this regard, instead of FIG. 6A displaying only the cost of pesticide used per field subsection 602, FIG. 6A may instead display the total cost of Operation 1 (e.g., pesticide spraying operation) per field subsection 602. This cost allocation breakdown per field subsection 602 is described in more detail with reference to FIG. 6B.

FIG. 6B depicts a portion of a geo-fenced field 600 in which cost allocations of a harvesting process have been broken down into field subsections 602, and in which cost allocations have been further broken down into the various tasks of the harvesting process in graph 620.

As noted previously, system 100 may break down cost allocations per field subsection 602, and may further break down the cost allocations per field subsection 602 into the various tasks associated with each operation. For example, a "harvesting process" may include many separate operations throughout a harvesting season, including, but not limited to, a planting operation, a fertilizing operation, a chemical spraying operation, a tilling operation, and the like. Similar to the example above, as each operation moves throughout the field 500, a scanner 104 in each operation may transmit network signals 110 to network 112, wherein the network signals 110 include multiple data sets including, but not limited to, time-stamped GPS position data and time-stamped entity data (e.g., data relating to the entities in the operation). Using the time-stamped GPS position data and the time-stamped entity data, the one or more processors 122 of server 120 may be configured to allocate the cost of each individual task in each operation to each field subsection 602 in which that cost was spent.

For instance, one operation in the harvesting process depicted in FIG. 6B may be a planting operation in which a user (e.g., first scanner 104a) drives a tractor (e.g., second scanner 104b) pulling a planter (e.g., beacon 102). The planting operation may be labeled as Operation 1 of the entire harvesting process. As Operation 1 moves throughout field 600 planting seeds, first scanner 104a and/or second scanner 104b may transmit network signals 110 to network 112, wherein the network signals 110 include multiple data sets including, but not limited to, time-stamped GPS position data and time-stamped entity data (e.g., data relating to the tractor and planter). The time-stamped entity data may include, but is not limited to, the tractor's speed, mileage, fuel level, the planter's seed level, and the like. As the tractor travels throughout the field and the planter plants seeds as needed, some areas of the field may receive more seeds than others. In this regard, seeds will not be laid across the entire field evenly.

Continuing with the same example, the one or more processors 122 of server 120 may be configured to use the change in seed level in the planter over time and the changing location of Operation 1 over time to determine how much seed was planted at each particular location throughout the field. The one or more processors 122 may then be configured to divide the field up into field subsections 602 such that the amount of seed used may be divided up by each field subsection 602. Furthermore, after determining how much seed was used in each field subsection 602, the one or more processors 122 may be configured to use the price of the seed to determine the cost of seed used per field subsection 602. Furthermore, the one or more processors 122 of server 120 may be configured to use the change in tractor fuel level over time and the GPS position of Operation 1 over time to determine the amount of user time (e.g., salary) and fuel cost expended in each field subsection 602.

Continuing with the same example, the process of dividing cost allocations up for every task in each operation may be done for each operation of the harvesting process. For example, if a harvesting process included a seeding operation, a fertilizer operation, a chemical spraying operation, and a tilling operation, cost allocations for each operation may be broken down into each field subsection 602. In this regard, as shown in graph 620 of FIG. 6B, the cost allocations of the entire harvesting process may be broken down into the cost allocations for each field subsection.

It is noted herein that the ability of system 100 to break down cost allocations across field subsections 602 may allow for increased productivity. For example, referring to FIG. 6B, a user may be able to view the various cost allocations across the various field subsections 602 to determine which field subsections 602 require increased cost as compared to the other field subsections 602. In this example, by viewing the breakdown of the cost allocations in the field subsection 602 which costs more than the others, the user may be able to determine why that specific field subsection 602 is costing more than the others. This may allow the user to take more effective remedial actions in order to bring the cost of the field subsection 602 down.

Figure 7A:
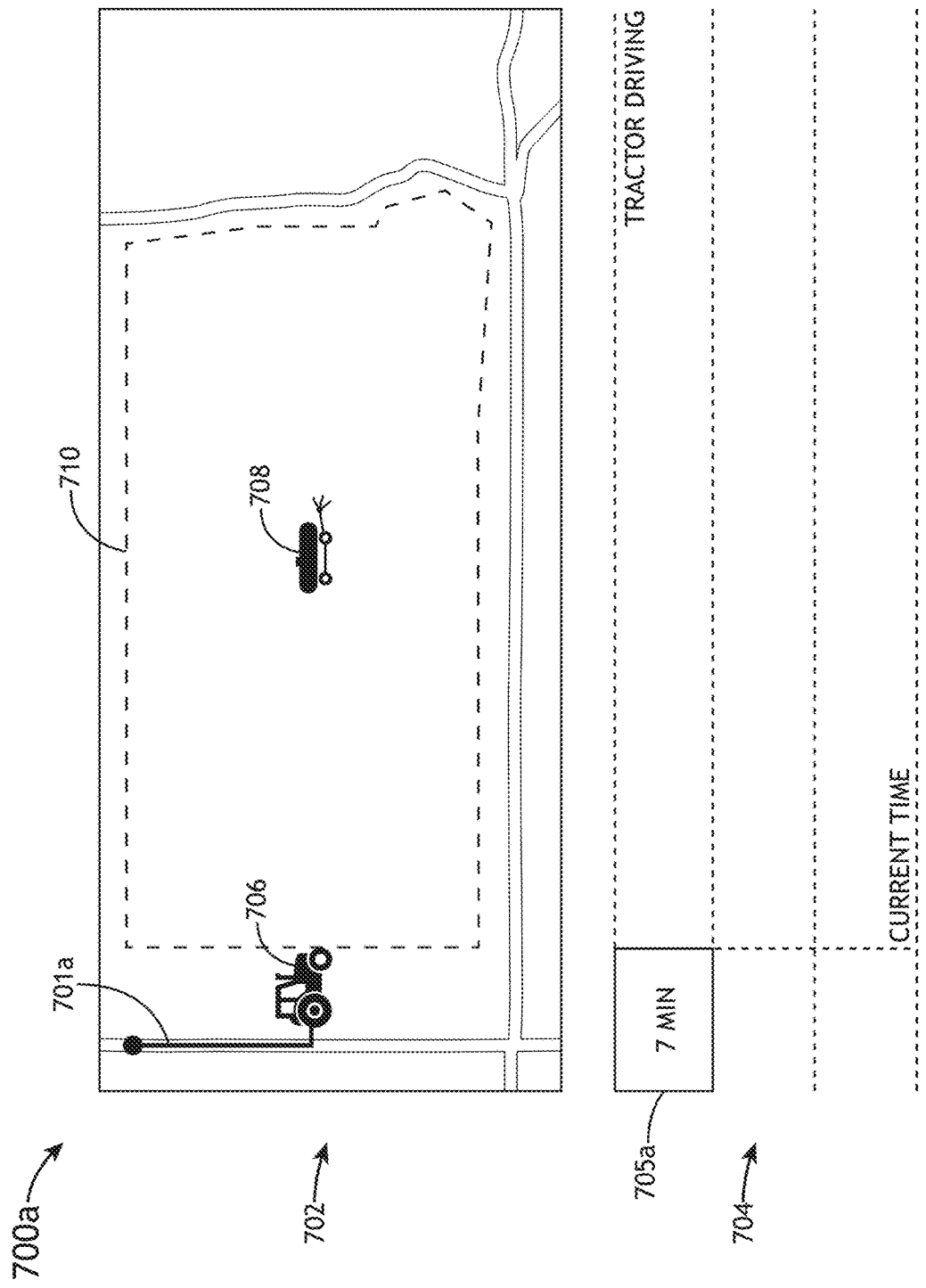

FIG. 7A illustrates a first graphical display 700a depicting a map 702 and a corresponding timeline 704, in accordance with one or more embodiments of the disclosure. In one embodiment, graphical display 700 may be displayed on the display device of the user interface 119. In one embodiment, map 702 of first graphical display 700a illustrates a conceptual view of a path 701 of a tractor 706 as the tractor 706 travels down a road, into a field 710, and pulls an anhydrous ammonia tank 708 (e.g., fertilizing operation). In another embodiment, timeline 704 of first graphical display 700a illustrates various "channels" 705 depicting the amount of time the tractor 706 spends traveling in each stage along its path 701. In this regard, the path 701 of the tractor 706 illustrated in map 702 may be broken down into various channels 705 as illustrated in timeline 704.

As shown in FIG. 7A, a tractor 706 may begin driving down a road and turn off the road to enter a field 710 (e.g., geo-fenced field 710) along a first path segment 701a. As shown in the timeline 704 of graphical display 700, a first channel 705a may illustrate the time period the tractor 706 drove down the road and entered the field 710. In this regard, first path segment 701a may correspond to first channel 705a, indicating that the tractor 706 drove for 7 minutes from the time it started driving to the time it entered the field 710 (e.g., crossed the geo-fenced boundary of field 710).

Figure 7B:
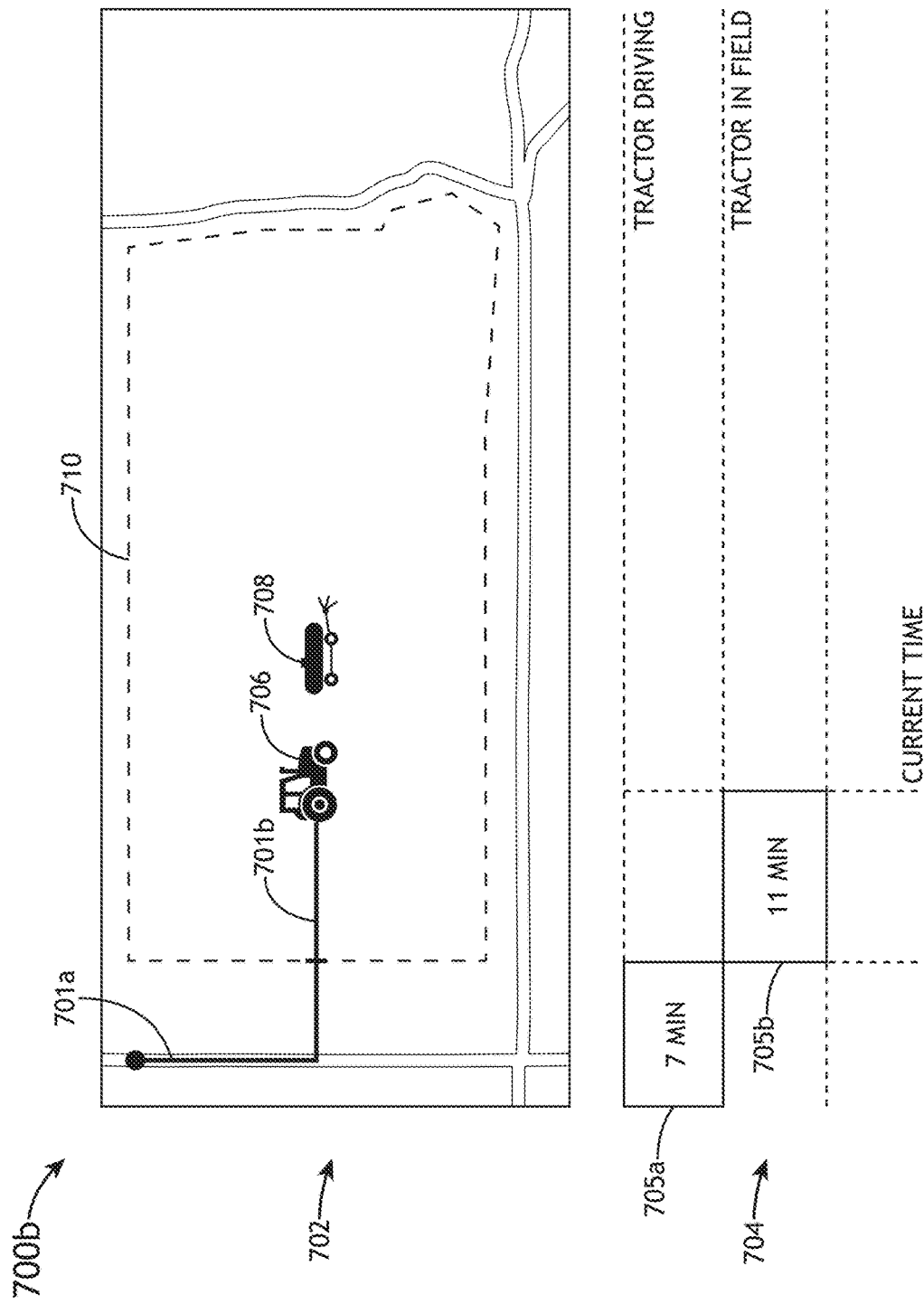

FIG. 7B illustrates a second graphical display 700b depicting a map 702 and a corresponding timeline 704, in accordance with one or more embodiments of the disclosure. As shown in FIG. 7B, a second path segment 701b may be defined as the path 701 of the tractor 706 after the tractor 706 crosses the geo-fenced boundary of field 710 and approaches anhydrous ammonia tank 708. As shown in the timeline 704 of second graphical display 700*b*, a second channel 705*b* may illustrate the time period the tractor 706 entered the field 710 and approached the anhydrous ammonia tank 708. In this regard, first path segment 701*b* may correspond to second channel 705*b*, indicating that the tractor 706 drove for 11 minutes from the time it entered the field 710 to the time it reached the anhydrous ammonia tank 708 (e.g., entered a spatial relationship with anhydrous ammonia tank 708).

Figure 7C:
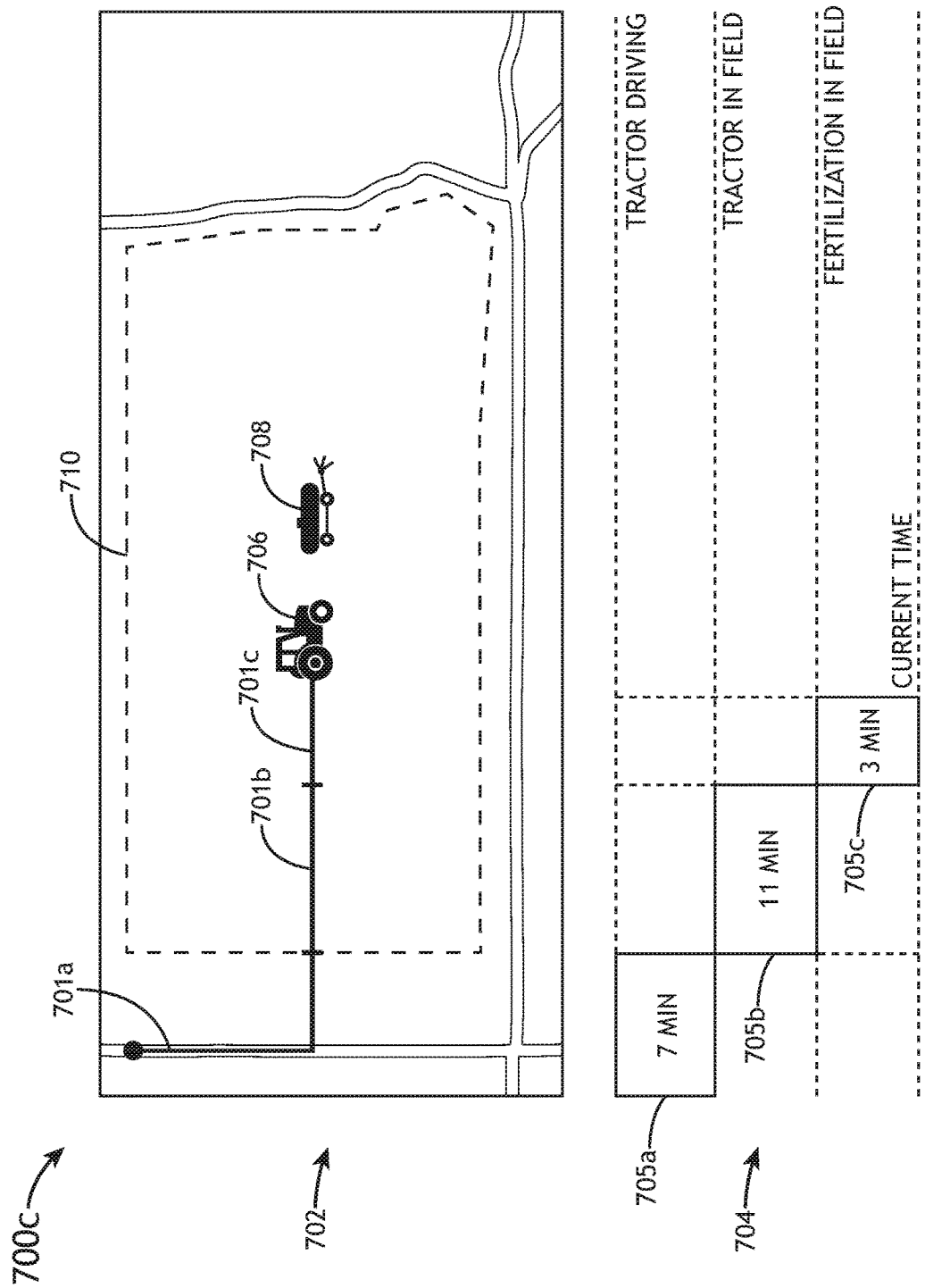

FIG. 7C illustrates a third graphical display 700*c* depicting a map 702 and a corresponding timeline 704, in accordance with one or more embodiments of the disclosure. As shown in FIG. 7C, a third path segment 701*c* may be defined as the path 701 of the tractor 706 as the tractor 706 pulls the anhydrous ammonia tank 708. In this regard, the third portion of path 701*c* may be defined as the path 701 of the tractor 706 during the time the tractor 706 and the anhydrous ammonia tank 708 are in a spatial relationship (e.g., association) and are conducting a fertilizing operation throughout field 710.

As shown in the timeline 704 of third graphical display 700*c*, a third channel 705*c* may illustrate the time period the tractor 706 and the anhydrous ammonia tank 708 conducted the spraying operation in field 710. In this regard, the start of third channel 705*c* may mark the point in time in which the tractor 706 and the anhydrous ammonia tank 708 formed an association (e.g., spatial relationship). In this regard, third path segment 701*c* may correspond to third channel 705*c*, indicating that the fertilizing operation has been going on for 3 minutes.

Figure 7D:
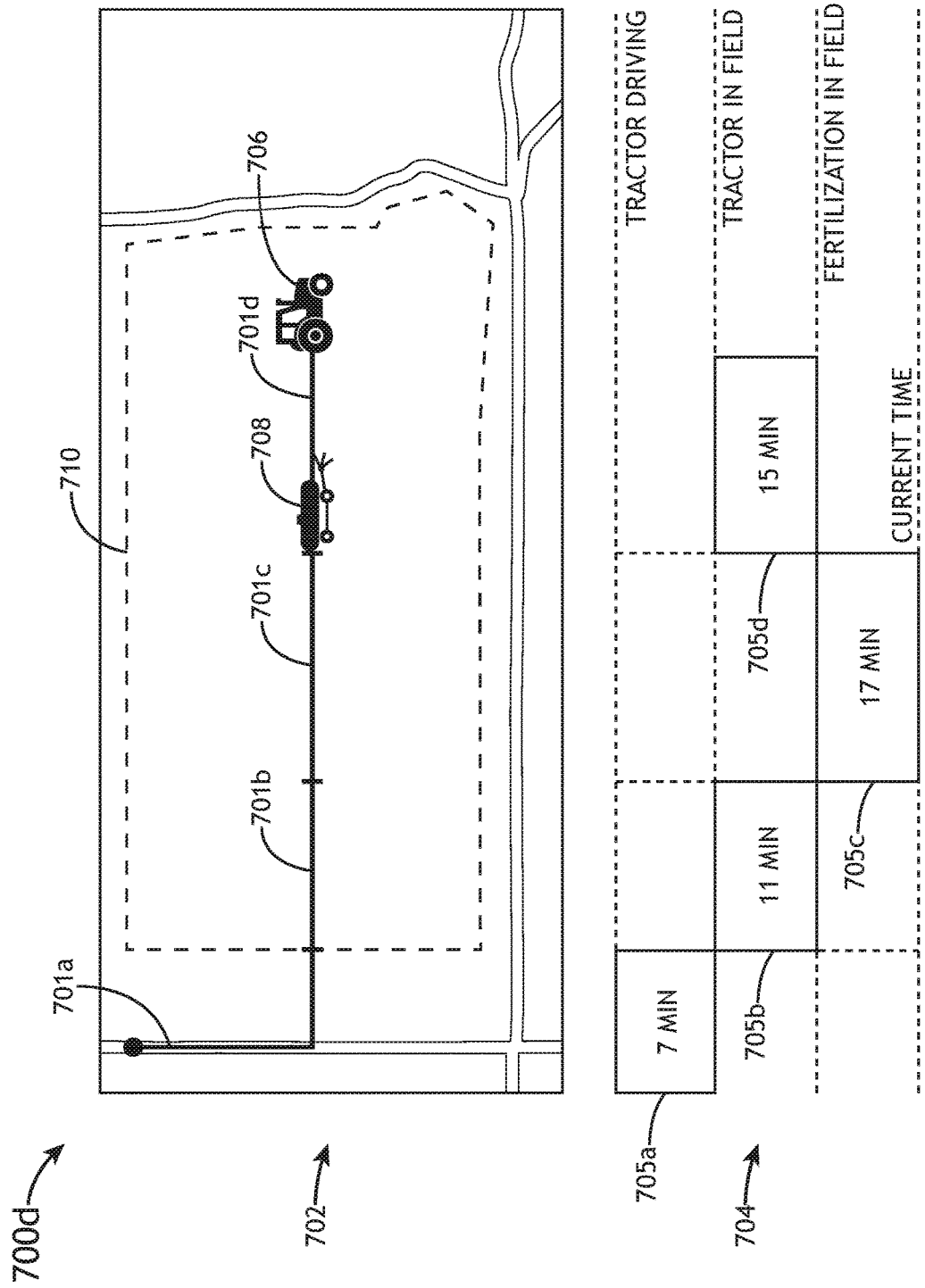

FIG. 7D illustrates a fourth graphical display 700*d* depicting a map 702 and a corresponding timeline 704, in accordance with one or more embodiments of the disclosure. As shown in FIG. 7D, a fourth path segment 701*d* may be defined as the path 701 of the tractor 706 after the tractor 706 left the anhydrous ammonia tank 708 and traveled toward the geo-fenced boundary of field 710. In this regard, the fourth path segment 701*d* may be defined as the path 701 of the tractor 706 after the tractor ended the fertilizing operation and exited a spatial relationship with the anhydrous ammonia tank 708 and traveled toward the geo-fenced boundary of field 710.

As shown in the timeline 704 of fourth graphical display 700*d*, a fourth channel 705*d* may illustrate the time period the tractor 706 traveled toward the geo-fenced boundary of field 710 after ending the fertilizing operation and exiting a spatial relationship with the anhydrous ammonia tank 708. In this regard, the start of fourth channel 705*d* may mark the point in time in which the tractor 706 and the anhydrous ammonia tank 708 ended the fertilizing operation and exited a spatial relationship with one another. In this regard, fourth path segment 701*d* may correspond to fourth channel 705*d*, indicating that the tractor 706 traveled for 15 minutes after ending the fertilizing operation and crossing the geo-fenced boundary of field 710.

Referring again to FIG. 7D, in one embodiment, system 100 of the present disclosure may be configured to mark the last known location of the anhydrous ammonia tank 708 after the fertilizing operation ends and the tractor 706 exits a spatial relationship with the anhydrous ammonia tank 708. For example, the tractor 706 may be equipped with a scanner 104, and the anhydrous ammonia tank 708 may be equipped with a beacon 102. When the scanner 104 and the beacon 102 enter a spatial relationship (e.g., association) with one another, the scanner 104 may transmit network signals 110 to network 112, wherein the network signals 110 include data regarding the association and the fertilizing operation. In this same manner, when the scanner 104 and the beacon 102 (e.g., the tractor 706 and the anhydrous ammonia tank 708) exit a spatial relationship, scanner 104 may transmit network signals 110 to network 112, wherein the network signals 110 include GPS positional data of the location of the beacon 102 (e.g., anhydrous ammonia tank 708) when the scanner 104 and the beacon 102 exited the spatial relationship with one another. In another embodiment, the GPS positional data of the beacon 102 (e.g., anhydrous ammonia tank 708) may be stored in memory 124 of server 120.

FIG. 7E illustrates a fifth graphical display 700*e* depicting a map 702 and a corresponding timeline 704, in accordance with one or more embodiments of the disclosure. As shown in FIG. 7E, a fifth path segment 701*e* may be defined as the path 701 of the tractor 706 after the tractor 706 crosses the geo-fenced boundary of field 710 and drives away from the field 710.

As shown in the timeline 704 of fifth graphical display 700*e*, a fifth channel 705*e* may illustrate the time period the tractor 706 crossed the geo-fenced boundary of field 710 and began driving away from the field 710. In this regard, the fifth path segment 701*e* may correspond to fifth channel 705*e*, indicating that the tractor 706 has been traveling for 3 minutes after crossing the geo-fenced boundary of field 710 and driving away from the field.

It is noted that the previous examples of graphical displays 700 are given merely as an example, and are not to be regarded as limiting. It is noted herein that the divisions between each of the channels 705 (e.g., division between first channel 705*a* and second channel 705*b*) may indicate any event including, but not limited to, an association forming, an association ending, an operation beginning, an operation ending, a geo-fenced boundary being crossed, and the like.

In one embodiment, the graphical display 700 depicted in FIGS. 7A-7E may be displayed on any display known in the art including, but not limited to, a desktop, a monitor, an LCD screen, a touch screen interface, and the like. In one embodiment, graphical display 700 may be depicted on user interface 119 of controller 114. It is contemplated that a user may interact with graphical display 700 in order to view specific portions of graphical display 700. For example, if graphical display 700 were displayed on user interface 119 with a touch screen display, a user may be able to slide the timeline 704 to view different time periods. By way of another example, a user may be able to "zoom" in and out in order to view smaller or larger time periods at a time. It is further contemplated that the graphical display 700 depicted in FIGS. 7A-7E may exhibit additional functional capabilities which facilitate a user's ability to view the information of graphical display 700. For example, additional capabilities of graphical display 700 may include, but are not limited to, displaying additional information if a user clicks or hovers over each channel of the timeline.

In another embodiment, a user may add and/or edit the information displayed or contained within graphical display 700. For example, images and other information may be input manually or automatically via data received by scanners 104. It is noted herein that the timeline 704 depicted in FIGS. 7A-7E would not only assist a user in reviewing past events, but it would also allow the user to easily add and/or edit relevant information such that all the data of system 100 is arranged in a chronological order. For example, a user may desire to add notes relevant to a certain entity during a particular channel 705. For instance, a user may insert a note during the third channel 705*c* (e.g., channel depicting the fertilizing operation) that the tractor 706 was experiencing technical difficulties. By way of another example, a user may input a note that the type of fertilizer being used was changed mid-operation. For example, referring to FIG. 7D, the type of fertilizer being used may have been switched half way through the fertilizing operation depicted by third channel 705*c*. In this example a user may desire to enter this information in on the timeline 704, and could do so by clicking, hovering, or the like, over third channel 705*c* on the timeline 704.

Figure 8:
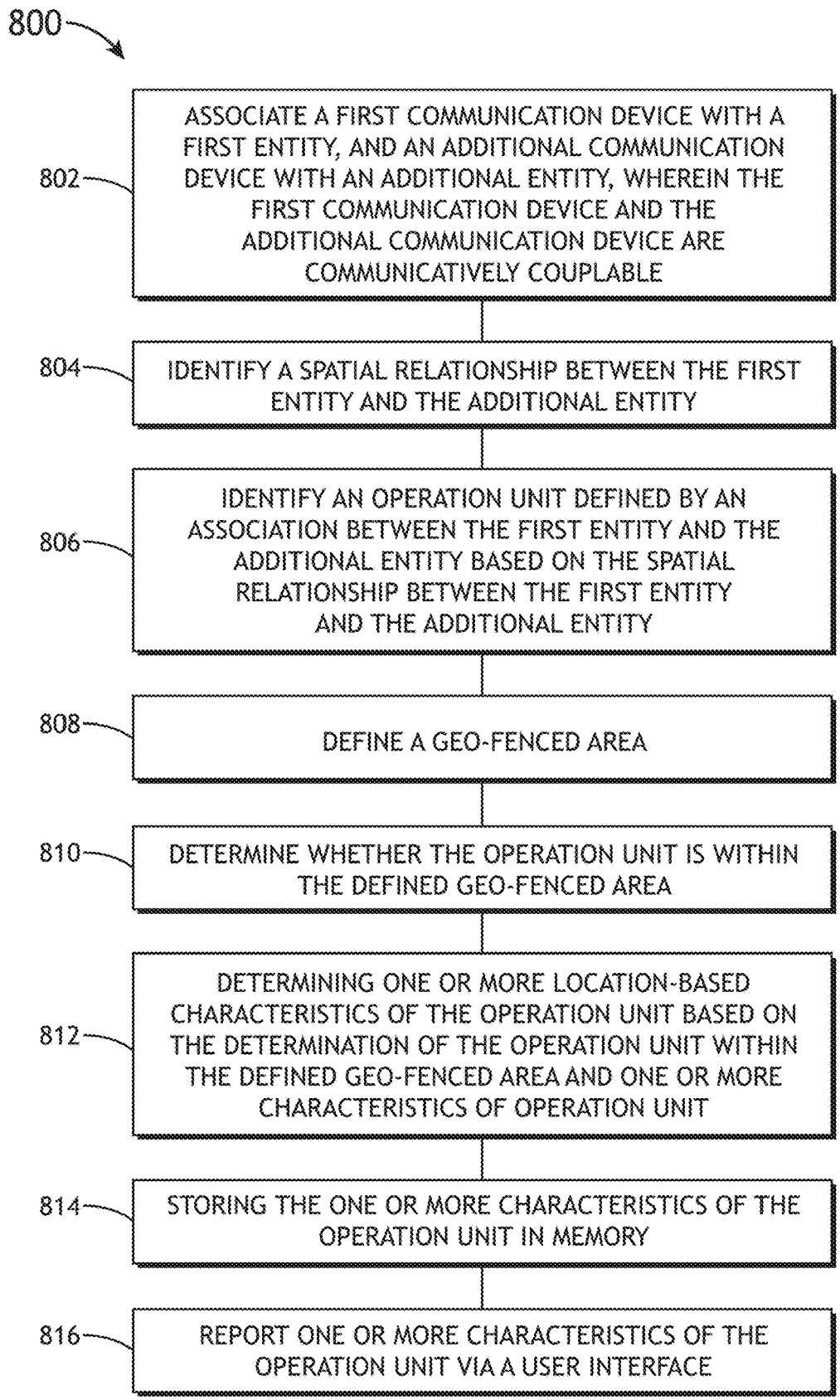
FIG. 8 illustrates a flowchart of a method for determining spatial relationships between entities, in accordance with one or more embodiments of the present disclosure.

FIG. 8 illustrates a process flow diagram depicting a method 800 for tracking proximity information, in accordance with one or more embodiments of the present disclosure. It is noted herein that the steps of method 800 may be implemented all or in part by system 100. It is further recognized, however, that the method 800 is not limited to the system 100 in that additional or alternative system-level embodiments may carry out all or part of the steps of method 800.

In step 802, a first communication device is associated with a first entity, and an additional communication device is associated with an additional entity. In one embodiment, the first communication device and the additional communication device are communicatively couplable. By way of example, the first communication device may include a beacon associated with a tractor, and the second communication device may include a scanner associated with a gas tank.

In step 804, a spatial relationship is identified between the first entity and the additional entity. By way of example, two entities which are within a specified distance of one another may be said to be in a spatial relationship with one another.

In step 806, an operation unit defined by an association between the first entity and the additional entity is identified based on the spatial relationship between the first entity and the additional entity. For example, when a spatial relationship between a tractor and a gas tank is identified over a period of time, the present disclosure may identify the spatial relationship as a fueling operation.

In step 808, a geo-fenced area is defined. By way of example, a geo-fenced area may be defined by a series of GPS coordinates, or may be defined as a region relative to a particular entity. For instance, a user may define the outer perimeter of a field as a first geo-fenced boundary defining a first geo-fenced area.

In step 810, it is determined whether the operation unit is within the defined geo-fenced area.

In step 812, one or more location-based characteristics of the operation unit are determined based on the determination of the operation unit within the defined geo-fenced area and one or more characteristics of operation unit. Location-based characteristics may include, but are not limited to, the amount of seed planted in particular areas, the amount of fertilizer used in particular area, the fuel type and fuel level of a tractor based on the location of a fueling operation (e.g., adjacent to a fuel tank), and the like.

In step 814, one or more characteristics of the operation unit are stored in memory.

In step 816, the one or more characteristics of the operation unit are reported via a user interface. By way of example, a user interface may display the seed allocations throughout a field, employee hours broken down by operation unit, and the like. It is contemplated that a user may utilize the displayed information (e.g., reported one or more characteristics) to perform one or more tasks, or adjust one or more operating parameters in response to the reported information. By way of example, a farm owner may reconcile fuel usage, reconcile employee hours, alter fertilization, seed, or irrigation allocations throughout the farm, and the like.

FIGS. 9-19 generally illustrate graphical user interfaces for providing proximity-based analysis, in accordance with one or more embodiments of the present disclosure. It is contemplated herein that the graphical user interfaces depicted in FIGS. 9-19 may illustrate one or more embodiments, elements, statistics, spatial relationships, or operations of the present disclosure. In this regard, it is contemplated that the graphical user interfaces depicted in FIGS. 9-19 may illustrate and/or display any data collected and/or analyzed by the present disclosure. It is further noted, however, that the graphical user interfaces depicted in FIGS. 9-19 are for illustrative purposes only, and are not to be regarded as a limitation on the scope of the present disclosure.

It is contemplated herein that the graphical user interfaces depicted in FIGS. 9-19 may be displayed on one or more components of the present disclosure. By way of example, the graphical user interfaces depicted in FIGS. 9-19 may be displayed on one or more communication devices 101 and/or user interface 119 of system 100. In this regard, a user may view, filter, edit, and modify one or more characteristics of system 100 in response to the displayed graphical user interfaces depicted in FIGS. 9-19.

FIG. 9 illustrates a graphical user interface 900 for providing proximity-based analysis, in accordance with one or more embodiments of the present disclosure.

In one embodiment, graphical user interface 900 illustrates a list of entities being tracked by system 100. In one embodiment, a user may filter the list of tracked entities by entity name/type (e.g., "equipment"), geo-fenced area (e.g., "fence"), operation, spatial relationship, and the like. In another embodiment, a user may use graphical user interface 900 to search for a particular entity.

Figure 10:
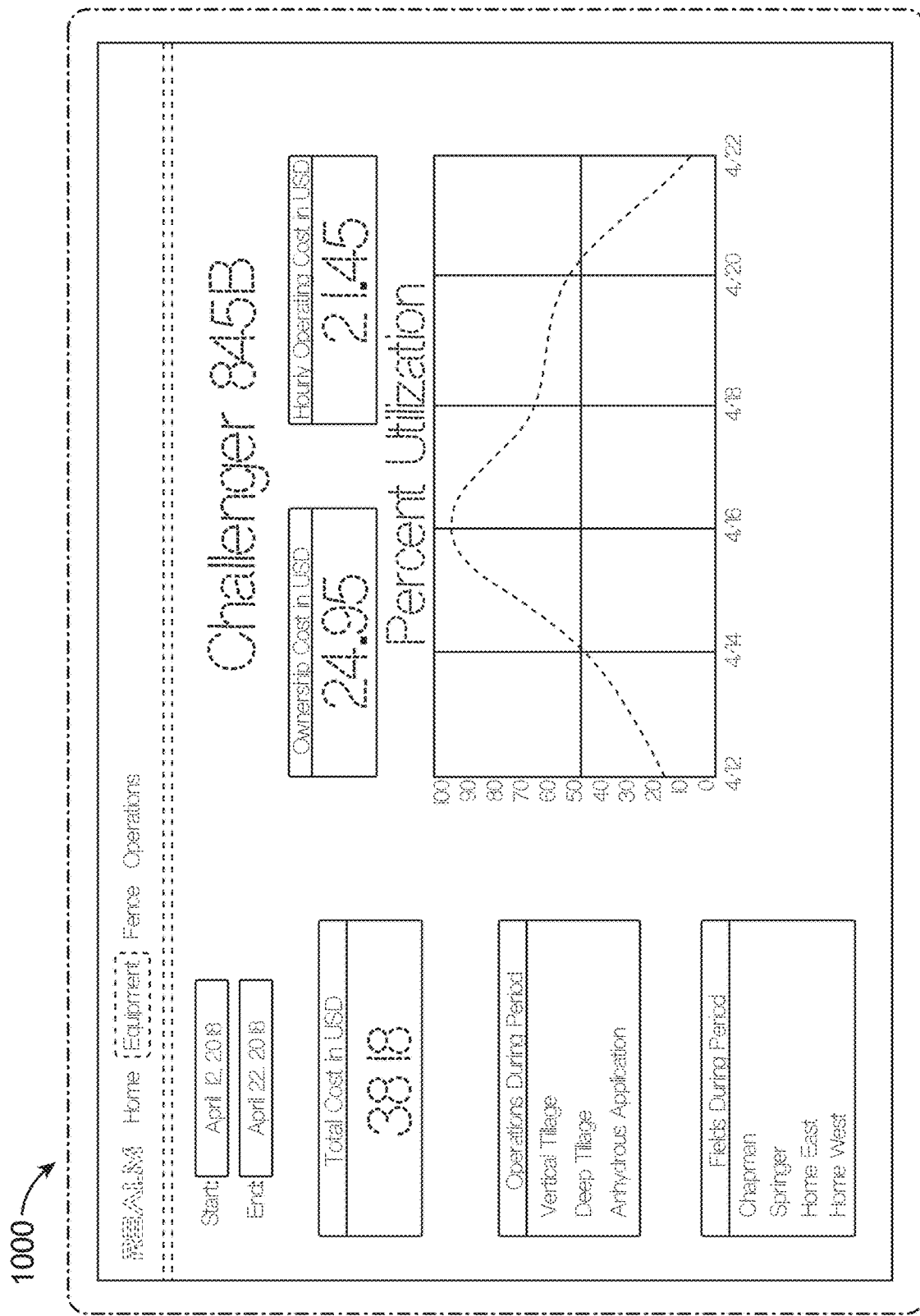

FIG. 10 illustrates a graphical user interface 1000 for providing proximity-based analysis, in accordance with one or more embodiments of the present disclosure.

In one embodiment, graphical user interface 1000 illustrates a report generated for an entity (e.g., "entity report"). In one embodiment, an entity report may include, but is not limited to, total cost, ownership cost, hourly operating cost, percent utilization over time, and the like. In another embodiment, a user may be able to filter the entity report using one or more filters including, but not limited to, date, time, operation, geo-fenced area (e.g., "field"), and the like.

Figure 11:
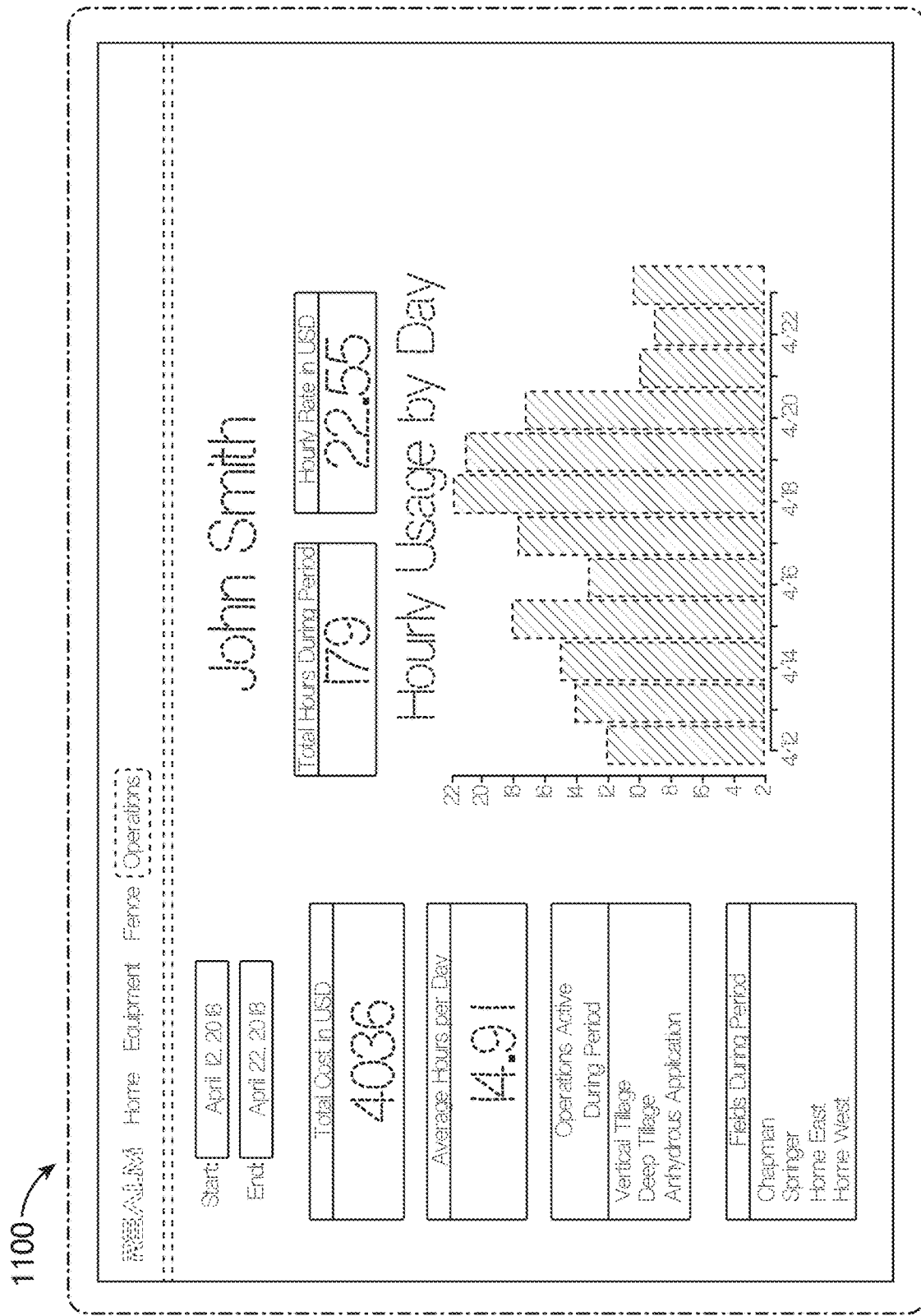

FIG. 11 illustrates a graphical user interface 1100 for providing proximity-based analysis, in accordance with one or more embodiments of the present disclosure.

In one embodiment, graphical user interface 1100 illustrates a report generated for an employee associated with system 100 (e.g., "employee report" or "operator report"). In one embodiment, an operator report may include, but is not limited to, the total hours worked by the employee, the hourly rate of the employee, the total amount owed to the employee, the average hours worked by the employee, and the like. In another embodiment, a user may be able to filter the operator report using one or more filters including, but not limited to, date, time, operation, geo-fenced area (e.g., "field"), and the like.

Figure 12:
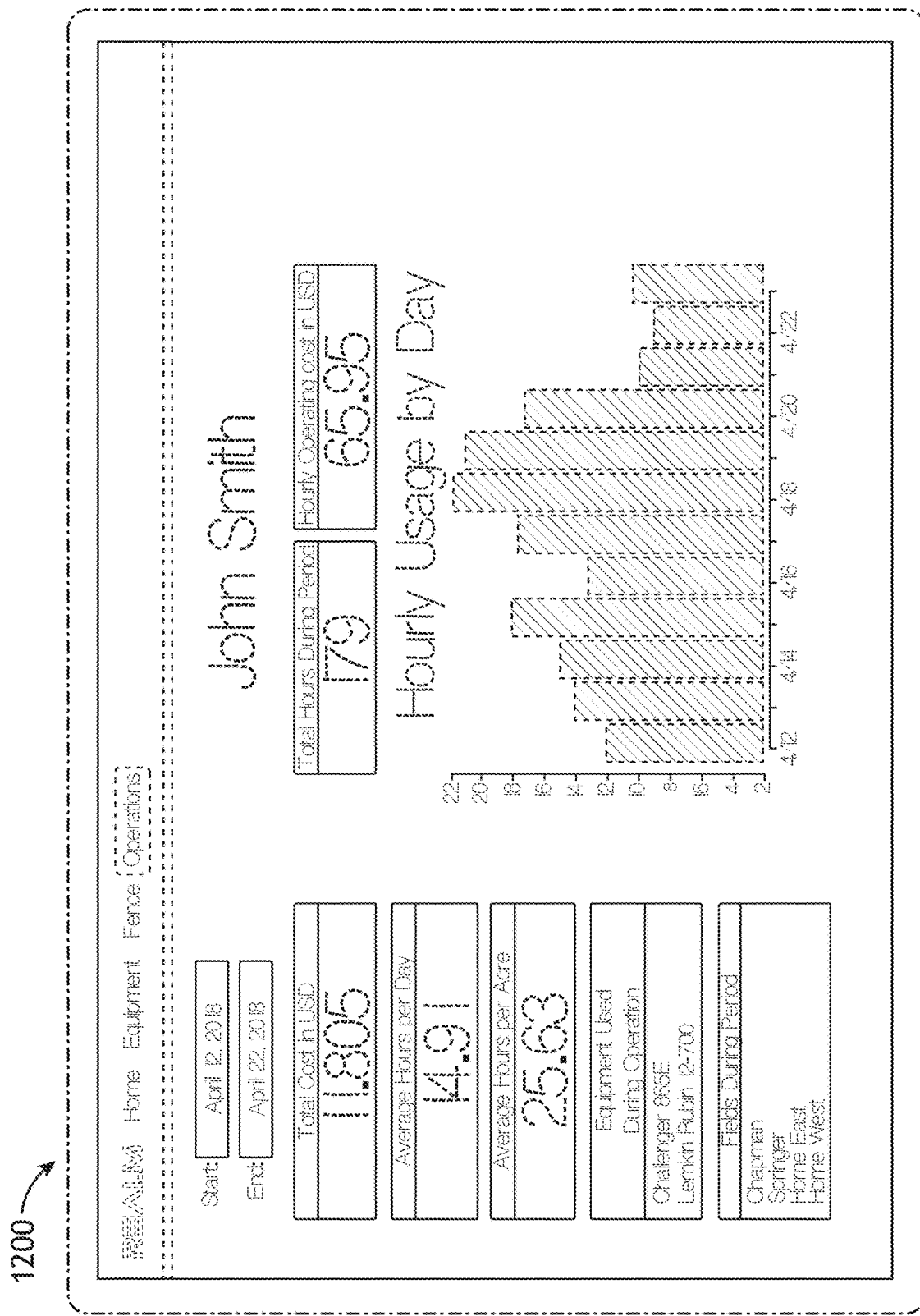

FIG. 12 illustrates a graphical user interface 1200 for providing proximity-based analysis, in accordance with one or more embodiments of the present disclosure.

In one embodiment, graphical user interface 1200 illustrates a report generated for an operation tracked by system 100 (e.g., "operation report"). In one embodiment, an operation report may include, but is not limited to, the total hours spent on the operation, the hourly operating cost for the operation, the total cost of the operation, the average time spent per day on the operation, the operating cost for the operation per acre and/or other land area, and the like. In another embodiment, a user may be able to filter the operation report using one or more filters including, but not limited to, date, time, equipment used (e.g., entity used), geo-fenced area (e.g., "field"), and the like.

Figure 13:
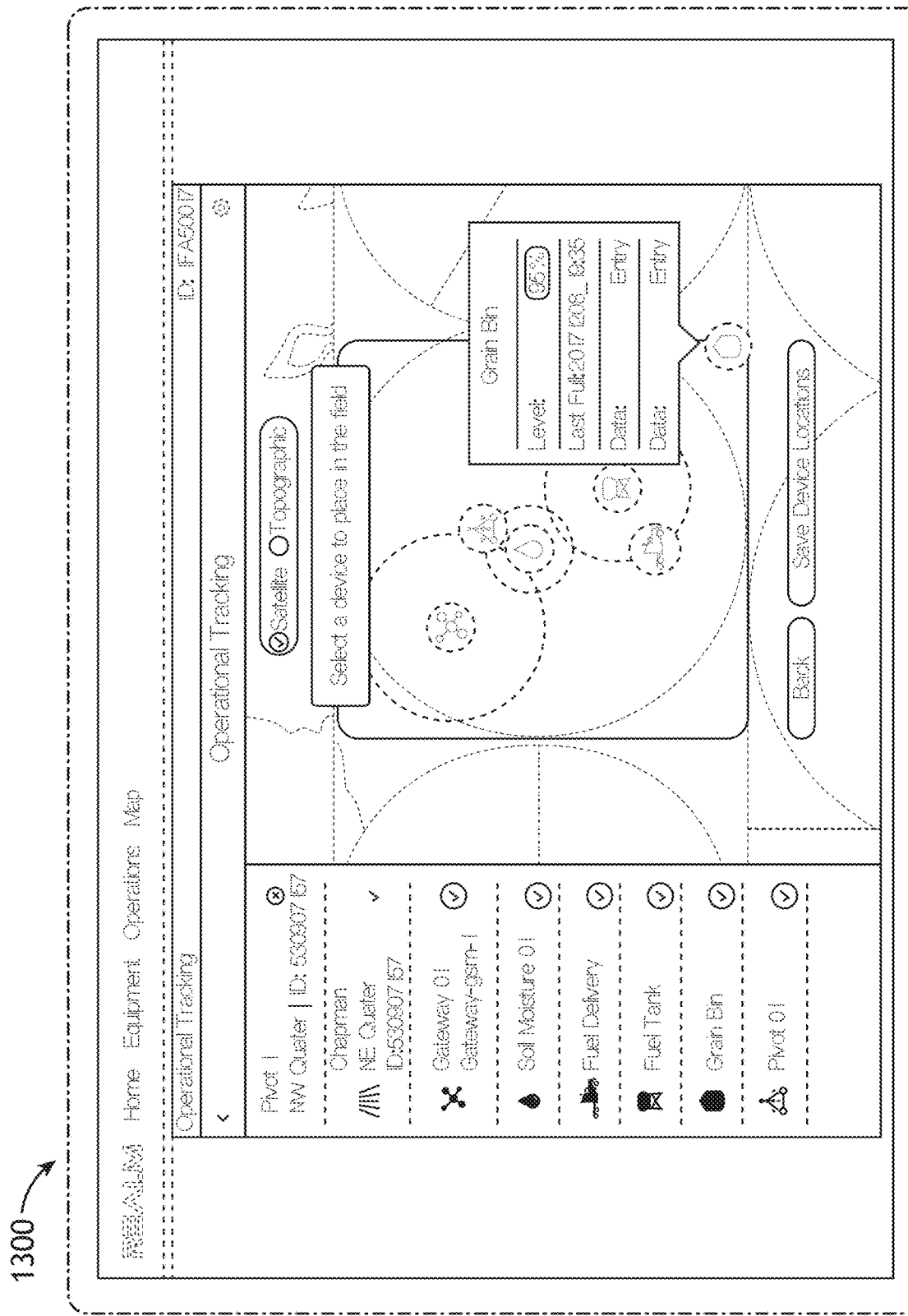

FIG. 13 illustrates a graphical user interface 1300 for providing proximity-based analysis, in accordance with one or more embodiments of the present disclosure.

In one embodiment, graphical user interface 1300 illustrates a map view of one or more geo-fenced areas of system 100 (e.g., "map view"). In one embodiment, a map view may include, but is not limited to, the perimeter of one or more geo-fenced areas, the location of one or more entities located within the one or more geo-fenced areas, the identity of one or more entities located within the one or more geo-fenced areas, operations, spatial relationships, and the like. In another embodiment, a user may be able to select one or more displayed geo-fenced areas, entities, spatial relationships, operations, and the like, in order to view one or more characteristics of the selected item. By way of example, as illustrated in FIG. 13, if a user selected an entity that is a grain bin, graphical user interface 1300 may display one or more characteristics of the entity (e.g., the grain bin), including, but not limited to, the fill level, the date of the last full level, and the like. In this regard, the map view may include information regarding stored inputs and outputs of various operations. In another embodiment, graphical user interface 1300 may be toggled between one or more views including, but not limited to, a satellite view, a topographic view, and the like.

Figure 14:
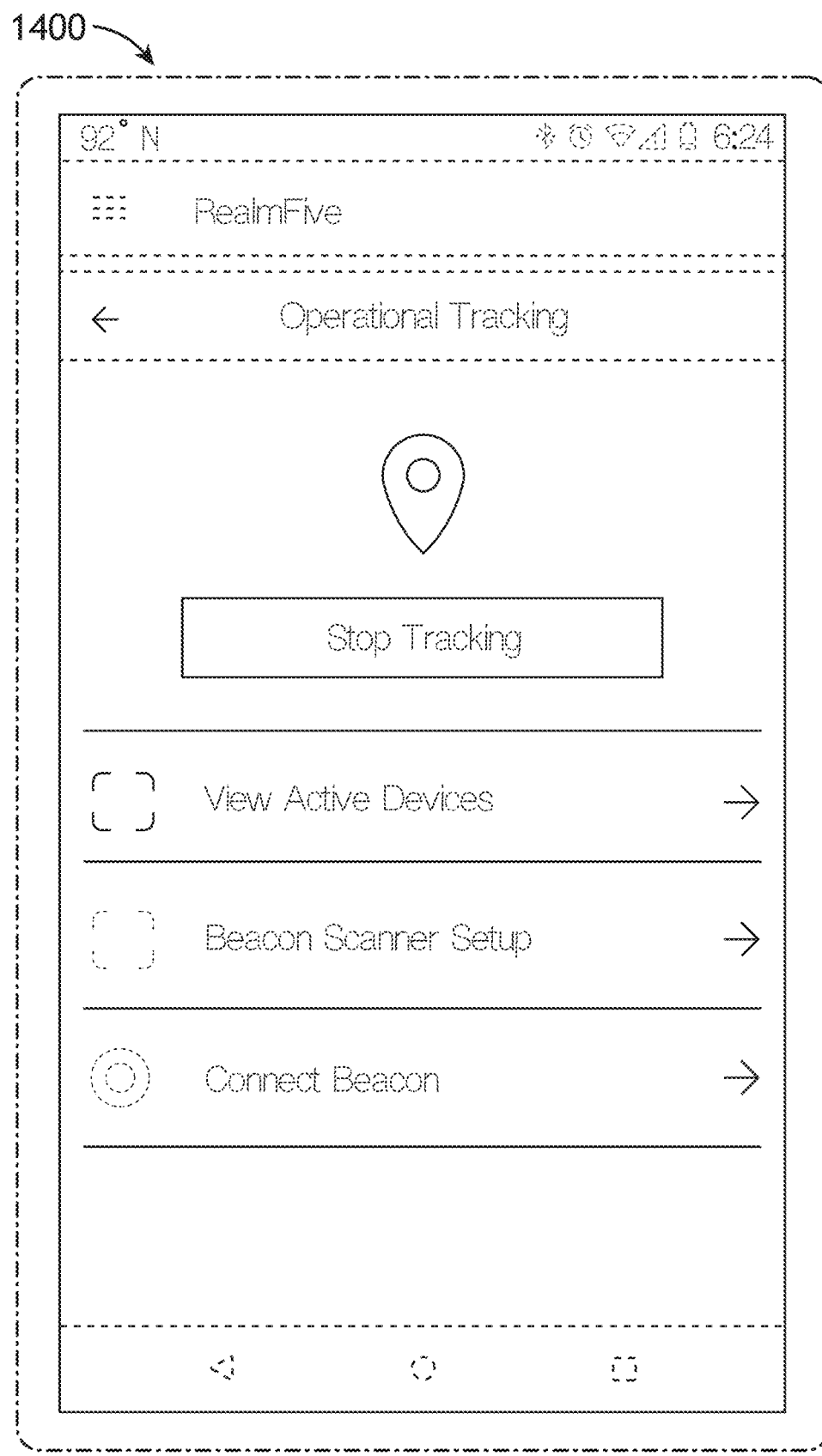

FIG. 14 illustrates a graphical user interface 1400 for providing proximity-based analysis, in accordance with one or more embodiments of the present disclosure.

In one embodiment, graphical user interface 1400 illustrates a graphical user interface which may be particularly compatible with portable electronic devices including, but not limited to, smartphones, tablets, and the like. In one embodiment, graphical user interface 1400 may illustrate a screen which may prompt a user to start and/or stop tracking one or more entities of system 100. In another embodiment, as depicted in FIG. 14, a user may be able to view active devices, select equipment that has been assigned to a communication device 101, connect a beacon 102 or other communication device 101, and the like.

Figure 15:
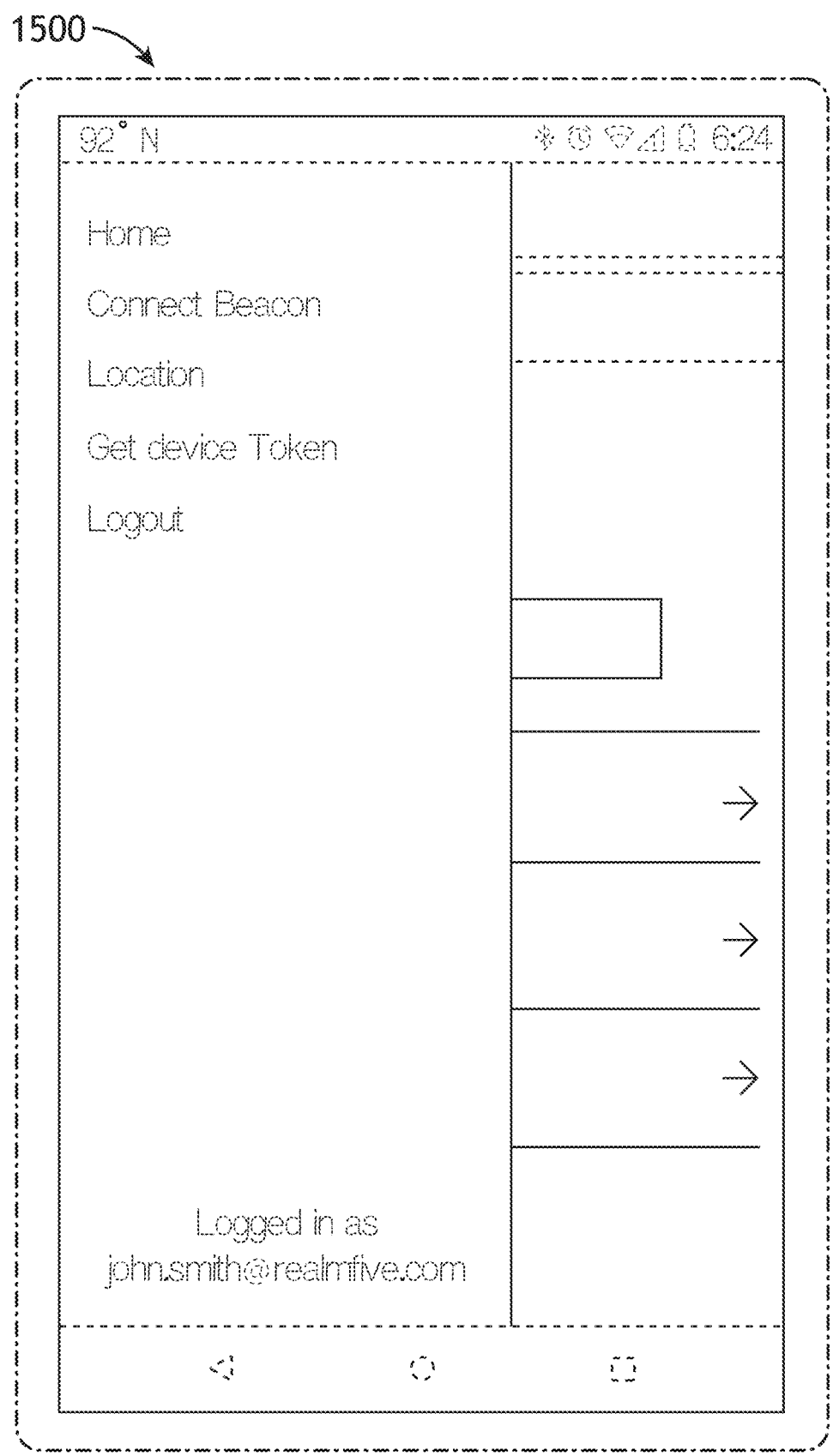

FIG. 15 illustrates a graphical user interface 1500 for providing proximity-based analysis, in accordance with one or more embodiments of the present disclosure.

In one embodiment, graphical user interface 1500 illustrates a menu which may allow a user to effectively and efficiently view, select, and modify one or more embodiments of system 100.

Figure 16:
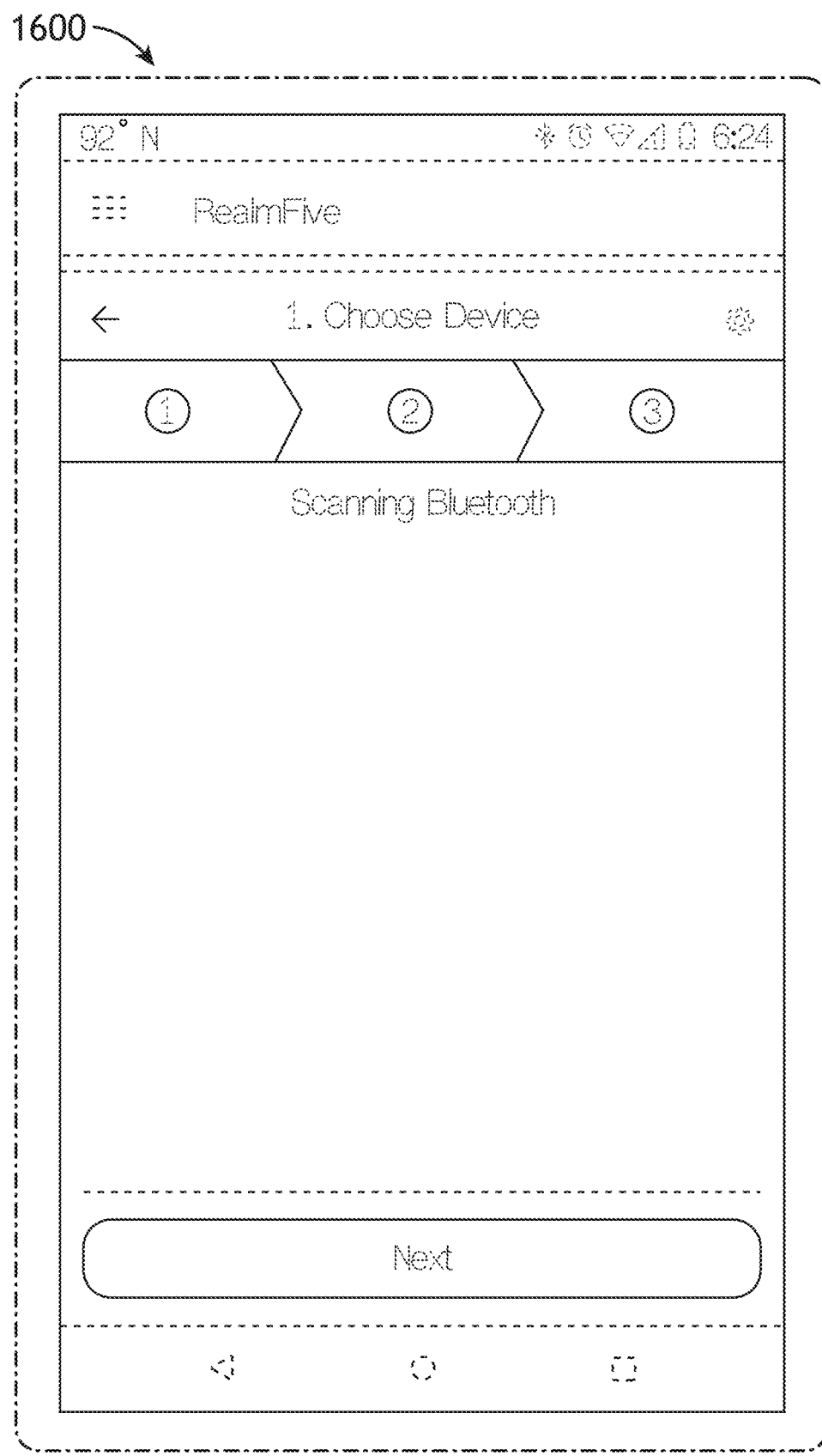

FIG. 16 illustrates a graphical user interface 1600 for providing proximity-based analysis, in accordance with one or more embodiments of the present disclosure.

In one embodiment, graphical user interface 1600 illustrates a setup graphical user interface which may allow a user to assign entities to associated communication devices 101. In one embodiment, graphical user interface 1600 may be displayed when system 100 is scanning for nearby "available" communication devices 101 which have not been previously assigned to an entity. In another embodiment, graphical user interface 1600 may display "available" communication devices 101, which may then be selected and assigned to a particular entity.

Figure 17:
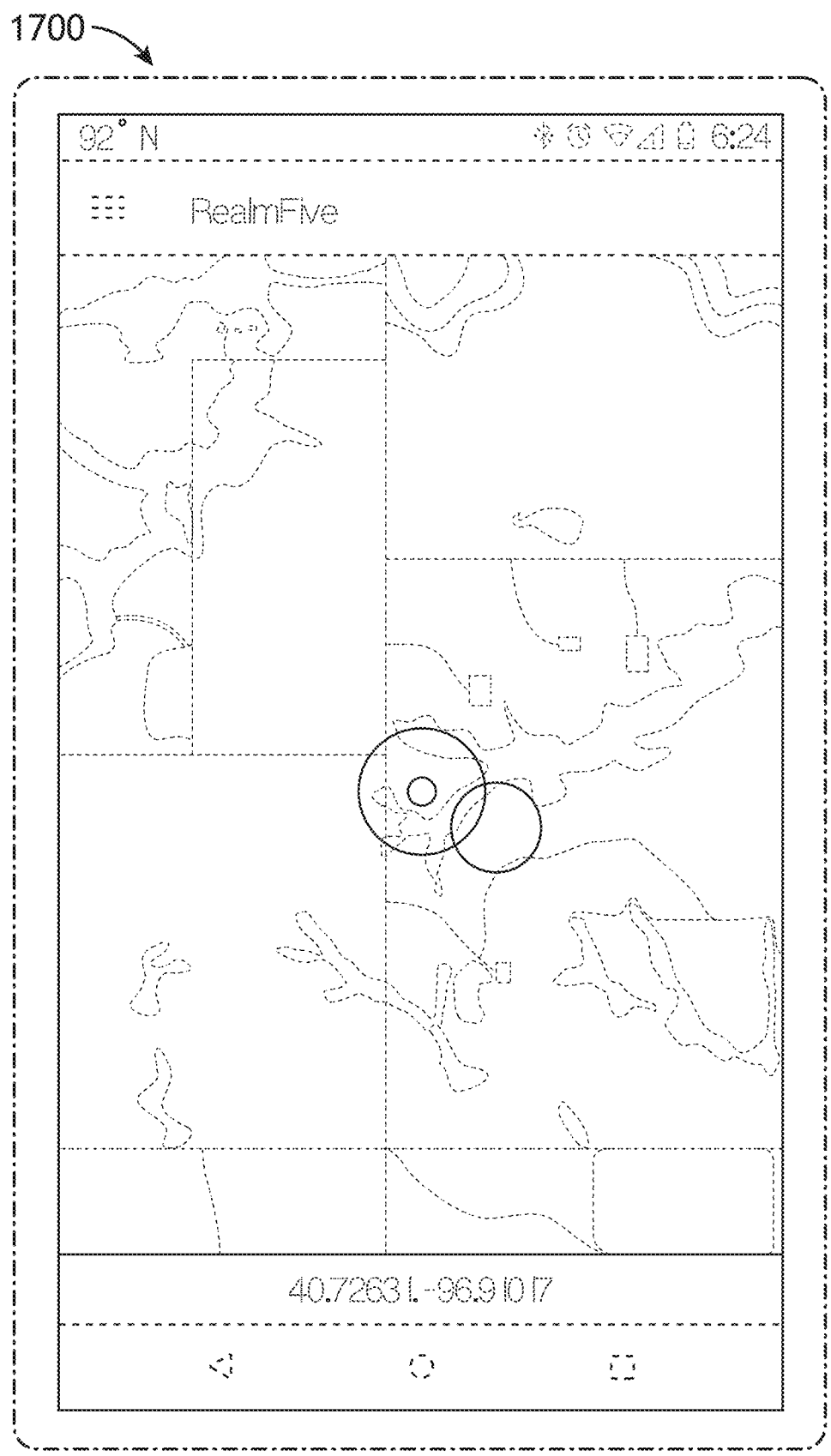

FIG. 17 illustrates a graphical user interface 1700 for providing proximity-based analysis, in accordance with one or more embodiments of the present disclosure.

In one embodiment, graphical user interface 1700 illustrates an overhead view of at least a portion of system 100. In one embodiment, graphical user interface 1700 may illustrate one or more embodiments of system 100 including, but not limited to, the current location of a user, one or more geo-fenced areas, one or more entities, one or more operations, and the like. In another embodiment, a user may be able to select one or more displayed geo-fenced areas, entities, spatial relationships, operations, and the like, in order to view one or more characteristics of the selected item. In another embodiment, graphical user interface 1300 may be toggled between one or more views including, but not limited to, a satellite view, a topographic view, and the like.

Figure 18:
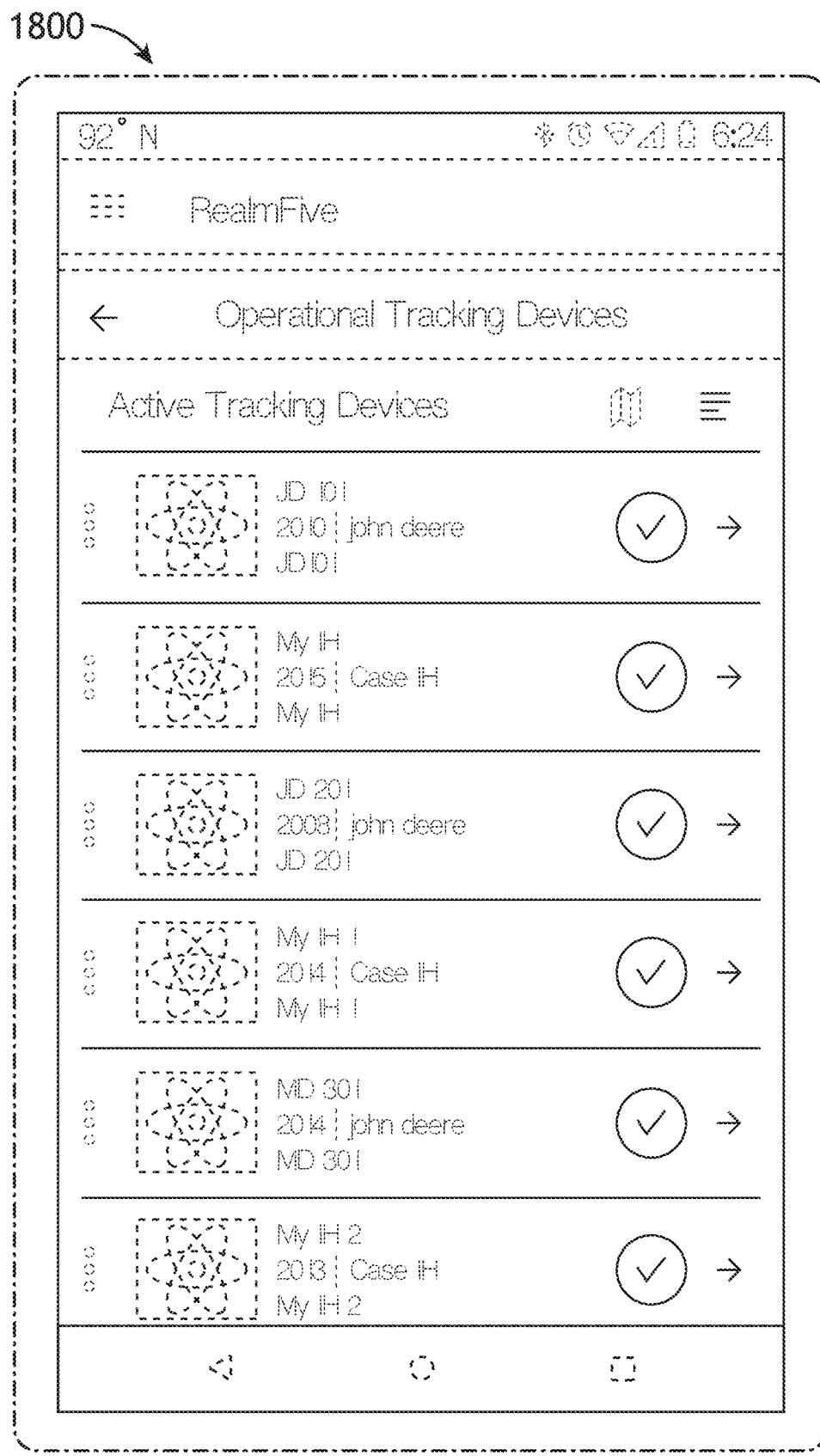

FIG. 18 illustrates a graphical user interface 1800 for providing proximity-based analysis, in accordance with one or more embodiments of the present disclosure.

In one embodiment, graphical user interface 1800 illustrates a menu depicting entities (e.g., "atoms") which are being tracked by system 100. In one embodiment, graphical user interface 1800 may include thumbnails or other pictures depicting each atom displayed. In another embodiment, graphical user interface 1800 may illustrate a status symbol for each atom displayed. By way of example, a "check" status icon, as illustrated in FIG. 18, may indicate that there are no detected issues with the atom. By way of another example, an "X" status icon may indicate that there are one or more identified issues with the item, indicating that action must be taken with respect to the atom. In another embodiment, a user may filter the atoms displayed on graphical user interface 1800.

Figure 19:
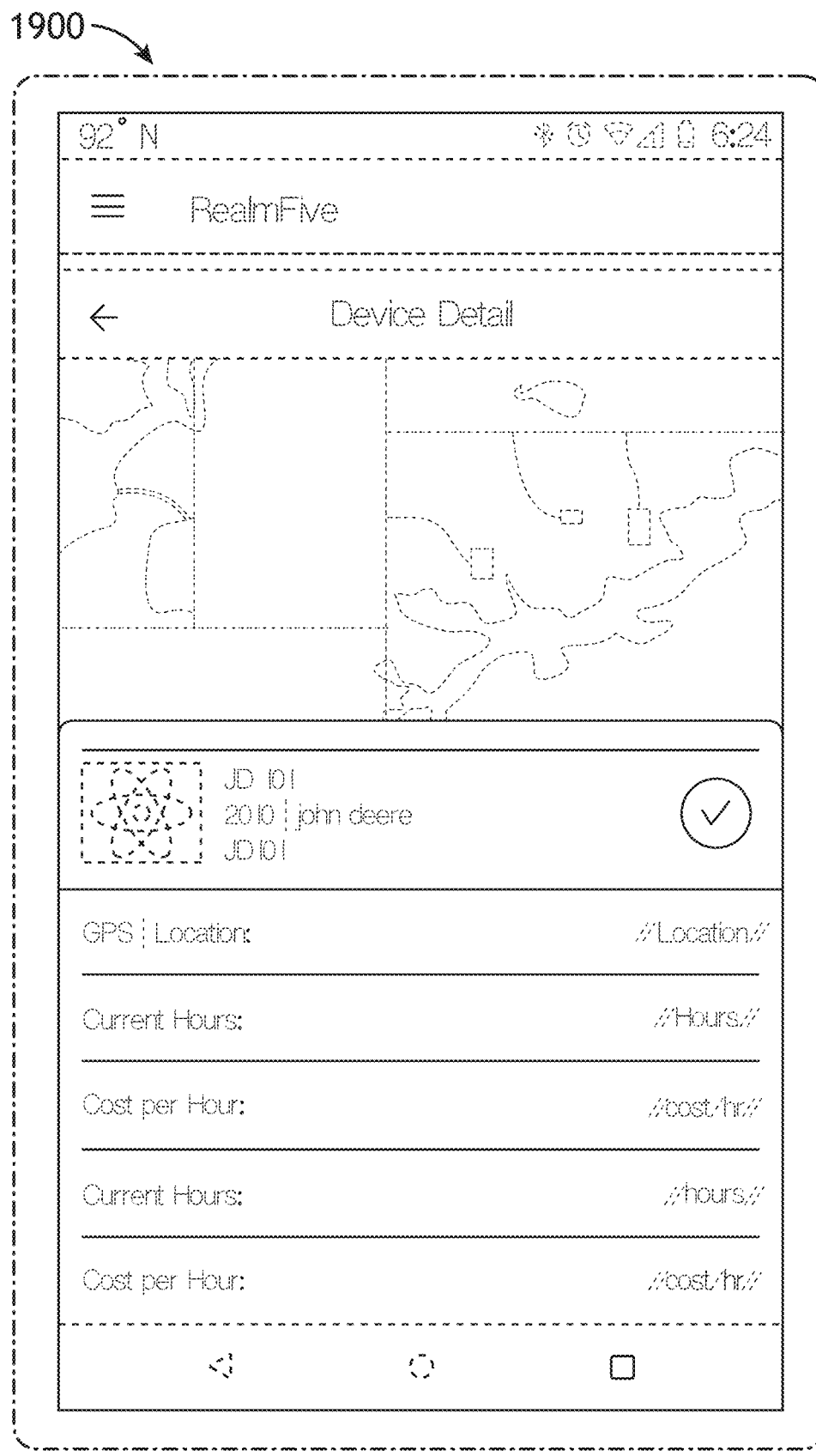

FIG. 19 illustrates a graphical user interface 1900 for providing proximity-based analysis, in accordance with one or more embodiments of the present disclosure.

In one embodiment, graphical user interface 1900 illustrates a detailed report of an atom. In one embodiment, graphical user interface 1900 may result following a user selecting an atom displayed in graphical user interface 1800. In one embodiment, graphical user interface 1900 includes a map view illustrating the location of the atom. In another embodiment, graphical user interface 1900 displays one or more metrics associated with the atom including, but not limited to, the status icon of the atom, the GPS location of the atom, the current operating hours of the atom, the operating cost per hour of the atom, and the like.

EXAMPLES

The numerous advantages of the present disclosure may be better understood with reference to multiple examples. In this regard, the following examples are provided to assist those skilled in the art to better understand the numerous advantages of the present disclosure, and are not to be understood as limiting.

Example 1: Allocation of Input Costs (e.g., Tillage, Fertilizer, Etc.)

In a first example, a farm administrator may wish to reconcile tillage, fertilizing, planting, and harvesting costs against fields at the end of the planting season. Ordinarily, the administrator begins by pulling reports from geo-locations and layers software such as John Deere's Apex or AgLeader's SMS Advanced. These reports show information that was successfully recorded by the tractors' on-board monitors. It is exceedingly expensive to place on-board monitors on every piece of equipment. Thus, some equipment does not have an on-board monitor, causing the data associated with the operation of these pieces of equipment to be missed. For example, if a sprayer were not equipped with an on-board monitor, the costs associated with operating the sprayer would not be recorded. Based on the information received from the available on-board monitors, the administrator estimates the cost of all the operations and spreads those estimates evenly across the fields. However, because not all equipment was tracking data with on-board monitors, this estimate may be highly inaccurate. Additionally, spreading the costs evenly across every field may not accurately display the actual costs associated with each field. Furthermore, since not all operators enter their names into the equipment of the on-board monitor when they start a particular operation, the administrator evenly spreads their salary for the planting season across those fields. Once again, because operators were not able to enter their names into the equipment without an on-board monitor, the operator time data may be skewed. The administrator generates a report based on the data from all the on-board monitors. Although the administrator knows the data is not completely accurate, there is no way of improving its accuracy with the current state of the equipment and budget.

It is noted herein that utilizing various embodiments of the present disclosure may improve the reconciliation of tillage, fertilizing, planting, and harvesting costs at the end of the year. Prior to starting the season, the administrator may install transmitting devices (e.g., communication devices 101, scanners 104, beacons 102) on various entities, which would be used throughout the year (e.g., tractor, implement, combine, sprayer, pickup, tanks, and the like). Each field may also be geo-fenced prior to the season. Furthermore, each operator of the administrator's team is equipped with a mobile device, such as a cell phone (e.g., scanner 104) having a Bluetooth/WiFi connection, while they are working. Throughout the course of the planting season, software on each operator's device (e.g., scanner 104) receives signals from beacons 102 it came close to and indexes the data received from beacons 102 with a GPS position and time. The operator's phone (e.g., scanner) then stores the data in memory. When the phone regains a network connection, it transmits the stored data to a server 120 via network 112. At the time of reconciliation, the administrator may access the data stored on server 120 via user interface 119 of controller 114. Due to the fact that the fields were geo-located and the scanners 104 tracked the location of each operation, the processors of the server 120 and/or controller 114 are able to associate operations and operator time to the appropriate geo-located fields and/or field subsections 502. A simple report, customized to the cooperation's needs is generated. Costs can be tracked to the field subsection 602 in a particular field for which the cost was spent.

Example 2: Allocation of Fuel Costs

In a second example, a farm operator may pull a tractor up to diesel tank in farm yard with the intention to fuel the tractor. After the operator fills the tank to the desired level, the operator writes down the amount of fuel used for that specific tractor in a notebook located near the diesel pump. Once a month, the farm bookkeeper transcribes the manual fuel entries into bookkeeping software for the farm. It is not possible to track the fuel used to specific fields or implements because it is likely that multiple implements have been utilized per tractor over a single fuel filling period. Furthermore, because some operators are not diligent in recording the amount of fuel used after each fill, the fuel usage records are not accurate.

It is noted herein that utilizing various embodiments of the present disclosure may improve fuel cost reconciliation and allocation. By way of example, the farm operator may pull a tractor up to fuel tank in farm yard with the intention to fuel the tractor. The tractor is equipped with a scanner 104 and the fuel tank is equipped with a beacon 102. Both the scanner 104 and the beacon 102 are configured to receive and transmit entity data (e.g., tractor speed, tractor fuel level, fuel tank fuel level, and the like). Furthermore, the scanner 104 is configured determine the tractor's GPS position and transmit the GPS position. As the operator pulls the tractor near the fuel tanks, a scanner 104 on the tractor receives signals from the beacon 102 on the tank. The scanner 104 detects a spatial relationship between the scanner 104 and the beacon 102, thereby forming an association. As the fuel nozzle from the fuel tank is "undocked" from its cradle, the beacon 102 transmits the tank fuel level to the scanner 104 (e.g., beginning fuel level). Once the fuel nozzle "re-docks" into its cradle, the beacon 102 again transmits the tank fuel level to the scanner 104 (e.g., ending fuel level). After the fueling operation is completed, the scanner 104 then transmits the beginning and ending tank fuel levels to a server 120 via network 112. The beginning and ending tank fuel levels, as well as the difference between the two (e.g., amount of fuel withdrawn) is stored in memory.

As the tractor performs a task throughout a field, the scanner 104 transmits network signals 110 to server 120 via network 112, wherein the network signals 110 includes multiple time-stamped data streams including GPS positional data, tractor speed, tractor fuel level, tractor fuel efficiency, and the like. One or more processors 122 of server 120 use the data from network signals 110, including the GPS position of the tractor and the tractor fuel level, in order to determine the amount of fuel consumed across each field subsection 602. In this regard, fuel consumption and fuel cost is able to be broken down into small field areas (e.g., field subsections 602) to account for variable costs across small field increments. Once the fuel consumption data is reconciled, the resulting data may be stored in memory 124 or a remote cloud-based farm bookkeeping software.

By way of another example, if the scanner 104 detected a spatial relationship with a beacon 102 equipped to a fuel tank with the incorrect fuel for the tractor, a warning would be produced. The one or more processors 122 may cause the server 120 to transmit a warning to the tractor operator's phone (e.g., second scanner 104*b*) in order to alert the operator and to prevent filling the tractor with the incorrect fuel. These warnings may prevent fuel waste as well as prevent damaging equipment.

Example 3: Grain Transport Logistics

In a third example, a truck driver may pick up a load of grain from a combine and haul the load to a grain elevator. Due to the high volume of trucks that are hauling grain to the elevator, there is a long wait line at the elevator. Thus, the truck driver may waste a significant amount of his day because he has no way to know how long the line at the grain elevator will be.

It is noted herein that utilizing various embodiments of the present disclosure may allow for improved time management and efficiency. By way of example, the same truck driver may pick up a load of grain from a combine and haul the load to a grain elevator. All the farmers in the area have equipped their trucks with scanners 104a. Furthermore, the grain elevator is equipped with a scanner 104b. As trucks pull up to the grain elevator, scanners 104a and scanner 104b detect a spatial relationship, and transmit the time-stamped spatial relationship to a server 120. Based on the number of trucks at the elevator (e.g., number of trucks in a spatial relationship with the elevator), one or more processors 122 of the server 120 may be configured to calculate the amount of time it will take for all the trucks to deposit their grain (e.g., wait time). Prior to planning his trip, the truck driver logs onto his smart phone app to access the data stored on server 120 in order to determine length of the line and the wait time at several elevators. The truck driver's smart phone app recommends delivering the grain to the elevator with the shortest wait time In another embodiment, the one or more processors 122 of the server 120 may make grain elevator recommendations to truck drivers based on the wait time at each elevator as well as the distance to each elevator. For example, the elevator with the shortest wait time may be the farthest one away, and therefore not be the fastest. In this case, the one or more processors 122 may recommend the grain elevator which will have the shortest overall time (e.g., wait time plus drive time).

Example 4: Automatic Reconciliation of Equipment Pairing

In a fourth example, a forage harvester may drive up to hook up to a specific header. The operator must select several values in the vehicle's terminal in order to match the specific width and type of header. Because these values must be selected manually, the operator occasionally selects the incorrect values, resulting in equipment damage.

It is noted herein that utilizing various embodiments of the present disclosure may allow a harvester to more efficiently pair equipment and prevent equipment damage. By way of example, the same forage harvester may drive up to hook up to a specific header. The harvester is equipped with a scanner 104, and the header is equipped with a beacon 102. Once the forage harvester comes within a certain distance of the header, scanner 104 identifies a spatial relationship with beacon 102. When the spatial relationship between the scanner 104 and the beacon 102 for a certain length of time, the forage harvester settings (e.g., width and type of header) automatically change. In the case that multiple headers are in a spatial relationship with the forage harvester, the forage harvester settings may adjust corresponding to the harvester with the strongest wireless connection with the scanner 104. Due to the fact that wireless connection may be inversely proportional to distance, adjusting the forage harvester settings to correspond with the strongest connection is likely adjusts the forage harvester to the nearest header.

It is contemplated that this automatic reconciliation of equipment pairing may help ensure that the automatic reconciliation of costs will be allocated to the correct agricultural entity. It is further contemplated that automatic reconciliation of equipment pairing may poke-yoke the bookkeeping system to ensure costs are allocated to the correct entity. For example, if user recorded that a 24-row planter was used instead of the correct 16-row planter that was actually used, the costs could be incorrectly applied. With automatic reconciliation of equipment pairing, these mistakes may be minimized to ensure accurate cost allocations.

Example 5: Automatic Reconciliation of Agricultural Inputs (Seed)

In a fifth example, a planter box may be filled with the wrong seed. Using current technology, there is no solution to prevent filling the planter box with the wrong seed. In addition, there is no automatic method for automatically assigning the respective costs of the various seeds to specific areas of a field.

It is noted herein that utilizing various embodiments of the present disclosure may prevent m is-allocating agricultural products. By way of example, a planter may be equipped with a scanner 104, and a seed container may be equipped with a beacon 102. As the seed container is brought into close proximity with the planter, the scanner 104 receives signals from beacon 102 and identifies a spatial relationship between the planter and the seed container. If the seed container contains the incorrect type of seed for the planter, system 100 may provide an alert to a user's phone informing the user that the incorrect type of seed may about to be used. In this regard, system 100 may prevent filling the planter with the wrong seed.

Additionally, as the planter travels throughout a field, system 100 may be configured to track seed allocation costs across different fields and/or field subsections 602. Furthermore, system 100 may generate alerts to ensure that the correct seed types are being planted in the correct location based (e.g., correct field, correct soil type, etc.).

Example 6: Automatic Reconciliation of Agricultural Inputs (Herbicide)

In a sixth example, a sprayer may be filled with an incorrect type of herbicide/pesticide. Using current technology, there is no solution to prevent filling the sprayer with the wrong chemical. Additionally, filling a sprayer with the incorrect type of chemical may lead to input cost waste, equipment damage, and crop damage. Furthermore, using current technology, there is no way to automatically track herbicide/pesticide allocation across particular fields.

It is noted herein that utilizing various embodiments of the present disclosure may prevent m is-allocating agricultural inputs. By way of example, the sprayer may be equipped with a scanner 104, and the herbicide container may be equipped with a beacon 102. As the herbicide container is brought into close proximity with the sprayer, the scanner 104 receives signals from beacon 102 and identifies a spatial relationship between the sprayer and the herbicide container. If the herbicide container contains the incorrect type of herbicide for the sprayer, system 100 may provide an alert to a user's phone informing the user that the incorrect type of herbicide may about to be used.

Additionally, as the sprayer travels throughout a field, system 100 may be configured to track herbicide allocation costs across different fields and/or field subsections 602. Furthermore, system 100 may generate alerts to ensure that the correct herbicide type is being used in the correct location based (e.g., correct field, correct soil type, etc.). In this regard, system 100 may help to ensure the application of the right chemicals to maximize the highest possible overall profit per farmed area.

Example 7: Automatic Prediction of Real-Time Inventory Discrepancies (Theft Prevention)

In a seventh example, a farm employee may intend to steal valuable chemicals from the farm. The farm employee drives a pickup filled with the chemicals out of the farm yard and begins driving down the road. The farm owner has no immediate way of knowing the chemicals have been stolen until the chemicals come up missing at the time of inventory cycle counting.

It is noted herein that utilizing various embodiments of the present disclosure may allow for real-time inventory discrepancy notification and prevent theft. By way of example, the same farm employee may intend to steal valuable chemicals from the farm. The employee's truck may be equipped with a scanner 104, and the chemical containers may be equipped with a beacon 102. The farm operator again drives the truck filled with the chemicals out of the farm yard and begins driving down the road. Ordinarily, truck and/or the chemical containers would not be operating in this area or down this route.

As the truck drove away, scanner 104 transmitted GPS positional data and entity data (e.g., truck speed, truck/chemical container spatial relationship data, and the like) to server 120 via network 112. As the truck crossed the pre-defined geo-fenced boundary of the farm yard, system 100 identified that the truck (e.g., scanner 104) had left the farm yard with the chemical container (e.g., beacon 102) down a route it would not normally operate. Once system 100 detects the truck and the chemical containers traveling down a route it would otherwise not operate (due to any factors, including the physical route taken, time of day, and the like), one or more processors 122 of server 120 may transmit an alert to a user interface 119 notifying the farm owner of the potential problem.

Example 8: Automatic Reconciliation of Agricultural Deliveries (Live Commodities)

In an eighth example, a truck driver may deliver a load of swine to a packing plant. Using current technology, it is typically necessary to manually record the load via bookkeeping software to reconcile the resulting payment to the delivery. It is generally also not possible to automatically associate a specific animal to a specific delivery to the packer.

It is noted herein that utilizing various embodiments of the present disclosure may allow for automatic reconciliation of agricultural deliveries, including live commodities. By way of example, the truck driver may prepare to deliver a load of swine to a packing plant. Here, the truck is equipped with a first scanner 104a, the loading chute is equipped with a second scanner 104b, and each hog is equipped with an ear tag (e.g., ear tag beacon 102). As the hogs are being loaded into the truck via the loading chute, the second scanner 104b on the loading chute identifies each hog (via ear tag beacons 102) as they pass through the loading chute into the truck. The second scanner 104b on the loading chute transmits a unique hog identifier corresponding to each ear tag beacon 102 as well as the loading time of each hog to server 120 via network 112. Additionally, one or more processors 122 of server 120 may be configured to associate each hog (via unique hog identifier) to a particular chute number, pen number, truck number, truck driver, and the like.

When the truck delivers the load to the packing facility, the second scanner 104b on the loading chute identifies each hog (via ear tag beacons 102). The second scanner 104b on the loading chute transmits the unique hog identifier, chute number, pen number, unloading time, and the like to server 120 via network 112. In this regard, system 100 may be used to automatically correlate a specific load and specific hogs to a specific packing plant payment or delivery invoice. Furthermore, it would be possible to automatically associate a truck driver, fuel usage, transport time, etc. to a specific load.

Continuing with the same example, system 100 may be configured to identify inconsistencies and inefficiencies. For example, if scanner 104b tracked transmitted the weight of each hog as the hog was loaded onto the truck (e.g., start weight), and transmitted the weight of each hog as the hog was unloaded at the packing facility (e.g., end weight), system 100 may be configured to determine hog shrinkage. In this regard, system 100 may be configured to determine that a specific truck driver has been inhumane when unloading the hogs that he transports (i.e. he consistently has shrink of 2.5 hogs/load compared to other truck drivers whose shrink is 0.75/load). Trends like this are often not obvious unless data analytics are utilized. Furthermore, with this system, it would be possible to track animals along the value chain; all the way back to their origin.

Example 9: Automatic Reconciliation of Agricultural Deliveries (Grain Commodities)

In a ninth example, a truck driver may deliver a load of corn to an elevator or cooperative. Using current technology, it is typically necessary to manually record the load via bookkeeping software to reconcile the load with the resulting payment to the farm. It is generally not possible to automatically associate a specific load to a specific delivery to the packer.

It is noted herein that utilizing various embodiments of the present disclosure allow for automatic reconciliation of agricultural deliveries, including grain commodities. By way of example, the truck driver may prepare to deliver a load of corn to an elevator or cooperative. Here, the conveyor is equipped with a first scanner 104a, the truck is equipped with a second scanner 104b, and one or more beacons 102 are placed in the corn. The one or more beacons 102 in the corn may include sensors which collect data including, but not limited to, moisture levels, fungus, insect history, and the like. As the corn is loaded into the truck, first scanner 104a on the conveyor identifies the one or more beacons 102 in the corn. The first scanner 104a on the conveyor transmits unique grain identifiers (e.g., beacon 102 identifiers) linking the corn to its origin, loading time, and health parameters (e.g., moisture levels and the like) to server 120 via network 112. In this regard, one or more processors 122 of server 120 may be configured to associate corn identifiers with loading time, truck number, bin number, truck driver, commodity history, and the like.

When the truck delivers the load to the elevator or cooperative, a scanner 104 on the unloading receptacle (e.g., pit, dump conveyor, etc.) may identify each beacon 102 in the corn. Scanner 104 may then transmit the unique grain identifiers (e.g., beacon 102 identifiers), unloading time, truck number, truck driver, pit number, and the like. In this regard, system 100 may be configured to automatically correlate a specific load to a specific packing plant payment or truck invoice, thereby enabling a user to track the grain back to its origin.

Continuing with the same example, system 100 may be configured to automatically associate a truck driver, fuel usage, transport time, etc. to a specific load. Furthermore, system 100 may be configured to determine that a specific truck driver has siphoned off a small portion of grain per load prior to making a delivery. For example, if beacons 102 in a load of corn end up being delivered to an elevator through a questionable customer delivery which was not intended, system 100 may be configured to transmit an alert to the farm owner. It is noted herein that such an inconsistency would only be noticeable when this data can be compared between a specific customer and information captured at both the origin and delivered locations.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a first communication device associated with a first entity;
   an additional communication device associated with an additional entity;
   a database;
   one or more processors communicatively coupled to at least one of the first communication device or the at least an additional communication device, wherein the one or more processors are configured to:
   identify a spatial relationship between the first entity and the additional entity based on at least one of one or more signals from the first communication device or one or more signals from the additional communication device;
   identify an operation unit defined by an association between the first entity and the additional entity based on the spatial relationship between the first entity and the additional entity, wherein the operation unit comprises a combination of the first entity and the additional entity, wherein the identification of the operation unit is triggered by an identification of a distance, below a threshold distance, between the first communication device associated with the first entity and the additional communication device associated with the additional entity, wherein the first entity comprises a first device and the additional entity comprises at least one of an additional device or a person;
   determine whether the operation unit is positioned within a defined geo-fenced area;
   determine one or more characteristics of the operation unit based on the determination of the operation unit within the defined geo-fenced area;
   store the one or more characteristics of the operation unit in the database; and
   report the one or more characteristics of the operation unit via a user interface.

2. The system of claim 1, wherein the one or more processors are further configured to provide an alert to a user via the user interface regarding one or more location-based characteristics of the operation unit.

3. The system of claim 1, wherein at least one of the first communication device or the additional communication device comprises a scanner.

4. The system of claim 1, wherein the first communication device comprises a scanner and the additional communication device comprises a beacon.

5. The system of claim 1, wherein the additional communication device comprises two or more communication devices and the additional entity comprises two or more entities.

6. The system of claim 5, wherein a second communication device is associated with a second entity, and a third communication device is associated with a third entity.

7. The system of claim 1, wherein at least one of the first entity or the additional entity is moveable.

8. The system of claim 7, wherein at least one of the first entity or the additional entity comprises at least one of a vehicle or a farming implement.

9. The system of claim 8, wherein at least one of the first entity or the additional entity comprises at least one of a tractor, a combine, a trailer, a cart, tillage equipment, a sprayer, a planter, harvester.

10. The system of claim 1, wherein at least one of the first entity or the additional entity is stationary.

11. The system of claim 10, wherein at least one of the first entity or the additional entity comprises a fuel tank, a water tank, a seed container, a chemical container, or a building.

12. The system of claim 1, wherein at least one of the first entity or the additional entity comprises an irrigation system or a grain handling system.

13. The system of claim 1, wherein the one or more processors are configured to automatically track a parameter based on proximity of the first entity to the additional entity.

14. The system of claim 13, wherein the one or more processors are configured to automatically track inventory usage based on proximity of the first entity to the additional entity, wherein the inventory comprises at least one of fuel, seed, or a chemical.

15. The system of claim 13, wherein the one or more processors are configured to automatically track man hours based on proximity of the first entity to the additional entity.

16. The system of claim 1, wherein the spatial relationship between the first entity and the additional entity comprises a distance between the first communication device and the additional communication device.

17. The system of claim 1, wherein the identifying a spatial relationship between the first entity and the additional entity comprises determining the spatial relationship based on Received Signal Strength (RSSI) values of at least one of one or more signals from the first communication device or one or more signals from the additional communication device.

18. The system of claim 1, wherein the one or more signals from the first communication device and the one or more signals from the additional communication device comprise global positioning system (GPS) positional data corresponding to at least one of a geographical position of the first communication device or a geographical position of the additional communication device.

19. The system of claim 1, wherein the first communication device is configured to collect data regarding one or more entity characteristics of the first entity, and the additional communication device is configured to collect data regarding one or more entity characteristics of the additional entity.

20. The system of claim 19, wherein the one or more entity characteristics of at least one of the first entity or the additional entity comprise a fuel level.

21. The system of claim 19, wherein the one or more entity characteristics of at least one of the first entity or the additional entity comprise a chemical level.

22. The system of claim 19, wherein the one or more entity characteristics of at least one of the first entity or the additional entity comprise a seed level.

23. A system comprising:
    a user interface; and a server comprising a memory and one or more processors, wherein the one or more processors are configured to:
receive one or more signals from a first communication device associated with a first entity;
receive one or more signals from at least an additional communication device associated with an additional entity;
identify a spatial relationship between the first entity and the additional entity based on at least one of one or more signals from the first communication device or one or more signals from the additional communication device;
identify an operation unit defined by an association between the first entity and the additional entity based on the spatial relationship between the first entity and the additional entity, wherein the operation unit comprises a combination of the first entity and the additional entity, wherein the identification of the operation unit is triggered by an identification of a distance, below a threshold distance, between the first communication device associated with the first entity and the additional communication device associated with the additional entity, wherein the first entity comprises a first device and the additional entity comprises at least one of an additional device or a person;
determine whether the operation unit is positioned within a defined geo-fenced area;
determine whether the operation unit is positioned within the defined geo-fenced area;
determine one or more characteristics of the operation unit based on the determination of the operation unit within the defined geo-fenced area;
store the one or more characteristics of the operation unit in the database; and
report the one or more characteristics of the operation unit via a user interface.

24. A method comprising:
associating a first communication device with a first entity;
associating an additional communication device with an additional entity;
identifying a spatial relationship between the first entity and the additional entity based on one or more signals from at least one of the first communication device or one or more signals from the additional communication device;
identifying an operation unit defined by an association between the first entity and the additional entity based on the spatial relationship between the first entity and the additional entity, wherein the operation unit comprises a combination of the first entity and the additional entity, wherein the identification of the operation unit is triggered by an identification of a distance, below a threshold distance, between the first communication device associated with the first entity and the additional communication device associated with the additional entity, wherein the first entity comprises a first device and the additional entity comprises at least one of an additional device or a person;
determining whether the operation unit is positioned within a defined geo-fenced area;
determining one or more characteristics of the operation unit based on the determination of the operation unit within the defined geo-fenced area;
storing the one or more characteristics of the operation unit in a database; and
reporting the one or more characteristics of the operation unit via a user interface.

25. A system comprising:
a first communication device associated with a first entity;
an additional communication device associated with an additional entity;
a database;
one or more processors communicatively coupled to at least one of the first communication device or the at least an additional communication device, wherein the one or more processors are configured to:
identify a spatial relationship between the first entity and the additional entity based on at least one of one or more signals from the first communication device or one or more signals from the additional communication device;
identify an operation unit defined by an association between the first entity and the additional entity based on the spatial relationship between the first entity and the additional entity, wherein the operation unit comprises a combination of the first entity and the additional entity, wherein the identification of the operation unit is triggered by an identification of a distance, below a threshold distance, between the first communication device associated with the first entity and the additional communication device associated with the additional entity, wherein the first entity comprises a first device and the additional entity comprises at least one of an additional device or a person;
determine one or more characteristics of the operation unit based on at least one of a location of the operation unit or a time of the association between the first entity and the additional entity;
store the one or more characteristics of the operation unit in the database; and
report the one or more characteristics of the operation unit via a user interface.

* * * * *

UNITED STATES PATENT AND TRADEMARK OFFICE
CERTIFICATE OF CORRECTION

PATENT NO. : 11,039,269 B2
APPLICATION NO. : 16/666186
DATED : June 15, 2021
INVENTOR(S) : Steve R Tippery, Brant Burkey and Heath Roehr Page 1 of 1

It is certified that error appears in the above-identified patent and that said Letters Patent is hereby corrected as shown below:

In the Claims

Column 47, Claim 23, Lines 30-31 should be deleted:
"determine whether the operation unit is positioned
    within the defined geo-fenced area;"

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*